(12) United States Patent
Yu

(10) Patent No.: US 11,832,352 B2
(45) Date of Patent: Nov. 28, 2023

(54) SERVICE FLOW TRANSMISSION METHOD AND APPARATUS AND COMMUNICATIONS METHOD AND APPARATUS

(71) Applicant: Huawei Technologies Co., Ltd., Shenzhen (CN)

(72) Inventor: Youyang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 17/166,709

(22) Filed: Feb. 3, 2021

(65) Prior Publication Data
US 2021/0168905 A1    Jun. 3, 2021

Related U.S. Application Data

(63) Continuation of application No. PCT/CN2019/099353, filed on Aug. 6, 2019.

(30) Foreign Application Priority Data

Aug. 14, 2018  (CN) .......................... 201810925079.7
Sep. 30, 2018  (CN) .......................... 201811163077.5

(51) Int. Cl.
*H04W 88/06* (2009.01)
*H04W 76/15* (2018.01)
*H04W 80/06* (2009.01)

(52) U.S. Cl.
CPC ........... *H04W 88/06* (2013.01); *H04W 76/15* (2018.02); *H04W 80/06* (2013.01)

(58) Field of Classification Search
CPC ..... H04W 88/06; H04W 76/15; H04W 80/06; H04W 28/0819; H04W 4/50; H04W 28/02; H04W 28/08; H04L 45/24; H04L 47/125; H04L 47/193; H04L 69/14; H04L 69/16; H04L 47/24; H04L 67/56
See application file for complete search history.

(56) References Cited

U.S. PATENT DOCUMENTS 11,611,387 B2 *   3/2023   Cirik ..................... H04L 5/0023
2015/0358325 A1   12/2015   Zhang
(Continued)

FOREIGN PATENT DOCUMENTS

CN       101895476 A      11/2010
CN       101931589 A      12/2010
(Continued)

OTHER PUBLICATIONS

Broadcom, "Architectural Updates for ATSSS Solution 1," SA WG2 Meeting #128, S2-187090, Jul. 6, 2018, 16 pages.
(Continued)

*Primary Examiner* — Julio R Perez
(74) *Attorney, Agent, or Firm* — Conley Rose, P.C.

(57) ABSTRACT

A service flow transmission method includes: receiving, by a terminal, a steering mode of a service flow and/or a transmission method of the service flow that are/is sent by a core network element, where a protocol data unit (PDU) session to which the service flow belongs supports a plurality of access technologies; and transmitting, by the terminal, the service flow according to the steering mode and/or the transmission method of the service flow using at least one of the plurality of access technologies.

20 Claims, 22 Drawing Sheets

---

S301. A user plane function network element obtains a plurality of addresses allocated to a PDU session of a terminal

↓

S302. When each address corresponds to an access technology type, the user plane function network element transmits a service flow according to policy information based on the plurality of addresses, where the policy information includes a steering mode and/or a transmission method of the service flow; or when each address corresponds to a service type, the user plane function network element transmits a service flow by using the plurality of addresses

(56) References Cited

U.S. PATENT DOCUMENTS

| | | | |
|---|---|---|---|
| 2016/0050682 A1 | 2/2016 | Uchino et al. | |
| 2017/0339257 A1 | 11/2017 | Kanagarathinam et al. | |
| 2018/0139136 A1 | 5/2018 | Yong | |
| 2019/0306752 A1* | 10/2019 | Lai | H04W 28/0925 |
| 2020/0260325 A1* | 8/2020 | Futaki | H04W 28/0835 |
| 2021/0076347 A1* | 3/2021 | Park | H04W 76/34 |
| 2021/0168905 A1* | 6/2021 | Yu | H04W 88/06 |

FOREIGN PATENT DOCUMENTS

| | | | |
|---|---|---|---|
| CN | 102025593 A | 4/2011 | |
| CN | 103906055 A | 7/2014 | |
| CN | 104955125 A | 9/2015 | |
| CN | 106302204 A | 1/2017 | |
| CN | 106572030 A | 4/2017 | |
| CN | 107040942 A | 8/2017 | |
| WO | 2014162895 A1 | 10/2014 | |
| WO | 2016075149 A1 | 5/2016 | |
| WO | 2016110318 A1 | 7/2016 | |
| WO | 2018202204 A1 | 11/2018 | |

OTHER PUBLICATIONS

BT Pic et al., "Architectural Updates for ATSSS Solution 1," SA WG2 Meeting #127, S2-183653, Sanya, P.R.China, Apr. 16-20, 2018, 17 pages.

3GPP TS 23.501 V15.2.0, "3rd Generation Partnership Project; Technical Specification Group Services and System Aspects; System Architecture for the 5G System; Stage 2 (Release 15)," Jun. 2018, 216 pages.

3GPP TS 23.502 V15.2.0, "3rd Generation Partnership Project; Technical Specification Group Services and System Aspects; Procedures for the 5G System; Stage 2 (Release 15)," Jun. 2018, 308 pages.

3GPP TS 23.503 V15.2.0 "3rd Generation Partnership Project; Technical Specification Group Services and System Aspects; Policy and Charging Control Framework for the 5G System; Stage 2 (Release 15)," Jun. 2018, 67 pages.

3GPP TR 23.793 V0.6.0, "3GPP Study on Access Traffic Steering, Switching and Splitting Support in the 5G System Architecture (Release 16)," Aug. 13, 2018, 80 pages.

SA WG2 Meeting #128, S2-186439, "Consolidated ATSSS Solution," Motorola Mobility, Lenovo, Jul. 2-6, 2018, Vilnius, Lithuania, 5 pages.

\* cited by examiner

SERVICE FLOW TRANSMISSION METHOD AND APPARATUS AND COMMUNICATIONS METHOD AND APPARATUS

CROSS-REFERENCE TO RELATED APPLICATIONS

This application is a continuation of International Patent Application No. PCT/CN2019/099353, filed on Aug. 6, 2019, which claims priority to Chinese Patent Application No. 201811163077.5, filed on Sep. 30, 2018, which claims priority to Chinese Patent Application No. 201810925079.7, filed on Aug. 14, 2018. The disclosures of the aforementioned applications are hereby incorporated by reference in their entireties.

TECHNICAL FIELD

Embodiments of this application relate to the field of communications technologies, and in particular, to a service flow transmission method and apparatus.

BACKGROUND

To cope with a challenge from a wireless broadband technology and keep a leading advantage of a 3rd Generation Partnership Project (3GPP) network, the 3GPP standard group formulated a next generation mobile communications network architecture (Next Generation System), which is referred to as a 5th generation (5G) network architecture. The 5G network architecture supports a terminal accessing a 5G core network (CN) side using a wireless technology (for example, Long-Term Evolution (LTE) or a 5G radio access network (RAN)) defined by the 3GPP standard group, and supports a terminal accessing a core network side using a non-3GPP access technology and through a non-3GPP interworking function N3IWF) or a next generation access gateway (e.g., next Generation Packet Data Gateway (ngPDG)).

In 5G, a protocol data unit (PDU) session used to provide a PDU connection service exists between a user equipment (UE) and a data network (DN). A single PDU session may support a plurality of access technologies. As shown in FIG. 1, in a PDU session A, a UE may access a core network side using a first access technology, or may access the core network side using a second access technology. The PDU session that supports a plurality of access technologies may be referred to as a multi-access PDU session (MA-PDU Session).

However, currently, in a multi-access PDU session, a user equipment steers a service flow according to a flow steering policy sent from a core network element. This increases complexity of signaling interaction between the user equipment and the core network element.

SUMMARY

Embodiments of this application provide a service flow transmission method and apparatus and a communications method and apparatus, to reduce complexity of signaling interaction between a terminal and a core network element during service flow steering.

According to a first aspect, an embodiment of this application provides a service flow transmission method. The method includes: receiving, by a terminal, a steering mode of a service flow and/or a transmission method of the service flow from a core network element, where a PDU session to which the service flow belongs supports a plurality of access technologies; and transmitting, by the terminal, the service flow according to the steering mode and/or the transmission method of the service flow using at least one of the plurality of access technologies.

According to the service flow transmission method provided in this embodiment of this application, the terminal obtains the steering mode of the service flow and/or the transmission method of the service flow from the core network element, and determines, according to the steering mode of the service flow and/or the transmission method of the service flow, access technologies used for service flows that use different transmission methods. In this way, the service flow may not be steered according to a flow steering policy, and the steering mode of the service flow and/or the transmission method of the service flow are/is used, such that the service flows that use the different transmission methods can be steered based on the determined corresponding access technologies in the PDU session that supports the plurality of access technologies. This reduces complexity of signaling interaction between the core network element and the terminal.

In a possible implementation, the transmission method of the service flow includes one or more of the following: a multipath transmission control protocol (MPTCP) method, an MPTCP proxy method, a transmission control protocol (TCP) method, a TCP proxy method, a user datagram protocol (UDP) method, a UDP proxy method, a quick UDP internet connections (QUIC) method, a QUIC proxy method, a multipath QUIC (MP-QUIC) method, or an MP-QUIC proxy method. In this way, a plurality of service flows using different transmission methods exist in a same PDU session.

In a possible implementation, the method provided in this embodiment of this application further includes: obtaining, by the terminal, a multipath transmission algorithm. The transmitting, by the terminal, the service flow according to the steering mode and/or the transmission method of the service flow using at least one of the plurality of access technologies includes: transmitting, by the terminal, the service flow according to the multipath transmission algorithm and the steering mode and/or the transmission method of the service flow using the at least one of the plurality of access technologies. In this way, the terminal may determine, according to the multipath transmission algorithm, a specific access technology used to transmit the service flow.

In a possible implementation, the obtaining, by the terminal, a multipath transmission algorithm includes: receiving, by the terminal, a multipath transmission algorithm from the core network element and that corresponds to the steering mode; or receiving, by the terminal, a multipath transmission algorithm from the core network element and that corresponds to the transmission method of the service flow; or determining, by the terminal according to the steering mode, a multipath transmission algorithm configured by the terminal; or determining, by the terminal according to the transmission method of the service flow, a multipath transmission algorithm configured by the terminal. In this way, the terminal may obtain the multipath transmission algorithm in a plurality of manners.

In a possible implementation, the multipath transmission algorithm is an MPTCP algorithm, a QUIC algorithm, or an MP-QUIC algorithm, and the MPTCP algorithm, the QUIC algorithm, or the MP-QUIC algorithm includes one or more of the following: a switching algorithm, a preferred minimum round-trip time (RTT) path algorithm, a multipath aggregation algorithm, a round-robin scheduling algorithm, a default algorithm, or a redundant transmission algorithm.

In a possible implementation, the method provided in this embodiment of this application further includes: receiving, by the terminal, indication information sent by the core network element, where the indication information is used to indicate that an access technology used by the terminal to send the service flow is the same as an access technology used by the terminal to receive the service flow. Additionally, the transmitting, by the terminal, the service flow according to the steering mode and/or the transmission method of the service flow using at least one of the plurality of access technologies includes: transmitting, by the terminal, the service flow according to the indication information and the steering mode and/or the transmission method of the service flow using the at least one of the plurality of access technologies. A user plane function network element and the terminal may steer a same service flow using different access technologies. Therefore, the indication information is sent to the terminal, such that the terminal can use a same access technology as a network side when sending the service flow.

In a possible implementation, the steering mode includes one or more of the following: an access technology preference indication used to indicate that the service flow is preferably transmitted using an access technology associated with the access technology preference indication; an optimal link-based flow steering indication used to indicate that the service flow is preferably transmitted using an optimal link, where the optimal link is a link whose link state is better than that of another link; a link load balancing-based flow steering indication used to indicate that the service flow is transmitted according to a link load balancing policy; an access technology and flow steering ratio indication used to indicate that the service flow is transmitted based on a flow steering ratio corresponding to the access technology; or a redundant transmission indication used to indicate that a same data packet in the service flow is simultaneously transmitted using different access technologies.

In a possible implementation, the receiving, by a terminal, a steering mode of a service flow and/or a transmission method of the service flow that are/is sent by a core network element includes: obtaining, by the terminal from a non-access stratum (NAS) transmission message sent by the core network element, the steering mode of the service flow and/or the transmission method of the service flow that are/is sent by a policy control network element; or obtaining, by the terminal, the steering mode of the service flow and/or the transmission method of the service flow from a session management response message sent by the core network element.

In a possible implementation, the method provided in this embodiment of this application further includes: obtaining, by the terminal, a plurality of addresses allocated by the core network element to the PDU session of the terminal and an access technology type corresponding to each of the plurality of addresses; and transmitting, by the terminal, the service flow according to policy information based on the plurality of addresses. The terminal obtains the plurality of addresses and the access technology type corresponding to each of the plurality of addresses, such that service flows transmitted using different transmission methods can be steered in a same PDU session.

In a possible implementation, the method provided in this embodiment of this application further includes: obtaining, by the terminal, a plurality of addresses allocated by the core network element to the PDU session of the terminal and a service type corresponding to each of the plurality of addresses; and transmitting, by the terminal, the service flow based on the plurality of addresses and the service type corresponding to each of the plurality of addresses. The terminal obtains the plurality of addresses and the service type corresponding to each of the plurality of addresses, such that service flows of a plurality of service types can be steered in a same PDU session.

In a possible implementation, the service flow includes a first service flow transmitted using a first transmission method, the plurality of addresses include a first address and a second address, the first address corresponds to a first access technology type, the second address corresponds to a second access technology type, and the transmitting, by the terminal, the service flow according to policy information based on the plurality of addresses includes: transmitting, by the terminal, the first service flow according to the policy information using the first address and/or the second address. It should be understood that, if the terminal determines, according to the policy information, that the first service flow is transmitted using a first access technology corresponding to the first access technology type, the terminal transmits the first service flow using the first address. If the terminal determines, according to the policy information, that the first service flow is transmitted using a second access technology corresponding to the second access technology type, the terminal transmits the first service flow using the second address. If the terminal determines, according to the policy information, that the first service flow is transmitted using both a first access technology and a second access technology, the terminal transmits, using the first address, a part that is of the first service flow and that is transmitted using the first access technology, and transmits, using the second address, a part that is of the first service flow and that is transmitted using the second access technology. It should be understood that the first transmission method herein includes one or more of an MPTCP method, an MPTCP proxy method, a TCP method, a TCP proxy method, a UDP method, a UDP proxy method, a QUIC method, or an MP-QUIC proxy method.

In a possible implementation, the service flow includes a first service flow transmitted using a first transmission method, the plurality of addresses include a first address, a second address, and a third address, the first address corresponds to a first access technology type, the second address corresponds to a second access technology type, the third address corresponds to the first access technology type and the second access technology type, and the transmitting, by the terminal, the service flow according to policy information based on the plurality of addresses includes: transmitting, by the terminal, the first service flow according to the policy information using the first address and/or the second address. In addition, if the service flow further includes a second service flow transmitted using a second transmission method, the terminal transmits the second service flow using the third address.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type, and the transmitting, by the terminal, the service flow according to policy information based on the plurality of addresses includes: transmitting, by the terminal, the first service flow according to the policy information using the first address and/or the second address. It should be understood that, the terminal determines, according to the policy information, an access technology type for transmitting the first service flow, and then determines, based on the determined access technology type, an address used for the first service flow. The service flow further includes a second service flow transmitted using a second transmission method, and the transmitting, by the terminal, the service flow according to policy information based on the plurality of addresses further includes: transmitting, by the terminal, the second service flow according to the policy information using the first address.

The foregoing describes a relationship between an access technology type and an address. In this way, if an access technology for the service flow is determined, a specific address for the service flow can be determined based on the relationship between an access technology type and an address. According to another aspect, each address may further correspond to a service type. For example, the plurality of addresses include a first address and a second address, the first address corresponds to a common service flow, and the second address corresponds to a first service flow. In this case, when the service flow includes the first service flow transmitted using a first transmission method, the transmitting, by the terminal, the service flow based on the plurality of addresses and the service type corresponding to each of the plurality of addresses may be implemented in the following manner: transmitting, by the terminal, the first service flow using the first address and/or the second address.

In a possible implementation, when the service flow further includes a second service flow transmitted using a second transmission method, the transmitting, by the terminal, the service flow based on the plurality of addresses and the service type corresponding to each of the plurality of addresses further includes: transmitting, by the terminal, the second service flow using the first address.

In a possible implementation, a user plane function network element may perform the process performed by the terminal in any one of the first aspect or the possible implementations of the first aspect. In other words, in any one of the first aspect or the possible implementations of the first aspect, the terminal may be replaced with the user plane function network element.

According to a second aspect, an embodiment of this application provides a communications method, including: obtaining, by a core network element, policy information of a service flow, where the policy information includes at least one of a steering mode and a transmission method, and a PDU session to which the service flow belongs supports a plurality of access technologies; and sending, by the core network element, the policy information of the service flow to a terminal/user plane function network element.

According to the communications method provided in this embodiment of this application, the core network element sends the policy information of the service flow to the terminal or the user plane function network element. In this way, the terminal/user plane function network element transmits service flows in a same PDU session according to the policy information using access technologies determined using the policy information.

In a possible implementation, the policy information further includes a multipath transmission algorithm.

In a possible implementation, the multipath transmission algorithm is an MPTCP algorithm, a UDP QUIC algorithm, or an MP-QUIC algorithm, and the MPTCP algorithm, the QUIC algorithm, or the MP-QUIC algorithm includes one or more of the following: a switching algorithm, an RTT path algorithm, a multipath aggregation algorithm, a round-robin scheduling algorithm, a default algorithm, or a redundant transmission algorithm.

In a possible implementation, the method provided in this embodiment of this application further includes: sending, by the core network element, indication information to the terminal (or the user plane function network element), where the indication information is used to indicate that an access technology used by the terminal (or the user plane function network element) to send the service flow is the same as an access technology used by the terminal (or the user plane function network element) to receive the service flow.

In a possible implementation, the obtaining, by a core network element, policy information of a service flow includes: receiving, by the core network element in a session management process, the policy information that is of the service flow and that is sent from a policy control network element; or receiving, by the core network element in a process in which the terminal requests to register with a network, the policy information that is of the service flow and that is sent from a policy control network element.

In a possible implementation, the method provided in this embodiment of this application further includes: sending, by the core network element to the terminal, a plurality of addresses allocated to the terminal, and an access technology type corresponding to each of the plurality of addresses or a service type corresponding to each of the plurality of addresses.

In a possible implementation, the sending, by the core network element to the terminal, a plurality of addresses allocated to the terminal, and an access technology type corresponding to each of the plurality of addresses includes: sending, by the core network element to the terminal/user plane function network element, a first address, a second address, a first access technology type corresponding to the first address, and a second access technology type corresponding to the second address; or sending, by the core network element, a first address and a second address to the terminal/user plane function network element; or sending, by the core network element, a first address, a second address, and type indication information to the terminal/user plane function network element, where the type indication information is used to indicate that one address selected from the first address and the second address corresponds to a first access technology type, and the other address corresponds to a second access technology type.

In a possible implementation, the sending, by the core network element to the terminal, a plurality of addresses allocated to the terminal, and an access technology type corresponding to each of the plurality of addresses includes: sending, by the core network element, a first address, a second address, and a third address to the terminal/user plane function network element, where the first address corresponds to a first access technology type, the second address corresponds to a second access technology type, and the third address corresponds to the first access technology type and the second access technology type; or sending, by the core network element, a first address, a second address, and a third address to the terminal/user plane function network element, where the first address corresponds to a first access technology type, and the second address corresponds to a second access technology type; or sending, by the core network element, a first address, a second address, and a third address to the terminal/user plane function network element, where the first address corresponds to a first access technology type, the second address corresponds to a second access technology type, and the third address corresponds to a common address indication.

In a possible implementation, the sending, by the core network element to the terminal/user plane function network element, a plurality of addresses allocated to the terminal, and an access technology type corresponding to each of the plurality of addresses or a service type corresponding to each of the plurality of addresses includes: sending, by the core network element to the terminal/user plane function network element, a first address, a second address, first type indication information corresponding to the first address, and second type indication information corresponding to the second address, where the first type indication information is used to indicate that the first address corresponds to a first access technology type and a second access technology type, and the second type indication information is used to indicate that the second address corresponds to the first access technology type or the second access technology type; or the first type indication information is used to indicate that the first address corresponds to a common service flow, and the second type indication information is used to indicate that the second address corresponds to a first service flow.

In a possible implementation, the sending, by the core network element to the terminal, a plurality of addresses allocated to the terminal, and an access technology type corresponding to each of the plurality of addresses or a service type corresponding to each of the plurality of addresses includes: sending, by the core network element to the terminal/user plane function network element, a first address, a second address, and second type indication information corresponding to the second address. The second type indication information is used to indicate that the second address corresponds to a first service flow, or the second type indication information is used to indicate that the second address corresponds to a first access technology type or a second access technology type.

In a possible implementation, the first type indication information may be a first access technology type indication and a second access technology type indication. Alternatively, the first type indication information may be a first indication field or fourth indication information, and is used to indicate that the first address corresponds to the first access technology type and the second access technology type. Alternatively, the first type indication information may be a common address indication. The second type indication information may be the first access technology type indication or the second access technology type indication, or the second type indication information may be a second indication field or fifth indication information.

For example, the fourth indication information is a first service flow indication and/or a second service flow indication, and the fifth indication information is the first service flow indication. Alternatively, the fourth indication information is a common service flow indication.

According to a third aspect, an embodiment of this application provides a service flow transmission method, including: obtaining, by a terminal, a plurality of addresses allocated by a core network element to a PDU session of the terminal, and an access technology type corresponding to each of the plurality of addresses or a service type corresponding to each of the plurality of addresses, where the PDU session supports a plurality of access technologies; and transmitting, by the terminal, a service flow according to policy information based on the plurality of addresses when the access technology type corresponding to each address; or when the service type corresponding to each address, transmitting, by the terminal, a service flow based on the plurality of addresses and the service type corresponding to each of the plurality of addresses.

In a possible implementation, the service flow includes a first service flow transmitted using a first transmission method, the plurality of addresses include a first address and a second address, the first address corresponds to a first access technology type, the second address corresponds to a second access technology type, and the transmitting, by the terminal, a service flow according to policy information based on the plurality of addresses includes: transmitting, by the terminal, the first service flow according to the policy information using the first address and/or the second address.

In a possible implementation, the first transmission method includes one or more of an MPTCP method, an MPTCP proxy method, a TCP method, a TCP proxy method, a UDP method, a UDP proxy method, a UDP QUIC method, or a UDP MP-QUIC proxy method.

In a possible implementation, the obtaining, by a terminal, a plurality of addresses allocated by a core network element to a PDU session of the terminal, and an access technology type corresponding to each of the plurality of addresses includes: obtaining, by the terminal, a first address, a first access technology type corresponding to the first address, a second address, and a second access technology type corresponding to the second address that are sent by the core network element.

In a possible implementation, the obtaining, by a terminal, a plurality of addresses allocated by a core network element to a PDU session of the terminal, and an access technology type corresponding to each of the plurality of addresses includes: obtaining, by the terminal, a first address and a second address that are sent by the core network element. When only the first address and the second address are sent, the terminal and the core network element negotiate in advance that any address selected from the first address and the second address corresponds to a first access technology type, and the other address corresponds to a second access technology type.

In a possible implementation, the obtaining, by a terminal, a plurality of addresses allocated by a core network element to a PDU session of the terminal, and an access technology type corresponding to each of the plurality of addresses includes: obtaining, by the terminal, a first address, a second address, and type indication information that are sent by the core network element. The type indication information is used to indicate that any address selected from the first address and the second address corresponds to a first access technology type, and the other address corresponds to a second access technology type.

In a possible implementation, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, the third address corresponds to the first access technology type and the second access technology type, and the transmitting, by the terminal, a service flow according to policy information based on the plurality of addresses includes: transmitting, by the terminal, the first service flow according to the policy information using the first address and/or the second address; and/or transmitting the second service flow according to the policy information using the third address.

In a possible implementation, the obtaining, by a terminal, a plurality of addresses allocated by a core network element to a PDU session of the terminal, and an access technology type corresponding to each of the plurality of addresses includes: receiving, by the terminal, a first address, a second address, and a third address that are sent by the core network element, where the first address corresponds to a first access technology type, the second address corresponds to a second access technology type, and the third address corresponds to the first access technology type and the second access technology type; or receiving, by the terminal, a first address, a second address, and a third address that are sent by the core network element, where the first address corresponds to a first access technology type, and the second address corresponds to a second access technology type; or receiving, by the terminal, a first address, a second address, and a third address that are sent by the core network element, where the first address corresponds to a first access technology type, the second address corresponds to a second access technology type, and the third address corresponds to a common address indication.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type, and the transmitting, by the terminal, a service flow according to policy information based on the plurality of addresses includes: transmitting, by the terminal, the first service flow according to the policy information using the first address and/or the second address.

In a possible implementation, the service flow further includes a second service flow transmitted using a second transmission method, and the transmitting, by the terminal, a service flow according to policy information based on the plurality of addresses further includes: transmitting, by the terminal, the second service flow according to the policy information using the first address.

In a possible implementation, the transmitting, by the terminal, the first service flow according to the policy information using the first address and/or the second address includes: when the terminal determines that an access technology used to transmit the first service flow is of an access technology type corresponding to the second address, transmitting, by the terminal, the first service flow using the second address; or when the terminal determines that an access technology used to transmit the first service flow is not of an access technology type corresponding to the second address, transmitting, by the terminal, the first service flow using the first address.

In a possible implementation, the service flow includes a first service flow transmitted using a first transmission method, the plurality of addresses include a first address and a second address, the first address corresponds to a common service flow, the second address corresponds to the first service flow, and the transmitting, by the terminal, a service flow based on the plurality of addresses and the service type corresponding to each of the plurality of addresses includes: transmitting, by the terminal, the first service flow using the first address and/or the second address.

In a possible implementation, the method provided in this embodiment of this application further includes: obtaining, by the terminal, a first message, where the first message is used to indicate that a first address corresponds to a first access technology type, and/or a second address corresponds to a second access technology type; and the transmitting, by the terminal, a service flow based on the plurality of addresses and the service type corresponding to each of the plurality of addresses includes: determining, by the terminal based on the first message, an access technology for transmitting a first service flow. This solution is applicable to a scenario in which the terminal obtains the service type corresponding to each address.

In a possible implementation, the service flow further includes a second service flow transmitted using a second transmission method, and the transmitting, by the terminal, a service flow based on the plurality of addresses and the service type corresponding to each of the plurality of addresses further includes: transmitting, by the terminal, the second service flow using the first address.

In a possible implementation, the first transmission method includes one or more of an MPTCP method, an MPTCP proxy method, a UDP QUIC method, a UDP QUIC proxy method, a UDP MP-QUIC method, or an MP-QUIC proxy method. The second transmission method includes one or more of a TCP method, a TCP proxy method, a UDP method, and a UDP proxy method.

In a possible implementation, the obtaining, by a terminal, a plurality of addresses allocated by a core network element to a PDU session of the terminal, and an access technology type corresponding to each of the plurality of addresses includes: obtaining, by the terminal, a first address and a second address that are sent by the core network element; and determining, by the terminal, that the first address corresponds to a first access technology type and a second access technology type, and determining, by the terminal, that the second address corresponds to the first access technology type or the second access technology type.

In a possible implementation, the obtaining, by a terminal, a plurality of addresses allocated by a core network element to a PDU session of the terminal, and an access technology type corresponding to each of the plurality of addresses or a service type corresponding to each of the plurality of addresses includes: receiving, by the terminal, a first address, a second address, first type indication information corresponding to the first address, and second type indication information corresponding to the second address that are sent by the core network element. The first type indication information is used to indicate a first access technology type and a second access technology type, and the second type indication information is used to indicate the first access technology type or the second access technology type. Alternatively, the first type indication information is used to indicate a common service flow, and the second type indication information is used to indicate a first service flow.

In a possible implementation, the obtaining, by a terminal, a plurality of addresses allocated by a core network element to a PDU session of the terminal, and an access technology type corresponding to each of the plurality of addresses or a service type corresponding to each of the plurality of addresses includes: receiving, by the terminal, a first address, a second address, and second type indication information corresponding to the second address that are sent by the core network element; and determining, by the terminal, that the first address corresponds to a first access technology type and a second access technology type, and determining that the second address corresponds to the first access technology type or the second access technology type.

For content of the first type indication information and the second type indication information, refer to the description in the second aspect. Details are not described herein again.

In a possible implementation, the method provided in this embodiment of this application further includes: receiving, by the terminal, indication information from the core network element and that is used to determine a transmission method for transmitting the service flow.

In any possible implementation of the third aspect, the terminal may further perform any possible method in the first aspect.

According to a fourth aspect, an embodiment of this application provides a service flow transmission method, including: obtaining, by a user plane function network element, a plurality of addresses allocated to a PDU session of a terminal and an access technology type corresponding to each of the plurality of addresses, where the PDU session supports a plurality of access technologies; and transmitting, by the user plane function network element, a service flow according to policy information based on the plurality of addresses; or obtaining, by a user plane function network element, a plurality of addresses allocated to a PDU session of a terminal and a service type corresponding to each of the plurality of addresses; and transmitting, by the user plane function network element, a service flow based on the plurality of addresses and the service type corresponding to each of the plurality of addresses.

In a possible implementation, the policy information includes a steering mode and/or a transmission method of the service flow.

In a possible implementation, the service flow includes a first service flow transmitted using a first transmission method, the plurality of addresses include a first address and a second address, the first address corresponds to a first access technology type, the second address corresponds to a second access technology type, and the transmitting, by the user plane function network element, a service flow according to policy information based on the plurality of addresses includes: sending, by the user plane function network element, the first service flow to the terminal according to the policy information using the first address and/or the second address.

In a possible implementation, the first transmission method includes one or more of an MPTCP method, an MPTCP proxy method, a TCP method, a TCP proxy method, a UDP method, a UDP proxy method, a UDP QUIC method, a UDP QUIC proxy method, a UDP MP-QUIC method, or an MP-QUIC proxy method.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type, and the transmitting, by the user plane function network element, a service flow according to policy information based on the plurality of addresses includes: sending, by the user plane function network element, the first service flow to the terminal according to the policy information using the first address and/or the second address.

In a possible implementation, the service flow further includes a second service flow transmitted using a second transmission method, and the transmitting, by the user plane function network element, a service flow according to policy information based on the plurality of addresses further includes: transmitting, by the user plane function network element, the second service flow according to the policy information using the first address.

In a possible implementation, the transmitting, by the user plane function network element, the first service flow according to the policy information using the first address and/or the second address includes: when the user plane function network element determines that an access technology used to transmit the first service flow is of an access technology type corresponding to the second address, transmitting, by the user plane function network element, the first service flow using the second address; or when the user plane function network element determines that an access technology used to transmit the first service flow is not of an access technology type corresponding to the second address, transmitting, by the user plane function network element, the first service flow using the first address.

In a possible implementation, the service flow includes a first service flow transmitted using a first transmission method, the plurality of addresses include a first address and a second address, the first address corresponds to a common service flow, the second address corresponds to the first service flow, and the transmitting, by the user plane function network element, a service flow based on the plurality of addresses and the service type corresponding to each of the plurality of addresses includes: sending, by the user plane function network element, the first service flow to the terminal using the first address and/or the second address.

In a possible implementation, the service flow further includes a second service flow transmitted using a second transmission method, and the transmitting, by the user plane function network element, a service flow based on the plurality of addresses and the service type corresponding to each of the plurality of addresses includes: transmitting, by the user plane function network element, the second service flow using the first address.

In a possible implementation, the user plane function network element obtains a first message, the first message is used to indicate that a first address corresponds to a first access technology type, and/or a second address corresponds to a second access technology type, and the method provided in this embodiment of this application further includes: determining, by the user plane function network element based on the first message, an access technology for transmitting a first service flow. In this way, for the first service flow, the user plane function network element may determine, based on the access technology for transmitting the first service flow, a specific address used to transmit the first service flow. For example, if the first service flow is transmitted using the first access technology type, and the first message indicates that the first address corresponds to the first access technology type, the user plane function network element transmits the first service flow using the first address. This situation is applicable to a case in which the user plane function network element determines that the first address corresponds to a common service flow, and the second address corresponds to the first service flow.

In a possible implementation, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, the third address corresponds to the first access technology type and the second access technology type, and the transmitting, by the user plane function network element, a service flow according to policy information based on the plurality of addresses includes: sending, by the user plane function network element, the first service flow to the terminal according to the policy information using the first address and/or the second address; and/or sending the second service flow to the terminal according to the policy information using the third address.

In a possible implementation, the method provided in this embodiment of this application further includes: receiving, by the user plane function network element, a service flow to be sent to the terminal; determining, by the user plane function network element, that the service flow to be sent to the terminal is transmitted using a first transmission method; and replacing, by the user plane function network element with a first address and/or a second address, a destination address of the service flow to be sent to the terminal.

In a possible implementation, the plurality of addresses include a first address and a second address, the first address corresponds to a first access technology type, and the second address corresponds to a second access technology type; the method provided in this embodiment of this application further includes: receiving, by the user plane function network element, a service flow sent by the terminal, where a source address of the service flow sent by the terminal is the first address and/or the second address; and the transmitting, by the user plane function network element, a service flow according to policy information based on the plurality of addresses includes: replacing, by the user plane function network element with a fourth address according to the policy information, the source address of the service flow sent by the terminal.

In a possible implementation, the fourth address is an address of the user plane function network element or a third address allocated to the PDU session of the terminal.

In a possible implementation, the service flow includes a first service flow transmitted using a first transmission method and a second service flow transmitted using a second transmission method, the plurality of addresses include a first address, a second address, and a third address, the first address corresponds to a first access technology type, the second address corresponds to a second access technology type, and the third address corresponds to the first access technology type and the second access technology type. The method provided in this embodiment of this application further includes: receiving, by the user plane function network element, a service flow sent by the terminal, where the service flow sent by the terminal includes the first service flow transmitted using the first transmission method, and a source address of the first service flow is the first address and/or the second address. Additionally, the transmitting, by the user plane function network element, a service flow according to policy information based on the plurality of addresses includes: replacing, by the user plane function network element, the source address of the first service flow with a fourth address according to the policy information.

In a possible implementation, the fourth address is an address of the user plane function network element or a third address allocated to the PDU session of the terminal.

In a possible implementation, the plurality of addresses include a first address and a second address, the first address corresponds to a first access technology type and a second access technology type, and the second address corresponds to the first access technology type or the second access technology type. The method provided in this embodiment of this application further includes: receiving, by the user plane function network element, a service flow sent by the terminal, where a source address of the service flow sent by the terminal is the first address and/or the second address. Additionally, the transmitting, by the user plane function network element, a service flow according to policy information based on the plurality of addresses includes: replacing, by the user plane function network element with the first address according to the policy information, the source address of the service flow sent by the terminal.

In a possible implementation, the first transmission method includes one or more of an MPTCP method, an MPTCP proxy method, a UDP QUIC method, a UDP QUIC proxy method, a UDP MP-QUIC method, or an MP-QUIC proxy method. The second transmission method includes one or more of a TCP method, a TCP proxy method, a UDP method, and a UDP proxy method.

In a possible implementation, the user plane function network element obtains the plurality of addresses allocated to the PDU session of the terminal, and the access technology type corresponding to each of the plurality of addresses or the service type corresponding to each of the plurality of addresses.

In a possible implementation, the method provided in this embodiment of this application further includes: receiving, by the user plane function network element, a first address, a second address, and a third address that are sent by a session management network element, where the first address corresponds to a first access technology type, the second address corresponds to a second access technology type, and the third address corresponds to the first access technology type and the second access technology type; or receiving, by the user plane function network element, a first address, a second address, and a third address that are sent by a session management network element, where the first address corresponds to a first access technology type, and the second address corresponds to a second access technology type; or receiving, by the user plane function network element, a first address, a second address, and a third address that are sent by a session management network element, where the first address corresponds to a first access technology type, the second address corresponds to a second access technology type, and the third address corresponds to a common address indication.

In a possible implementation, the service flow includes a first service flow transmitted using a first transmission method, the plurality of addresses include a first address and a second address, the first address corresponds to a common service flow, the second address corresponds to the first service flow. Additionally, the transmitting, by the user plane function network element, a service flow based on the plurality of addresses and the service type corresponding to each address includes: transmitting, by the user plane function network element, the first service flow using the first address and/or the second address.

In a possible implementation, the service flow further includes a second service flow transmitted using a second transmission method, and the transmitting, by the user plane function network element, a service flow based on the plurality of addresses and the service type corresponding to each address further includes: transmitting, by the user plane function network element, the second service flow using the first address.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type. Additionally, the transmitting, by the user plane function network element, a service flow according to policy information based on the plurality of addresses includes: transmitting, by the user plane function network element, the first service flow using the first address and/or the second address.

In a possible implementation, the service flow further includes a second service flow transmitted using a second transmission method, and the transmitting, by the user plane function network element, a service flow according to policy information based on the plurality of addresses further includes: transmitting, by the user plane function network element, the second service flow using the first address.

In a possible implementation, the obtaining, by a user plane function network element, a plurality of addresses allocated by a core network element to a PDU session of a terminal, and an access technology type corresponding to each of the plurality of addresses or a service type corresponding to each of the plurality of addresses includes: receiving, by the user plane function network element, a first address, a second address, first type indication information corresponding to the first address, and second type indication information corresponding to the second address that are sent by the core network element. The first type indication information is used to indicate a first access technology type and a second access technology type, and the second type indication information is used to indicate the first access technology type or the second access technology type. Alternatively, the first type indication information is used to indicate a common service flow, and the second type indication information is used to indicate a first service flow.

In a possible implementation, the obtaining, by a user plane function network element, a plurality of addresses allocated by a core network element to a PDU session of a terminal, and an access technology type corresponding to each of the plurality of addresses includes: receiving, by the user plane function network element, a first address, a second address, and second type indication information corresponding to the second address that are sent by the core network element; determining, by the user plane function network element, that the first address corresponds to a first access technology type and a second access technology type; and determining that the second address corresponds to the first access technology type or the second access technology type.

For content of the first type indication information and the second type indication information, refer to the description in the second aspect. Details are not described herein again.

In any possible implementation of the fourth aspect, the user plane function network element may further perform an operation of the terminal in any implementation of the first aspect.

According to a fifth aspect, an embodiment of this application provides a communications method, including: receiving, by a session management network element, indication information, where the indication information is used to indicate a transmission method of a service flow, and a PDU session to which the service flow belongs supports a plurality of access technologies; and selecting, by the session management network element based on the indication information, a user plane function network element having a transmission method function.

In a possible implementation, the method provided in this embodiment of this application further includes: obtaining, by the session management network element based on the indication information, a plurality of addresses allocated to a PDU session of a terminal, where each of the plurality of addresses corresponds to at least one of a plurality of access technology types.

In a possible implementation, the method provided in this embodiment of this application further includes: sending, by the session management network element to the user plane function network element/terminal, the plurality of addresses and an access technology type corresponding to each of the plurality of addresses or a service type corresponding to each of the plurality of addresses.

In a possible implementation, the method provided in this embodiment of this application further includes: sending, by the session management network element, the indication information to the user plane function network element/terminal, where the indication information is used to indicate the transmission method of the service flow.

In a possible implementation, the method provided in this embodiment of this application further includes: sending, by the session management network element to the user plane function network element/terminal, a third address and a first access technology type and a second access technology type that correspond to the third address; or sending, by the session management network element, a third address and a common address indication to the user plane function network element/terminal; or sending, by the session management network element, a third address to the user plane function network element/terminal. It may be understood that, in this case, a first address and a second address further need to be sent to the terminal. For a manner in which the first address and the second address indicate access technology types, refer to the descriptions in the foregoing embodiments. Details are not described herein again.

In a possible implementation, for a manner in which the session management network element sends, to the user plane function network element/terminal, the plurality of addresses and the access technology type corresponding to each of the plurality of addresses or the service type corresponding to each of the plurality of addresses, refer to the implementation in which the core network element sends, to the terminal, the plurality of addresses allocated to the PDU session, and the access technology type corresponding to each of the plurality of addresses or the service type corresponding to each of the plurality of addresses in the second aspect. Details are not described herein again. For example, the core network element in the second aspect may be replaced with the session management network element.

In any possible implementation of the fifth aspect, the session management network element may further perform any possible communications method in the second aspect.

According to a sixth aspect, this application provides a service flow transmission apparatus. The service flow transmission apparatus may implement the method in any one of the first aspect or the possible implementations of the first aspect, and therefore can achieve the beneficial effects in any one of the first aspect or the possible implementations of the first aspect. The service flow transmission apparatus may be a terminal, or may be an apparatus that can support a terminal in implementing the method in any one of the first aspect or the possible implementations of the first aspect, for example, a chip applied to the terminal. The service flow transmission apparatus may implement the foregoing method using software or hardware, or by executing corresponding software using hardware.

In an example, the service flow transmission apparatus includes: a receiving unit configured to receive a steering mode of a service flow and/or a transmission method of the service flow that are/is sent by a core network element, where a PDU session to which the service flow belongs supports a plurality of access technologies; and a transmission unit configured to transmit the service flow according to the steering mode and/or the transmission method of the service flow using at least one of the plurality of access technologies.

In a possible implementation, the transmission method of the service flow includes one or more of the following: an MPTCP method, an MPTCP proxy method, a TCP method, a TCP proxy method, a UDP method, a UDP proxy method, a UDP QUIC method, a UDP QUIC proxy method, a UDP MP-QUIC method, or an MP-QUIC proxy method.

In a possible implementation, the service flow transmission apparatus provided in this embodiment of this application further includes: an obtaining unit configured to obtain a multipath transmission algorithm. The transmission unit is configured to transmit the service flow according to the multipath transmission algorithm and the steering mode and/or the transmission method of the service flow using the at least one of the plurality of access technologies.

In a possible implementation, the receiving unit is further configured to receive a multipath transmission algorithm that corresponds to the steering mode from the core network element, and the obtaining unit is configured to obtain, from the receiving unit, the multipath transmission algorithm that corresponds to the steering mode from the core network element; or the receiving unit is further configured to receive a multipath transmission algorithm that corresponds to the transmission method of the service flow from the core network element, and the obtaining unit is configured to obtain, from the receiving unit, the multipath transmission algorithm that corresponds to the transmission method of the service flow from the core network element; or the obtaining unit is configured to determine, according to the steering mode, a multipath transmission algorithm configured by the terminal; or the obtaining unit is configured to determine, according to the transmission method of the service flow, a multipath transmission algorithm configured by the terminal.

In a possible implementation, for content of the multipath transmission algorithm, refer to the description in the first aspect. Details are not described herein again.

In a possible implementation, the receiving unit is further configured to receive indication information sent by the core network element, and the indication information is used to indicate that an access technology used by the terminal to send the service flow is the same as an access technology used by the terminal to receive the service flow. The transmission unit is further configured to transmit the service flow according to the indication information and the steering mode and/or the transmission method of the service flow using the at least one of the plurality of access technologies.

In a possible implementation, for content of the steering mode, refer to the description in the first aspect. Details are not described herein again.

In a possible implementation, the obtaining unit is configured to obtain, from an NAS transmission message sent by the core network element, the steering mode of the service flow and/or the transmission method of the service flow that are/is sent by a policy control network element. Alternatively, the obtaining unit is configured to obtain the steering mode of the service flow and/or the transmission method of the service flow from a session management response message sent by the core network element.

In a possible implementation, the obtaining unit is further configured to obtain a plurality of addresses allocated by the core network element to the PDU session of the terminal and an access technology type corresponding to each of the plurality of addresses. The transmission unit is further configured to transmit the service flow according to policy information based on the plurality of addresses.

In a possible implementation, the obtaining unit is further configured to obtain a plurality of addresses allocated by the core network element to the PDU session of the terminal and a service type corresponding to each of the plurality of addresses. Additionally, the transmission unit is further configured to transmit the service flow based on the plurality of addresses and the service type corresponding to each of the plurality of addresses.

In a possible implementation, the service flow includes a first service flow transmitted using a first transmission method, the plurality of addresses include a first address and a second address, the first address corresponds to a first access technology type, the second address corresponds to a second access technology type. Additionally, the transmission unit is further configured to transmit the first service flow according to the policy information using the first address and/or the second address.

In a possible implementation, the first transmission method includes one or more of an MPTCP method, an MPTCP proxy method, a TCP method, a TCP proxy method, a UDP method, a UDP proxy method, a QUIC method, a QUIC proxy method, an MP-QUIC method, or an MP-QUIC proxy method.

In a possible implementation, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, the third address corresponds to the first access technology type and the second access technology type. Additionally, the transmission unit is further configured to: transmit the first service flow according to the policy information using the first address and/or the second address; and/or transmit the second service flow according to the policy information using the third address.

In a possible implementation, the service flow includes a first service flow transmitted using a first transmission method and/or a second service flow transmitted using a second transmission method, the plurality of addresses include a first address and a second address, the first address corresponds to a first access technology type and a second access technology type, the second address corresponds to the first access technology type or the second access technology type. Additionally, the transmission unit is further configured to: transmit the first service flow according to the policy information using the first address and/or the second address; and/or transmit the second service flow according to the policy information using the first address.

In a possible implementation, the service flow further includes a second service flow transmitted using a second transmission method, and the transmission unit is further configured to transmit the second service flow according to the policy information using the first address.

In a possible implementation, the service flow includes a first service flow transmitted using a first transmission method, the plurality of addresses include a first address and a second address, the first address corresponds to a common service flow, the second address corresponds to the first service flow. Additionally, the transmission unit is configured to transmit the first service flow using the first address and/or the second address.

In a possible implementation, the service flow further includes a second service flow transmitted using a second transmission method, and the transmission unit is further configured to transmit the second service flow using the first address.

In another example, an embodiment of this application further provides a service flow transmission apparatus. The service flow transmission apparatus may be a terminal or a chip applied to the terminal. The service flow transmission apparatus includes a processor and a communications interface. The communications interface is configured to support the service flow transmission apparatus in performing the message/data receiving and sending steps performed on the service flow transmission apparatus side in any one of the first aspect and the possible implementations of the first aspect. The processor is configured to support the service flow transmission apparatus in performing the message/data processing steps performed on the service flow transmission apparatus side in any one of the first aspect and the possible implementations of the first aspect. For corresponding steps, refer to the descriptions in any one of the first aspect and the possible implementations of the first aspect. Details are not described herein again.

Optionally, the communications interface and the processor of the service flow transmission apparatus are coupled to each other.

Optionally, the service flow transmission apparatus may further include a memory configured to store code and data. The processor, the communications interface, and the memory are coupled to each other.

According to a seventh aspect, this application provides a communications apparatus. The communications apparatus may implement the method in any one of the second aspect or the possible implementations of the second aspect, and therefore can achieve the beneficial effects in any one of the second aspect or the possible implementations of the second aspect. The communications apparatus may be a core network element, or may be an apparatus that can support a core network element in implementing the method in any one of the second aspect or the possible implementations of the second aspect, for example, a chip applied to the core network element. The communications apparatus may implement the foregoing method using software or hardware, or by executing corresponding software using hardware.

In an example, the communications apparatus includes: an obtaining unit configured to obtain policy information of a service flow, where the policy information includes at least one of a steering mode of the service flow and a transmission method of the service flow, and a PDU session to which the service flow belongs supports a plurality of access technologies; and a sending unit configured to send the policy information to a terminal/user plane function network element.

In a possible implementation, the policy information further includes a multipath transmission algorithm.

In a possible implementation, for content of the multipath transmission algorithm, refer to the description in the second aspect. Details are not described herein again.

In a possible implementation, the sending unit is further configured to send indication information to the terminal (or the user plane function network element), where the indication information is used to indicate that an access technology used by the terminal (or the user plane function network element) to send the service flow is the same as an access technology used by the terminal (or the user plane function network element) to receive the service flow.

In a possible implementation, the obtaining unit is configured to receive, in a session management process, the policy information that is of the service flow and that is sent from a policy control network element. Alternatively, the obtaining unit is configured to receive, in a process in which the terminal/user plane function network element requests to register with a network, the policy information that is of the service flow and that is sent from a policy control network element.

In a possible implementation, the sending unit is further configured to send, to the terminal/user plane function network element, a plurality of addresses allocated to the terminal, and an access technology type corresponding to each of the plurality of addresses or a service type corresponding to each of the plurality of addresses.

In a possible implementation, the sending unit is configured to send, to the terminal/user plane function network element, a first address, a second address, a first access technology type corresponding to the first address, and a second access technology type corresponding to the second address; or the sending unit is configured to send a first address and a second address to the terminal/user plane function network element; or the sending unit is configured to send a first address, a second address, and type indication information to the terminal/user plane function network element, where the type indication information is used to indicate that one address selected from the first address and the second address corresponds to a first access technology type, and the other address corresponds to a second access technology type.

In a possible implementation, the sending unit is configured to send a first address, a second address, and a third address to the terminal/user plane function network element, where the first address corresponds to a first access technology type, the second address corresponds to a second access technology type, and the third address corresponds to the first access technology type and the second access technology type; or the sending unit is configured to send a first address, a second address, and a third address to the terminal/user plane function network element, where the first address corresponds to a first access technology type, and the second address corresponds to a second access technology type; or the sending unit is configured to send a first address, a second address, and a third address to the terminal/user plane function network element, where the first address corresponds to a first access technology type, the second address corresponds to a second access technology type, and the third address corresponds to a common address indication.

In a possible implementation, the sending unit is configured to send, to the terminal/user plane function network element, a first address, a second address, first type indication information corresponding to the first address, and second type indication information corresponding to the second address. The first type indication information is used to indicate that the first address corresponds to a first access technology type and a second access technology type, and the second type indication information is used to indicate that the second address corresponds to the first access technology type or the second access technology type. Alternatively, the first type indication information is used to indicate that the first address corresponds to a common service flow, and the second type indication information is used to indicate that the second address corresponds to a first service flow.

In a possible implementation, the sending unit is configured to send, to the terminal/user plane function network element, a first address, a second address, and second type indication information corresponding to the second address.

The second type indication information is used to indicate that the second address corresponds to a first service flow. Alternatively, the second type indication information is used to indicate that the second address corresponds to a first access technology type or a second access technology type.

For content of the first type indication information and the second type indication information, refer to the description in the second aspect. Details are not described herein again.

In another example, an embodiment of this application further provides a communications apparatus. The communications apparatus may be a core network element or a chip applied to the core network element. The communications apparatus includes a processor and a communications interface. The communications interface is configured to support the communications apparatus in performing the message/data receiving and sending steps performed on the communications apparatus side in any one of the second aspect and the possible implementations of the second aspect. The processor is configured to support the communications apparatus in performing the message/data processing steps performed on the communications apparatus side in any one of the second aspect and the possible implementations of the second aspect. For corresponding steps, refer to the descriptions in any one of the second aspect and the possible implementations of the second aspect. Details are not described herein again.

Optionally, the communications interface and the processor of the communications apparatus are coupled to each other.

Optionally, the communications apparatus may further include a memory configured to store code and data. The processor, the communications interface, and the memory are coupled to each other.

According to an eighth aspect, this application provides a service flow transmission apparatus. The service flow transmission apparatus may implement the method in any one of the third aspect or the possible implementations of the third aspect, and therefore can achieve the beneficial effects in any one of the third aspect or the possible implementations of the third aspect. The service flow transmission apparatus may be a terminal, or may be an apparatus that can support a terminal in implementing the method in any one of the third aspect or the possible implementations of the third aspect, for example, a chip applied to the terminal. The service flow transmission apparatus may implement the foregoing method using software or hardware, or by executing corresponding software using hardware.

In an example, the service flow transmission apparatus includes: an obtaining unit configured to obtain a plurality of addresses allocated by a core network element to a PDU session of the terminal, and an access technology type corresponding to each of the plurality of addresses or a service type corresponding to each of the plurality of addresses, where the PDU session supports a plurality of access technologies; and a transmission unit configured to transmit a service flow according to policy information based on the plurality of addresses when the access technology type corresponding to each address is obtained; or a transmission unit configured to: when the service type corresponding to each address is obtained, transmit a service flow based on the plurality of addresses and the service type corresponding to each of the plurality of addresses.

In a possible implementation, the service flow includes a first service flow transmitted using a first transmission method, the plurality of addresses include a first address and a second address, the first address corresponds to a first access technology type, the second address corresponds to a second access technology type. Additionally, the transmission unit is configured to transmit the first service flow according to the policy information using the first address and/or the second address.

In a possible implementation, the first transmission method includes one or more of an MPTCP method, an MPTCP proxy method, a TCP method, a TCP proxy method, a UDP method, a UDP proxy method, a QUIC method, a QUIC proxy method, an MP-QUIC method, or an MP-QUIC proxy method.

In a possible implementation, the obtaining unit is configured to obtain a first address, a first access technology type corresponding to the first address, a second address, and a second access technology type corresponding to the second address that are sent by the core network element.

In a possible implementation, the obtaining unit is configured to obtain a first address and a second address that are sent by the core network element.

In a possible implementation, the obtaining unit is configured to obtain a first address, a second address, and type indication information that are sent by the core network element. The type indication information is used to indicate that any address selected from the first address and the second address corresponds to a first access technology type, and the other address corresponds to a second access technology type.

In a possible implementation, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, the third address corresponds to the first access technology type and the second access technology type. Additionally, the transmission unit is configured to: transmit the first service flow according to the policy information using the first address and/or the second address; and/or transmit the second service flow according to the policy information using the third address.

In a possible implementation, the obtaining unit is configured to receive a first address, a second address, and a third address that are sent by the core network element, where the first address corresponds to a first access technology type, the second address corresponds to a second access technology type, and the third address corresponds to the first access technology type and the second access technology type.

In a possible implementation, the obtaining unit is configured to receive a first address, a second address, and a third address that are sent by the core network element, where the first address corresponds to a first access technology type, and the second address corresponds to a second access technology type.

In a possible implementation, the obtaining unit is configured to receive a first address, a second address, and a third address that are sent by the core network element, where the first address corresponds to a first access technology type, the second address corresponds to a second access technology type, and the third address corresponds to a common address indication.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type. Additionally, the transmission unit is configured to transmit the first service flow according to the policy information using the first address and/or the second address.

In a possible implementation, the service flow further includes a second service flow transmitted using a second transmission method, and the transmission unit is further configured to transmit the second service flow according to the policy information using the first address.

In a possible implementation, the transmission unit is configured to transmit the first service flow using the second address when it is determined that an access technology used to transmit the first service flow is an access technology indicated by an access technology type corresponding to the second address. Alternatively, the transmission unit is configured to transmit the first service flow using the first address when it is determined that an access technology used to transmit the first service flow is an access technology indicated by the first access technology type or the second access technology type, and is not an access technology indicated by an access technology type corresponding to the second address.

In a possible implementation, the service flow includes a first service flow transmitted using a first transmission method, the plurality of addresses include a first address and a second address, the first address corresponds to a common service flow, the second address corresponds to the first service flow. Additionally, the transmission unit is configured to transmit the first service flow using the first address and/or the second address.

In a possible implementation, the obtaining unit is further configured to obtain a first message, the first message is used to indicate that a first address corresponds to a first access technology type, and/or a second address corresponds to a second access technology type. Additionally, the transmission unit is further configured to determine, based on the first message, an access technology for transmitting a first service flow.

In a possible implementation, the service flow further includes a second service flow transmitted using a second transmission method, and the transmission unit is configured to transmit the second service flow using the first address.

In a possible implementation, the first transmission method includes one or more of an MPTCP method, an MPTCP proxy method, a UDP QUIC method, a UDP QUIC proxy method, a UDP MP-QUIC method, or an MP-QUIC proxy method. The second transmission method includes one or more of a TCP method, a TCP proxy method, a UDP method, or a UDP proxy method.

In a possible implementation, the obtaining unit is configured to obtain, using a receiving unit, a first address, a second address, first type indication information corresponding to the first address, and second type indication information corresponding to the second address that are sent by the core network element. The first type indication information is used to indicate a first access technology type and a second access technology type, and the second type indication information is used to indicate the first access technology type or the second access technology type. Alternatively, the first type indication information is used to indicate a common service flow, and the second type indication information is used to indicate a first service flow.

In a possible implementation, the obtaining unit is configured to obtain, using a receiving unit, a first address, a second address, and second type indication information corresponding to the second address that are sent by the core network element. The terminal determines that the first address corresponds to a first access technology type and a second access technology type, and determines that the second address corresponds to the first access technology type or the second access technology type.

For content of the first type indication information and the second type indication information, refer to the description in the second aspect. Details are not described herein again.

In a possible implementation, the apparatus provided in this embodiment of this application further includes a receiving unit configured to receive indication information from the core network element and that is used to determine a transmission method for transmitting the service flow.

It should be noted that in this embodiment of this application, when a sending network element (for example, a user plane function network element/session management network element) allocates a plurality of addresses to the PDU session of the terminal, if the sending network element sends the plurality of addresses to a receiving network element (for example, the terminal or a user plane function network element), but sends no access technology type/service type corresponding to each address, the receiving network element may determine to select a corresponding access technology type/service type for each of the plurality of addresses.

In any possible implementation of the eighth aspect, the service flow transmission apparatus may further perform any possible service flow transmission method in the sixth aspect.

In another example, an embodiment of this application further provides a service flow transmission apparatus. The service flow transmission apparatus may be a terminal or a chip applied to the terminal. The service flow transmission apparatus includes a processor and a communications interface. The communications interface is configured to support the service flow transmission apparatus in performing the message/data receiving and sending steps performed on the service flow transmission apparatus side in any one of the third aspect and the possible implementations of the third aspect. The processor is configured to support the service flow transmission apparatus in performing the message/data processing steps performed on the service flow transmission apparatus side in any one of the third aspect and the possible implementations of the third aspect. For corresponding steps, refer to the descriptions in any one of the third aspect and the possible implementations of the third aspect. Details are not described herein again.

Optionally, the communications interface and the processor of the service flow transmission apparatus are coupled to each other.

Optionally, the service flow transmission apparatus may further include a memory configured to store code and data. The processor, the communications interface, and the memory are coupled to each other.

According to a ninth aspect, this application provides a service flow transmission apparatus. The service flow transmission apparatus may implement the method in any one of the fourth aspect or the possible implementations of the fourth aspect, and therefore can achieve the beneficial effects in any one of the fourth aspect or the possible implementations of the fourth aspect. The service flow transmission apparatus may be a user plane function network element, or may be an apparatus that can support a user plane function network element in implementing the method in any one of the fourth aspect or the possible implementations of the fourth aspect, for example, a chip applied to the user plane function network element. The service flow transmission apparatus may implement the foregoing method using software or hardware, or by executing corresponding software using hardware.

In an example, the service flow transmission apparatus includes: an obtaining unit configured to obtain a plurality of addresses allocated to a PDU session of a terminal and an access technology type corresponding to each of the plurality of addresses, where the PDU session supports a plurality of access technologies; and a transmission unit configured to transmit a service flow according to policy information based on the access technology type corresponding to each of the plurality of addresses. Alternatively, the service flow transmission apparatus includes includes: an obtaining unit configured to obtain a plurality of addresses allocated to a PDU session of a terminal and a service type corresponding to each of the plurality of addresses; and a transmission unit configured to transmit a service flow based on the plurality of addresses and the service type corresponding to each of the plurality of addresses.

In a possible implementation, the policy information includes a steering mode and/or a transmission method of the service flow.

In a possible implementation, the service flow includes a first service flow transmitted using a first transmission method, the plurality of addresses include a first address and a second address, the first address corresponds to a first access technology type, the second address corresponds to a second access technology type. Additionally, the transmission unit is configured to send the first service flow to the terminal according to the policy information using the first address and/or the second address.

In a possible implementation, the first transmission method includes one or more of an MPTCP method, an MPTCP proxy method, a TCP method, a TCP proxy method, a UDP method, a UDP proxy method, a UDP QUIC method, a UDP QUIC proxy method, a UDP MP-QUIC method, or an MP-QUIC proxy method.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type. Additionally, the transmission unit is configured to send the first service flow to the terminal according to the policy information using the first address and/or the second address.

In a possible implementation, the service flow further includes a second service flow transmitted using a second transmission method, and the transmission unit is configured to transmit the second service flow according to the policy information using the first address.

In a possible implementation, the transmission unit is configured to transmit the first service flow using the second address when a processing unit determines that an access technology used to transmit the first service flow is an access technology indicated by an access technology type corresponding to the second address. Alternatively, the transmission unit is configured to transmit the first service flow using the first address when a processing unit determines that an access technology used to transmit the first service flow is of the first access technology type or the second access technology type, and is not of an access technology type corresponding to the second address.

In a possible implementation, the service flow includes a first service flow transmitted using a first transmission method, the plurality of addresses include a first address and a second address, the first address corresponds to a common service flow, the second address corresponds to the first service flow. Additionally, the transmission unit is configured to send the first service flow to the terminal using the first address and/or the second address.

In a possible implementation, the service flow further includes a second service flow transmitted using a second transmission method, and the transmission unit is further configured to transmit the second service flow using the first address.

In a possible implementation, the obtaining unit is further configured to obtain a first message, the first message is used to indicate that a first address corresponds to a first access technology type, and/or a second address corresponds to a second access technology type. Additionally, the transmission unit is further configured to determine, based on the first message, an access technology for transmitting a first service flow. This situation is applicable to a case in which the terminal determines that the first address corresponds to a common service flow, and the second address corresponds to the first service flow.

In a possible implementation, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, the third address corresponds to the first access technology type and the second access technology type. Additionally, the transmission unit is configured to: send the first service flow to the terminal according to the policy information using the first address and/or the second address; and/or send the second service flow to the terminal according to the policy information using the third address.

In a possible implementation, the apparatus provided in this embodiment of this application further includes: a receiving unit configured to receive a service flow to be sent to the terminal; a determining unit configured to determine that the service flow to be sent to the terminal is transmitted using a first transmission method; and a processing unit configured to replace, with a first address and/or a second address, a destination address of the service flow to be sent to the terminal.

In a possible implementation, the plurality of addresses include a first address and a second address, the first address corresponds to a first access technology type, and the second address corresponds to a second access technology type. Additionally, the receiving unit is further configured to receive a service flow sent by the terminal, where a source address of the service flow sent by the terminal is the first address and/or the second address; and the processing unit is further configured to replace, with a fourth address according to the policy information, the source address of the service flow sent by the terminal.

In a possible implementation, the fourth address is an address of the user plane function network element or a third address allocated to the PDU session of the terminal.

In a possible implementation, the plurality of addresses include a first address and a second address, the first address corresponds to a first access technology type and a second access technology type, and the second address corresponds to the first access technology type or the second access technology type. Additionally, the receiving unit is further configured to receive a service flow sent by the terminal, where a source address of the service flow sent by the terminal is the first address and/or the second address; and the processing unit is further configured to replace, with the first address according to the policy information, the source address of the service flow sent by the terminal.

In a possible implementation, the service flow includes a first service flow transmitted using a first transmission method and a second service flow transmitted using a second transmission method, the plurality of addresses include a first address, a second address, and a third address, the first address corresponds to a first access technology type, the second address corresponds to a second access technology type, and the third address corresponds to the first access technology type and the second access technology type. The receiving unit is further configured to receive a service flow sent by the terminal, where the service flow sent by the terminal includes the first service flow transmitted using the first transmission method, and a source address of the first service flow is the first address and/or the second address. The processing unit is further configured to replace the source address of the first service flow with a fourth address according to the policy information.

In a possible implementation, the fourth address is an address of the user plane function network element or a third address allocated to the PDU session of the terminal.

In a possible implementation, the plurality of addresses include a first address and a second address, the first address corresponds to a first access technology type and a second access technology type, and the second address corresponds to the first access technology type or the second access technology type. The receiving unit is further configured to receive a service flow sent by the terminal, where a source address of the service flow sent by the terminal is the first address and/or the second address. The processing unit is further configured to replace, with the first address according to the policy information, the source address of the service flow sent by the terminal.

In a possible implementation, the first transmission method includes one or more of an MPTCP method, an MPTCP proxy method, a UDP QUIC method, a UDP QUIC proxy method, a UDP MP-QUIC method, or an MP-QUIC proxy method. The second transmission method includes one or more of a TCP method, a TCP proxy method, a UDP method, or a UDP proxy method.

In a possible implementation, the obtaining unit is configured to obtain, from a session management network element, the plurality of addresses allocated by the session management network element to the PDU session of the terminal and the access technology type corresponding to each of the plurality of addresses. Alternatively, the obtaining unit is configured to obtain the plurality of addresses corresponding to the PDU session of the terminal and the service type corresponding to each of the plurality of addresses.

In a possible implementation, in the service flow transmission apparatus provided in this embodiment of this application, the receiving unit is further configured to receive a first address, a second address, and a third address that are sent by a session management network element, where the first address corresponds to a first access technology type, the second address corresponds to a second access technology type, and the third address corresponds to the first access technology type and the second access technology type; or the receiving unit is further configured to receive a first address, a second address, and a third address that are sent by a session management network element, where the first address corresponds to a first access technology type, and the second address corresponds to a second access technology type; or the receiving unit is further configured to receive a first address, a second address, and a third address that are sent by a session management network element, where the first address corresponds to a first access technology type, the second address corresponds to a second access technology type, and the third address corresponds to a common address indication.

In a possible implementation, the service flow includes a first service flow transmitted using a first transmission method, the plurality of addresses include a first address and a second address, the first address corresponds to a common service flow, the second address corresponds to the first service flow. Additionally, the transmission unit is configured to transmit the first service flow using the first address and/or the second address.

In a possible implementation, the service flow further includes a second service flow transmitted using a second transmission method, and the transmission unit is configured to transmit the second service flow using the first address.

In a possible implementation, the service flow includes a first service flow transmitted using a first transmission method, the plurality of addresses include a first address and a second address, the first address corresponds to a first access technology type and a second access technology type, the second address corresponds to the first access technology type or the second access technology type. Additionally, the transmission unit is configured to transmit the first service flow using the first address and/or the second address.

In a possible implementation, the service flow further includes a second service flow transmitted using a second transmission method, and the transmission unit is configured to transmit the second service flow using the first address.

In a possible implementation, the obtaining unit is configured to receive a first address, a second address, first type indication information corresponding to the first address, and second type indication information corresponding to the second address that are sent by the core network element. The first type indication information is used to indicate a first access technology type and a second access technology type, and the second type indication information is used to indicate that the second address corresponds to the first access technology type or the second access technology type.

In a possible implementation, the obtaining unit is configured to receive a first address, a second address, and second type indication information corresponding to the second address that are sent by the core network element. The user plane function network element determines that the first address corresponds to a first access technology type and a second access technology type, and determines that the second address corresponds to the first access technology type or the second access technology type.

For content of the first type indication information and the second type indication information, refer to the description in the second aspect. Details are not described herein again.

In any possible implementation of the ninth aspect, the user plane function network element may further perform an operation of the service flow transmission apparatus in any implementation of the first aspect.

In another example, an embodiment of this application further provides a service flow transmission apparatus. The service flow transmission apparatus may be a user plane function network element or a chip applied to the user plane function network element. The service flow transmission apparatus includes a processor and a communications interface. The communications interface is configured to support the service flow transmission apparatus in performing the message/data receiving and sending steps performed on the service flow transmission apparatus side in any one of the fourth aspect and the possible implementations of the fourth aspect. The processor is configured to support the service flow transmission apparatus in performing the message/data processing steps performed on the service flow transmission apparatus side in any one of the fourth aspect and the possible implementations of the fourth aspect. For corresponding steps, refer to the descriptions in any one of the fourth aspect and the possible implementations of the fourth aspect. Details are not described herein again.

Optionally, the communications interface and the processor of the service flow transmission apparatus are coupled to each other.

Optionally, the service flow transmission apparatus may further include a memory configured to store code and data. The processor, the communications interface, and the memory are coupled to each other.

According to a tenth aspect, this application provides a communications apparatus. The communications apparatus may implement the method in any one of the fifth aspect or the possible implementations of the fifth aspect, and therefore can achieve the beneficial effects in any one of the fifth aspect or the possible implementations of the fifth aspect. The communications apparatus may be a session management network element, or may be an apparatus that can support a session management network element in implementing the method in any one of the fifth aspect or the possible implementations of the fifth aspect, for example, a chip applied to the session management network element. The communications apparatus may implement the foregoing method using software or hardware, or by executing corresponding software using hardware.

In an example, a receiving unit is configured to receive indication information used to indicate a transmission method of a service flow, and a PDU session to which the service flow belongs supports a plurality of access technologies. A determining unit is configured to select, based on the indication information, a user plane function network element having a transmission method function.

In a possible implementation, the apparatus provided in this embodiment of this application further includes an obtaining unit configured to obtain, based on the indication information, a plurality of addresses allocated to a PDU session of a terminal, and an access technology type corresponding to each of the plurality of addresses or a service type corresponding to each of the plurality of addresses.

In a possible implementation, the apparatus provided in this embodiment of this application further includes a sending unit configured to: send, to the user plane function network element/terminal, a third address and a first access technology type and a second access technology type that correspond to the third address; or send, by the session management network element, a third address and a common address indication to the user plane function network element/terminal; or send, by the session management network element, a third address to the user plane function network element/terminal.

For an implementation in which the sending unit sends the plurality of addresses and the access technology type corresponding to each of the plurality of addresses or the service type corresponding to each of the plurality of addresses, refer to the implementation in which the sending unit sends, to the terminal, the plurality of addresses allocated to the PDU session, and the access technology type corresponding to each of the plurality of addresses or the service type corresponding to each of the plurality of addresses in the seventh aspect. Details are not described herein again.

In a possible implementation, the apparatus provided in this embodiment of this application further includes a sending unit configured to send, to the user plane function network element, the indication information used to indicate the transmission method of the service flow.

In another example, an embodiment of this application further provides a communications apparatus. The communications apparatus may be a session management network element or a chip applied to the session management network element. The communications apparatus includes a processor and a communications interface. The communications interface is configured to support the communications apparatus in performing the message/data receiving and sending steps performed on the communications apparatus side in any one of the fifth aspect and the possible implementations of the fifth aspect. The processor is configured to support the communications apparatus in performing the message/data processing steps performed on the communications apparatus side in any one of the fifth aspect and the possible implementations of the fifth aspect. For corresponding steps, refer to the descriptions in any one of the fifth aspect and the possible implementations of the fifth aspect. Details are not described herein again.

Optionally, the communications interface and the processor of the communications apparatus are coupled to each other.

Optionally, the communications apparatus may further include a memory configured to store code and data. The processor, the communications interface, and the memory are coupled to each other.

According to an eleventh aspect, this application provides a computer-readable storage medium. The computer-readable storage medium stores an instruction. When the instruction is run on a computer, the computer is enabled to perform the service flow transmission method described in the first aspect or the possible implementations of the first aspect.

According to a twelfth aspect, this application provides a computer-readable storage medium. The computer-readable storage medium stores an instruction. When the instruction is run on a computer, the computer is enabled to perform the communications method described in the second aspect or the possible implementations of the second aspect.

According to a thirteenth aspect, this application provides a computer-readable storage medium. The computer-readable storage medium stores an instruction. When the instruction is run on a computer, the computer is enabled to perform the service flow transmission method described in the third aspect or the possible implementations of the third aspect.

According to a fourteenth aspect, this application provides a computer-readable storage medium. The computer-readable storage medium stores an instruction. When the instruction is run on a computer, the computer is enabled to perform the service flow transmission method described in the fourth aspect or the possible implementations of the fourth aspect.

According to a fifteenth aspect, this application provides a computer-readable storage medium. The computer-readable storage medium stores an instruction. When the instruction is run on a computer, the computer is enabled to perform the communications method described in the fifth aspect or the possible implementations of the fifth aspect.

According to a sixteenth aspect, this application provides a computer program product including an instruction. When the instruction is run on a computer, the computer is enabled to perform the service flow transmission method described in the first aspect or the possible implementations of the first aspect.

According to a seventeenth aspect, this application provides a computer program product including an instruction. When the instruction is run on a computer, the computer is enabled to perform the communications method described in the second aspect or the possible implementations of the second aspect.

According to an eighteenth aspect, this application provides a computer program product including an instruction. When the instruction is run on a computer, the computer is enabled to perform the service flow transmission method described in the third aspect or the possible implementations of the third aspect.

According to a nineteenth aspect, this application provides a computer program product including an instruction. When the instruction is run on a computer, the computer is enabled to perform the service flow transmission method described in the fourth aspect or the possible implementations of the fourth aspect.

According to a twentieth aspect, this application provides a computer program product including an instruction. When the instruction is run on a computer, the computer is enabled to perform the communications method described in the fifth aspect or the possible implementations of the fifth aspect.

According to a twenty-first aspect, an embodiment of this application provides a chip. The chip includes a processor and an interface circuit. The interface circuit is coupled to the processor. The processor is configured to run a computer program or an instruction, to implement the service flow transmission method described in the first aspect or the possible implementations of the first aspect. The interface circuit is configured to communicate with a module other than the chip.

According to a twenty-second aspect, an embodiment of this application provides a chip. The chip includes a processor and an interface circuit. The interface circuit is coupled to the processor. The processor is configured to run a computer program or an instruction, to implement the communications method described in the second aspect or the possible implementations of the second aspect. The interface circuit is configured to communicate with a module other than the chip.

According to a twenty-third aspect, an embodiment of this application provides a chip. The chip includes a processor and an interface circuit. The interface circuit is coupled to the processor. The processor is configured to run a computer program or an instruction, to implement the service flow transmission method described in the third aspect or the possible implementations of the third aspect. The interface circuit is configured to communicate with a module other than the chip.

According to a twenty-fourth aspect, an embodiment of this application provides a chip. The chip includes a processor and an interface circuit. The interface circuit is coupled to the processor. The processor is configured to run a computer program or an instruction, to implement the service flow transmission method described in the fourth aspect or the possible implementations of the fourth aspect. The interface circuit is configured to communicate with a module other than the chip.

According to a twenty-fifth aspect, an embodiment of this application provides a chip. The chip includes a processor and an interface circuit. The interface circuit is coupled to the processor. The processor is configured to run a computer program or an instruction, to implement the communications method described in the fifth aspect or the possible implementations of the fifth aspect. The interface circuit is configured to communicate with a module other than the chip.

According to a twenty-sixth aspect, an embodiment of this application provides a communications system, and the communications system includes the service flow transmission apparatus provided in the sixth aspect or the possible implementations of the sixth aspect, and the communications apparatus provided in the seventh aspect or the possible implementations of the seventh aspect.

According to a twenty-seventh aspect, an embodiment of this application provides a communications system, and the communications system includes the service flow transmission apparatus provided in the eighth aspect or the possible implementations of the eighth aspect, the service flow transmission apparatus provided in the ninth aspect or the possible implementations of the ninth aspect, and the communications apparatus provided in the tenth aspect or the possible implementations of the tenth aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system provided above, refer to beneficial effects of a corresponding solution in the corresponding method provided above. Details are not described herein again.

BRIEF DESCRIPTION OF DRAWINGS

FIG. 5 to FIG. 14A and FIG. 14B are schematic flowcharts of service flow transmission methods according to embodiments of this application;

DESCRIPTION OF EMBODIMENTS

It should be noted that, in the embodiments of this application, the word "example", "for example", or the like is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example", or the like is intended to present a related concept in a specific manner.

In this application, "at least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one (piece) of the following" or a similar expression thereof means any combination of these items, including any combination of singular items (pieces) or plural items (pieces). For example, at least one (piece) of a, b, or c may represent a, b, c, a combination of a and b, a combination of a and c, a combination of b and c, or a combination of a, b, and c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

Figure 1:
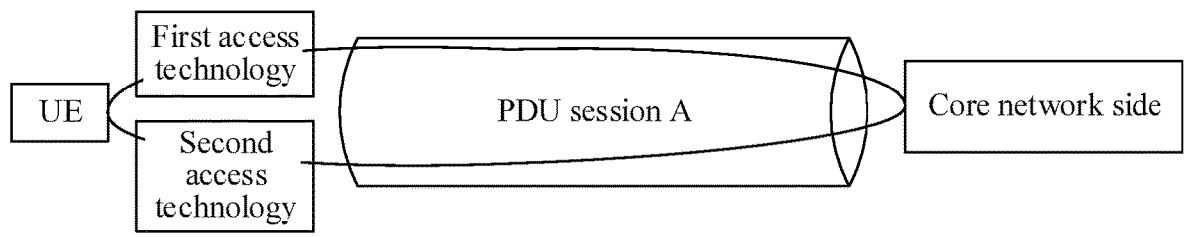
FIG. 1 is a schematic diagram of a multi-access PDU session.
Figure 2:
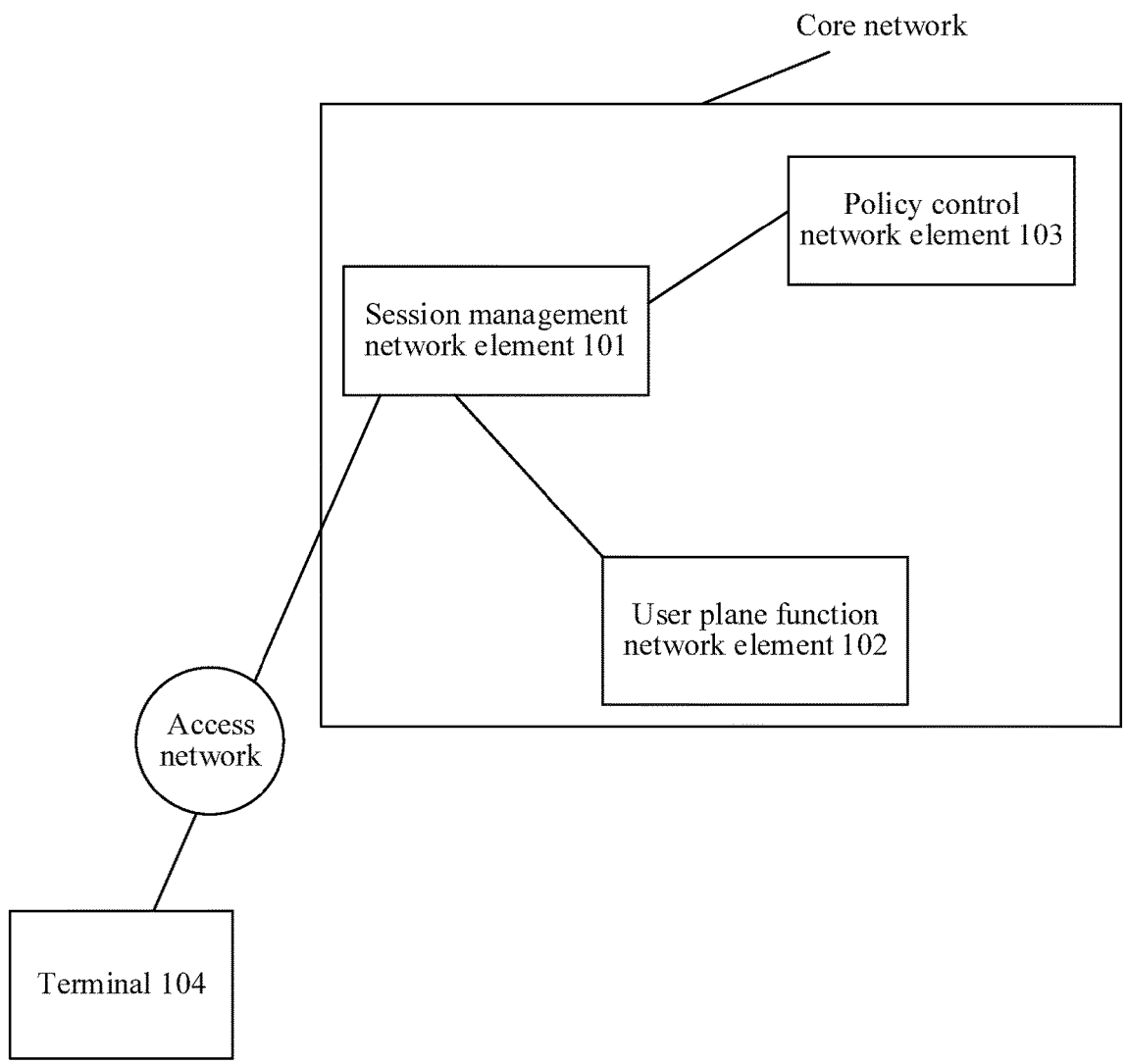
FIG. 2 is a schematic diagram of a communications system according to an embodiment of this application.

FIG. 2 is a schematic diagram of a communications system according to an embodiment of this application. The communications system includes a core network, an access network, and one or more terminals 104. The one or more terminals 104 (FIG. 2 shows only one terminal) access the core network using the access network. The core network includes the following network elements: a session management network element 101, one or more user plane function network elements 102 (FIG. 2 shows only one user plane function network element) connected to the session management network element 101, and a policy control network element 103 connected to the session management network element 101.

The access network may be an access network device using a plurality of access technologies.

When the terminal 104 accesses a wireless network using different access technologies, the terminal 104 may be connected to a core network device using different access network devices.

Optionally, in this embodiment of this application, there is a session between at least one of the one or more terminals 104 and the user plane function network element 102, and the session may support a plurality of access technologies. For example, the plurality of access technologies are a first access technology and a second access technology. The session may be accessed using the first access technology, or may be accessed using the second access technology.

The first access technology in this embodiment of this application may be an access technology that complies with the 3GPP standard specification, for example, a 3rd Generation Partnership Project (3GPP) access technology, or for example, an access technology used in a Long-Term Evolution (LTE), $2^{nd}$ generation (2G), $3^{rd}$ generation (3G), $4^{th}$ generation (4G), or 5G system. An access network using the 3GPP access technology is referred to as a radio access network (RAN). For example, the terminal 104 may use the 3GPP access technology to access a wireless network using an access network device in a 2G, 3G, 4G, or 5G system.

The second access technology may be a wireless access technology not defined in the 3GPP standard specification, and for example, is referred to as a non-3GPP access technology. The non-3GPP access technology may be an untrusted non-3GPP access technology, or may be a trusted non-3GPP access technology. The non-3GPP access technology may include Wi-Fi, worldwide interoperability for microwave access (WiMAX), code division multiple access (CDMA), a wireless local area network (WLAN), a fixed network technology, a wired technology, or the like. The terminal 104 may access a network using an air interface technology represented by Wi-Fi, and an access network device may be an access point (AP).

In this embodiment of the present disclosure, the terminal may be distributed in a wireless network. Each terminal may be static or moving.

In this embodiment of this application, all of the session management network element 101, the user plane function network element 102, and the policy control network element 103 are network elements in a core network element, and may be collectively referred to as the core network element.

The core network element is mainly responsible for packet data forwarding, quality of service (QoS) control, charging information statistics collection, and the like (for example, serving as the user plane function network element), and is mainly responsible for user registration authentication, mobility management, and delivery of a data packet forwarding policy, a QoS control policy, and the like to the user plane function network element (for example, serving as the session management network element).

The session management network element is responsible for establishing a corresponding session connection (for example, a PDU session) on a network side when a user initiates a service, providing a specific service for the user, and especially delivering a data packet forwarding policy, a QoS policy, and the like to the user plane function network element using an interface between the session management network element and the user plane function network element.

Figure 3:
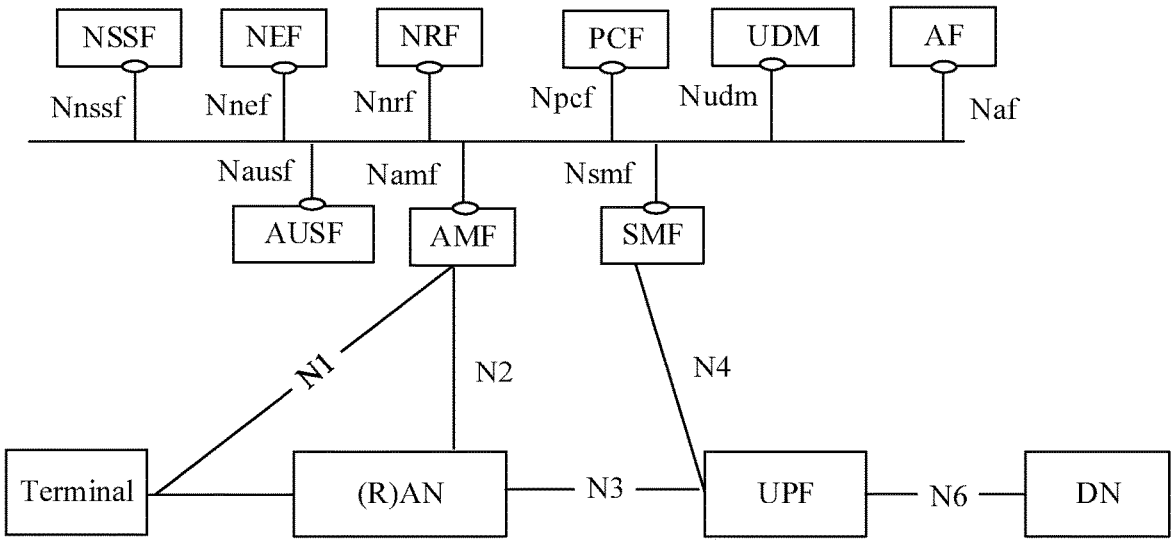
FIG. 3 is a schematic diagram of a 5G network architecture according to an embodiment of this application.

If the communications system shown in FIG. 2 is applied to a 5G network, as shown in FIG. 3, a network element or an entity corresponding to the session management network element 101 may be a session management function (SMF) network element, and the user plane function network element is a user plane function (UPF) network element in 5G. The policy control network element may be a policy control function (PCF) network element.

In addition, as shown in FIG. 3, the 5G network may further include an access and mobility management function (AMF) network element, an application function (AF) network element, an access network device (for example, an access network (AN)) that may also be referred to as a radio access network (RAN) device, an authentication server function (AUSF) network element, a unified data management (UDM) network element, a network slice selection function (NSSF) network element, a network exposure function (NEF) network element, a network repository function (NRF) network element, a data network (DN), and the like. This is not specifically limited in this embodiment of this application.

The terminal communicates with the AMF network element using an N1 interface (N1). The AMF network element communicates with the SMF network element using an N11 interface (N11). The SMF network element communicates with one or more UPF network elements using an N4 interface (N4). Any two of the one or more UPF network elements communicate with each other using an N9 interface (N9). The UPF network element communicates with the data network (DN) using an N6 interface (N6). The terminal accesses a network using the access network device (for example, the RAN device). The access network device communicates with the AMF network element using an N2 interface (N2). The SMF network element communicates with the PCF network element using an N7 interface (N7), and the PCF network element communicates with the AF network element using an N5 interface. The access network device communicates with the UPF network element using an N3 interface (N3). Any two or more AMF network elements communicate with each other using an N14 interface (N14). The SMF network element communicates with the UDM network element using an N10 interface (N10). The AMF network element communicates with the AUSF network element using an N12 interface (N12). The AUSF network element communicates with the UDM network element using an N13 interface (N13). The AMF network element communicates with the UDM network element using an N8 interface (N8).

It should be noted that names of the interfaces between the network elements in FIG. 3 are only examples, and the interfaces may have other names during implementation. This is not specifically limited in this embodiment of this application.

It should be noted that the access network device, the AF network element, the AMF network element, the SMF network element, the AUSF network element, the UDM network element, the UPF network element, the PCF network element, and the like in FIG. 3 are merely names, and the names do not constitute any limitation on the devices. In a 5G network and another future network, network elements corresponding to the access network device, the AF network element, the AMF network element, the SMF network element, the AUSF network element, the UDM network element, the UPF network element, and the PCF network element may have other names. This is not specifically limited in this embodiment of this application. For example, the UDM network element may be replaced with a home subscriber server (HSS), a user subscription database (USD), a database entity, or the like. This is described herein, and details are not described below again.

For example, the access network device in this embodiment of this application is a device that accesses a core network, for example, a base station, a broadband network gateway (BNG), an aggregation switch, or a non-3GPP access network device. The base station may include base stations in various forms such as a macro base station, a micro base station (also referred to as a small cell), a relay station, and an access point.

For example, the AMF network element in this embodiment of this application may be further responsible for functions such as a registration procedure during access of the terminal, location management during movement of the terminal, and lawful interception. This is not specifically limited in this embodiment of this application.

For example, the SMF network element in this embodiment of this application is configured to perform session management, including session-related control functions such as session establishment, session modification, session release, Internet Protocol (IP) address allocation and management of the terminal, UPF network element selection and control, and lawful interception.

For example, in addition to the function of the user plane function network element shown in FIG. 3, the UPF network element in this embodiment of this application may further implement user plane functions of a serving gateway (SGW) and a packet data network gateway (PGW). Alternatively, the UPF network element may be a software-defined networking (SDN) switch. This is not specifically limited in this embodiment of this application.

The AUSF network element is an authentication server function, and is mainly responsible for performing authentication on the terminal, and determining validity of the terminal. For example, authentication is performed on the terminal based on user subscription data of the terminal.

The UDM network element is a unified user data manager, and is mainly configured to store subscription data of the terminal. In addition, the UDM network element further includes functions such as authentication, terminal identifier information processing, and subscription management. This is not specifically limited in this embodiment of this application.

The PCF network element is mainly configured to deliver a service-related policy to the AMF network element or the SMF network element.

The AF network element sends an application-related requirement to the PCF network element, such that the PCF network element generates a corresponding policy.

The DN provides a service for the terminal, for example, provides a mobile operator service, an internet service, or a third-party service.

The PDU session in this embodiment of this application refers to a data transmission channel established by the session management network element for connecting the terminal 104 and the UPF network element to enable the terminal 104 to reach the DN. Network elements related to the data transmission channel include the terminal, the access network device, and the UPF network element selected by the SMF network element for the session. The data transmission channel includes links between a plurality of pairs of adjacent network elements, for example, includes a link between the terminal and the access network device, a link between the access network device and the UPF network element, and a link between UPF network elements.

The terminal is a device that provides a user with voice and/or data connectivity, for example, a handheld device or a vehicle-mounted device with a wireless connection function. The terminal may also be referred to as a user equipment (UE), an access terminal, a user unit, a user station, a mobile station, a mobile console (Mobile), a remote station, a remote terminal, mobile equipment, a user terminal, wireless telecom equipment, a user agent, or a user apparatus. The terminal may be a station (STA) in a wireless local area network (WLAN); or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal in a next generation communications system (for example, a 5G communications network), a terminal in a future evolved public land mobile network (PLMN), or the like. 5G may also be referred to as new radio (NR).

For example, in this embodiment of this application, the terminal may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or some functions without depending on smartphones, such as smart watches or smart glasses, and devices that focus on only one type of application function and need to work with other devices such as smartphones, such as various smart bands or smart jewelry for monitoring physical signs.

Figure 4:
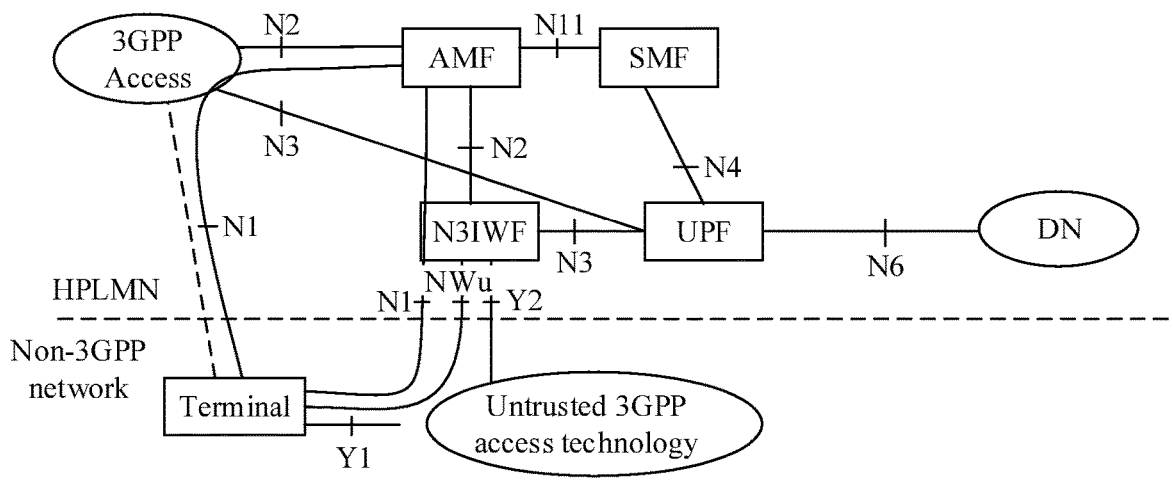
FIG. 4 is a schematic diagram in which a terminal accesses a network using a plurality of access technologies according to an embodiment of this application.

FIG. 4 is a schematic diagram of an architecture in which a terminal accesses a network using a plurality of access technologies according to an embodiment of this application, for example, an architecture in which the terminal uses both a 3GPP access technology and a non-3GPP access technology. As shown in FIG. 4, the terminal may be connected to an AMF network element using both the 3GPP access technology and the non-3GPP access technology.

For example, as shown in FIG. 4, when accessing the AMF network element using the non-3GPP access technology, the terminal may access the AMF network element using a non-3GPP interworking function (N3IWF) entity. The terminal selects a same AMF network element when 3GPP access technology and non-3GPP access technology belong to a same PLMN, or selects different AMF network elements when 3GPP access technology and non-3GPP access technology belong to different PLMNs.

The AMF network element selects an SMF network element, and may select different SMF network elements for different PDU sessions, but needs to select a same SMF network element for a same PDU session.

The SMF network element may select a UPF network element for a PDU session, and one PDU session may have a plurality of UPF network elements. Therefore, the SMF network element may select a plurality of UPF network elements to create a tunnel connection for a PDU session.

An AUSF network element and an authentication repository function (ARPF)/a UDM network element form a home public land mobile network (HPLMN). When accessing a network using different access technologies, the terminal may have different visited public land mobile networks (VPLMNs), or may have a same visited public land mobile network. For functions of the network elements shown in FIG. 4, refer to the foregoing embodiments. Details are not described herein again in this application.

In this embodiment of this application, a service flow transmitted using a UDP method may be briefly referred to as a UDP service flow, and a service flow transmitted using an MPTCP method is briefly referred to as an MPTCP service flow. Similarly, a same description is used for a service flow transmitted using another method.

It should be noted that, a communications method/a service flow transmission method in the embodiments of this application may be performed by a network element to which an apparatus corresponding to the communications method/the service flow transmission method is applied, or may be performed by a chip in the network element to which the apparatus corresponding to the communications method/the service flow transmission method is applied. For example, the service flow transmission method may be performed by a terminal, or may be performed by a chip in the terminal. An example in which the communications method/the service flow transmission method is performed by a network element corresponding to the communications method/the service flow transmission method is used in the following embodiments.

Embodiment 1

Figure 5:
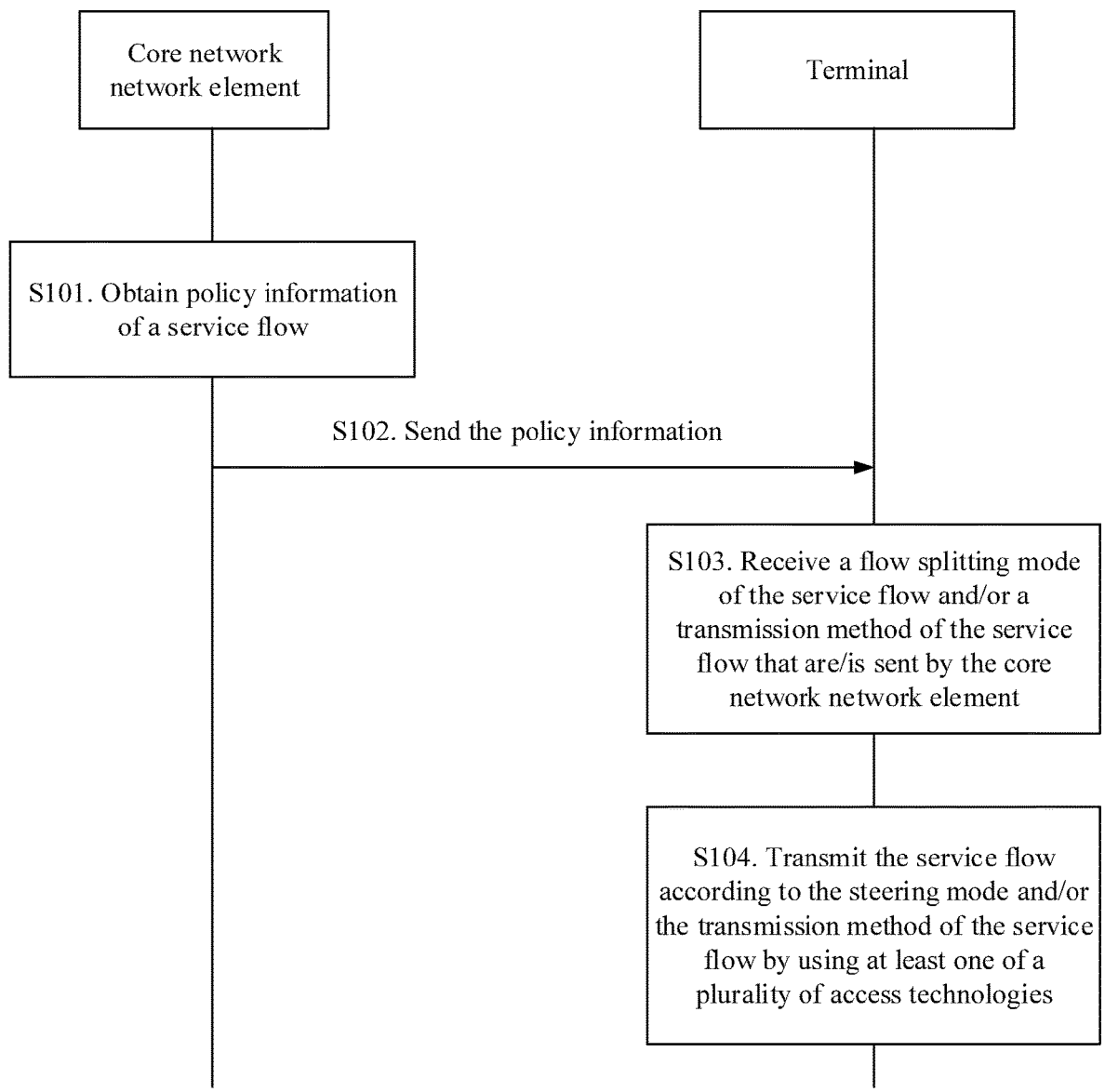

FIG. 5 shows a procedure of interaction in a service flow transmission method and a communications method according to an embodiment of this application. The method includes the following steps.

S101. A core network element obtains policy information of a service flow, where the policy information includes at least one of a steering mode of the service flow and a transmission method of the service flow, and a PDU session to which the service flow belongs supports a plurality of access technologies.

For example, that the policy information includes at least one of a steering mode of the service flow and a transmission method of the service flow may be indicated as the following meaning: The policy information includes the steering mode of the service flow and the transmission method of the service flow; or the policy information includes the steering mode of the service flow; or the policy information includes the transmission method of the service flow.

In a possible implementation, the core network element may be a session management network element.

In a possible implementation, S101 may be implemented in the following manner: The core network element receives, in a session management process, the policy information that is of the service flow from a policy control network element.

For example, the session management process may be a PDU session establishment procedure or a PDU session update (which may also be referred to as PDU session modification) procedure.

For example, the core network element receives a session management request message (for example, a PDU session establishment request message or a PDU session update request message) sent by a terminal in the session management process. The core network element sends a policy request message to the policy control network element based on at least one of first indication information and second indication information that are carried in the session management request message. The policy request message includes a flow description parameter and third indication information. The policy control network element sends the transmission method of the service flow to the core network element based on the policy request message.

Optionally, the policy control network element may further send a flow steering policy to the core network element, and the flow steering policy includes at least one access technology indication. The access technology indication is used to indicate an access technology for transmitting the service flow.

The first indication information is used to indicate that the terminal supports at least one of a first transmission method capability and a second transmission method capability. The second indication information and the third indication information are used to request to use at least one of a first transmission method and a second transmission method to transmit the service flow.

In this embodiment of this application, if the terminal can use a transmission method to transmit the service flow, it indicates that the terminal has a capability of transmitting the service flow using the transmission method. For example, if the terminal can use the first transmission method to transmit the service flow, it indicates that the terminal has a first transmission capability. If the terminal can use the second transmission method to transmit the service flow, it indicates that the terminal has a second transmission capability.

For example, the first transmission capability is a multipath transmission control protocol (MPTCP) capability, and the second transmission capability is a user datagram protocol (UDP) capability.

For example, the second indication information and the third indication information are used to request to use at least one of a multipath transmission control protocol (MPTCP) method, an MPTCP proxy method, a TCP method, a TCP proxy method, a UDP method, a UDP proxy method, a QUIC method, a QUIC proxy method, an MP-QUIC method, or an MP-QUIC proxy method to transmit the service flow.

For example, if the first indication information is used to indicate that the terminal supports the first transmission capability, the second indication information or the third indication information is used to indicate that the service flow is requested to be transmitted using at least one of an MPTCP method, an MPTCP proxy method, a QUIC method, a QUIC proxy method, an MP-QUIC method, or an MP-QUIC proxy method.

For example, if the first indication information is used to indicate that the terminal supports the second transmission capability, the second indication information or the third indication information is used to request to use at least one of a TCP method, a TCP proxy method, a UDP method, or a UDP proxy method to transmit the service flow.

For example, the transmission method of the service flow includes one or more of the following: the MPTCP method, the MPTCP proxy method, the TCP method, the TCP proxy method, the UDP method, the UDP proxy method, the QUIC method, the QUIC proxy method, the MP-QUIC method, or the MP-QUIC proxy method.

In another possible implementation, S101 may be implemented in the following manner: The core network element receives, in a process in which a terminal requests to register with a network, the policy information that is of the service flow and that is sent by a policy control network element.

For example, the terminal requests to register with the network using at least one of a plurality of access technologies. After the terminal successfully registers with a network side, when the policy control network element sends the policy information including the at least one of the steering mode and the transmission method of the service flow to the terminal using the core network element, the core network element can obtain the policy information of the service flow.

For example, the policy information of the service flow refers to a flow description parameter and policy information corresponding to the flow description parameter, and may refer to at least one of a combination including the flow description parameter and the steering mode, or a combination including the flow description parameter and the transmission method of the service flow.

The flow description parameter is used to determine the service flow. For example, the flow description parameter may include one or more of the following: quintuple information (for example, at least one of a source IP address, a destination IP address, a source port number, a destination port number, and a protocol) or an application identifier (ID) of the service flow.

For example, the steering mode includes one or more of the following.

(a) An access technology preference indication is used to indicate that the service flow is preferably transmitted using a link corresponding to an access technology associated with the access technology preference indication.

For example, the access technology preference indication indicates a 3GPP access technology or a non-3GPP access technology. When the access technology preferably used for transmission is unavailable, the service flow may be transmitted using a link corresponding to another access technology. For example, the access technology preferably used for transmission is the 3GPP access technology. When the 3GPP access technology is unavailable, the non-3GPP access technology may be used to transmit the service flow.

(b) An optimal link-based flow steering indication is used to indicate that the service flow is preferably transmitted using an optimal link, where the optimal link is a link whose link state is better than that of another link.

For example, the optimal link-based flow steering indication may include at least one of parameters such as an optimal link indication, a minimum link latency indication, a minimum round-trip time (RTT) indication, a minimum link load indication, a maximum link bandwidth indication, and a maximum access signal indication.

The terminal may determine the optimal link using the foregoing parameters. For example, the optimal link may be a link with a shortest latency, a link with lowest load, or a link with highest access signal strength.

(c) A link load balancing-based flow steering indication is used to indicate that the service flow is transmitted according to a link load balancing policy.

The link load balancing-based flow steering indication includes a load balancing indication.

(d) An access technology and flow steering ratio indication is used to indicate that the service flow is transmitted based on a flow steering ratio corresponding to an access technology.

For example, when the flow steering ratio is a specific value, the terminal transmits the service flow based on the flow steering ratio corresponding to the access technology. For example, if the flow steering ratio indicates that a flow steering ratio of a 3GPP access technology is 20%, and a flow steering ratio of a non-3GPP access technology is 80%, 20% data packets in the service flow are transmitted using the 3GPP access technology, and 80% data packets in the service flow are transmitted using the non-3GPP access technology. When the flow steering ratio is null or no flow steering ratio is included, it indicates that the service flow is steered based on link load balancing.

(e) A redundant transmission indication is used to indicate that a same data packet in the service flow is simultaneously transmitted using different access technologies.

S102. The core network element sends the policy information to the terminal or a user plane function network element.

In an example, the core network element sends the policy information to the terminal in the session management process.

The core network element sends, to the terminal based on a PDU session management request message of the terminal, a PDU session management response message that carries at least one of the flow steering policy and the transmission method of the service flow. For example, the PDU session management request message may be a PDU session establishment request message or a PDU session update request message.

For example, the PDU session management response message may be a PDU session establishment accept message or a PDU session update success message.

In another example, in a process in which the terminal successfully registers with the network, an access and mobility management network element may send, to the terminal using a non-access stratum (NAS) transmission message, at least one of the transmission method or the steering mode that are sent by the policy control network element.

S103. The terminal receives the steering mode of the service flow and/or the transmission method of the service flow that are/is sent by the core network element, where the PDU session to which the service flow belongs supports the plurality of access technologies.

For example, the PDU session to which the service flow belongs supports a first access technology and a second access technology. For example, the first access technology is a 3GPP access technology, and the second access technology is a non-3GPP access technology. For another example, the first access technology is a non-3GPP access technology, and the second access technology is a 3GPP access technology.

In an example, the terminal obtains, from an NAS transmission message sent by the core network element, the steering mode of the service flow and/or the transmission method of the service flow that are/is sent by the policy control network element.

In another example, the terminal obtains the flow steering policy of the service flow and/or the transmission method of the service flow from a session management response message sent by the core network element.

S104. The terminal transmits the service flow according to the steering mode and/or the transmission method of the service flow using at least one of the plurality of access technologies.

It should be noted that, if the terminal receives the steering mode/the transmission method of the service flow in both the session management process and the registration process, the terminal transmits the service flow using an access technology corresponding to the flow steering policy of the service flow and/or the transmission method of the service flow that are/is obtained in the session management process.

According to the service flow transmission method provided in this embodiment of this application, the terminal obtains the steering mode of the service flow and/or the transmission method of the service flow that are/is sent by the core network element, and determines, according to the steering mode of the service flow and/or the transmission method of the service flow, access technologies used for service flows that use different transmission methods. In this way, the service flow may not be steered according to the flow steering policy, and the steering mode of the service flow and/or the transmission method of the service flow are/is used, such that the service flows that use the different transmission methods can be steered based on the determined corresponding access technologies in the PDU session that supports the plurality of access technologies. This reduces complexity of signaling interaction between the core network element and the terminal.

Figure 6:
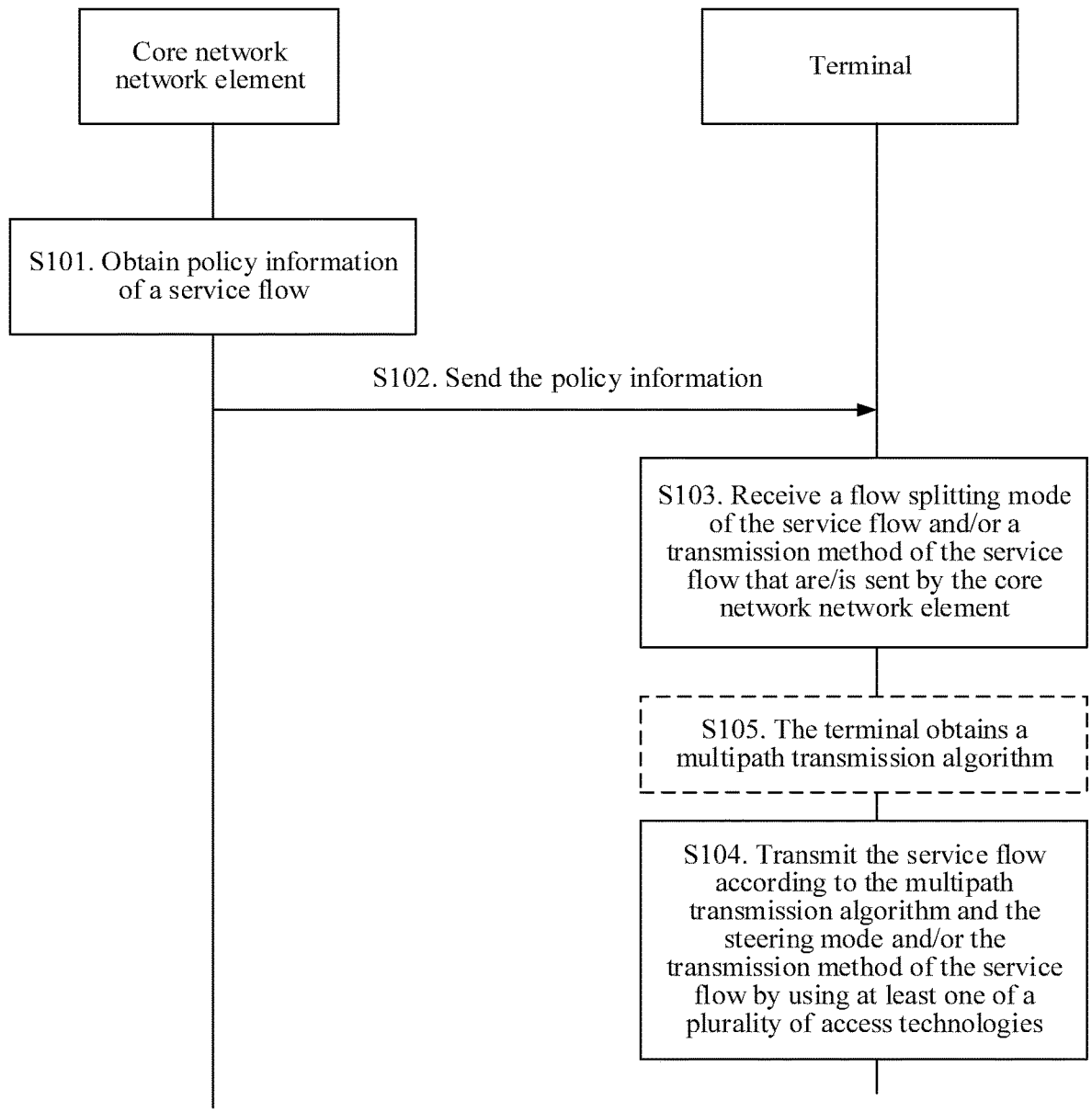

When transmitting the service flow, the terminal may further determine, according to a multipath transmission algorithm for transmitting the service flow, a specific access technology used to transmit a service flow. Therefore, in another embodiment of this application, as shown in FIG. 6, the method further includes the following step:

S105. The terminal obtains the multipath transmission algorithm.

According to one aspect, if the policy information sent by the core network element further includes a multipath transmission algorithm corresponding to the steering mode, the terminal obtains, from the policy information, the multipath transmission algorithm that corresponds to the steering mode and that is sent by the core network element. Alternatively, if the policy information sent by the core network element further includes a multipath transmission algorithm corresponding to the transmission method of the service flow, the terminal obtains, from the policy information, the multipath transmission algorithm that corresponds to the transmission method of the service flow and that is sent by the core network element.

According to another aspect, if a multipath transmission algorithm is configured in the terminal, the terminal determines, according to the steering mode, the multipath transmission algorithm configured by the terminal, or the terminal determines, according to the transmission method of the service flow, the multipath transmission algorithm configured by the terminal.

Correspondingly, as shown in FIG. 6, S104 may be implemented in the following manner: The terminal transmits the service flow according to the multipath transmission algorithm and the steering mode and/or the transmission method of the service flow using the at least one of the plurality of access technologies.

In an example, the terminal transmits the service flow using the at least one of the plurality of access technologies according to the multipath transmission algorithm corresponding to the steering mode.

The terminal determines, according to the steering mode, the multipath transmission algorithm corresponding to the steering mode, determines, from the plurality of access technologies according to the multipath transmission algorithm, the access technology used to transmit the service flow, and then transmits the service flow using the determined access technology.

In another example, the terminal transmits the service flow using the at least one of the plurality of access technologies according to the multipath transmission algorithm corresponding to the transmission method of the service flow.

The terminal determines, according to the transmission method of the service flow, the multipath transmission algorithm corresponding to the transmission method of the service flow, determines, from the plurality of access technologies according to the multipath transmission algorithm, the access technology used to transmit the service flow, and then transmits the service flow using the determined access technology.

For example, if the transmission method of the service flow is an MPTCP method, and a multipath transmission algorithm corresponding to the MPTCP method is a preferred minimum RTT path algorithm, the terminal measures, according to the RTT path algorithm, link latencies corresponding to a 3GPP access technology and a non-3GPP access technology. The terminal then selects an access technology with a minimum link latency in the link latencies corresponding to the 3GPP access technology and the non-3GPP access technology to transmit the service flow.

For example, for a service flow transmitted using any one of an MPTCP method, an MPTCP proxy method, a TCP method, or a TCP proxy method, the multipath transmission algorithm is an MPTCP algorithm.

For example, for a service flow transmitted using any one of a UDP method, a UDP proxy method, a QUIC method, a QUIC proxy method, an MP-QUIC method, or an MP-QUIC proxy method, the multipath transmission algorithm is a QUIC algorithm or an MP-QUIC algorithm.

The MPTCP algorithm, the QUIC algorithm, or the MP-QUIC algorithm in this embodiment of this application includes MPTCP algorithms, QUIC algorithms, or MP-QUIC algorithms in different operating systems. For example, the operating system may be at least one of an iOS operating system and a Linux operating system.

For example, an MPTCP algorithm in the iOS operating system includes one or more of the following: a switching algorithm, a preferred minimum RTT path algorithm, or a multipath aggregation algorithm.

For example, an MPTCP algorithm in the Linux operating system includes one or more of the following: a round-robin scheduling algorithm, a default algorithm, or a redundant transmission algorithm.

In this embodiment of this application, when the service flow is steered using the multipath transmission algorithm, the core network element may send no flow steering policy to the terminal, and the terminal may implement service flow steering according to a supported multipath transmission algorithm in an operating system without using a flow steering policy. This reduces signaling interaction between the terminal and the core network element.

Figure 7:
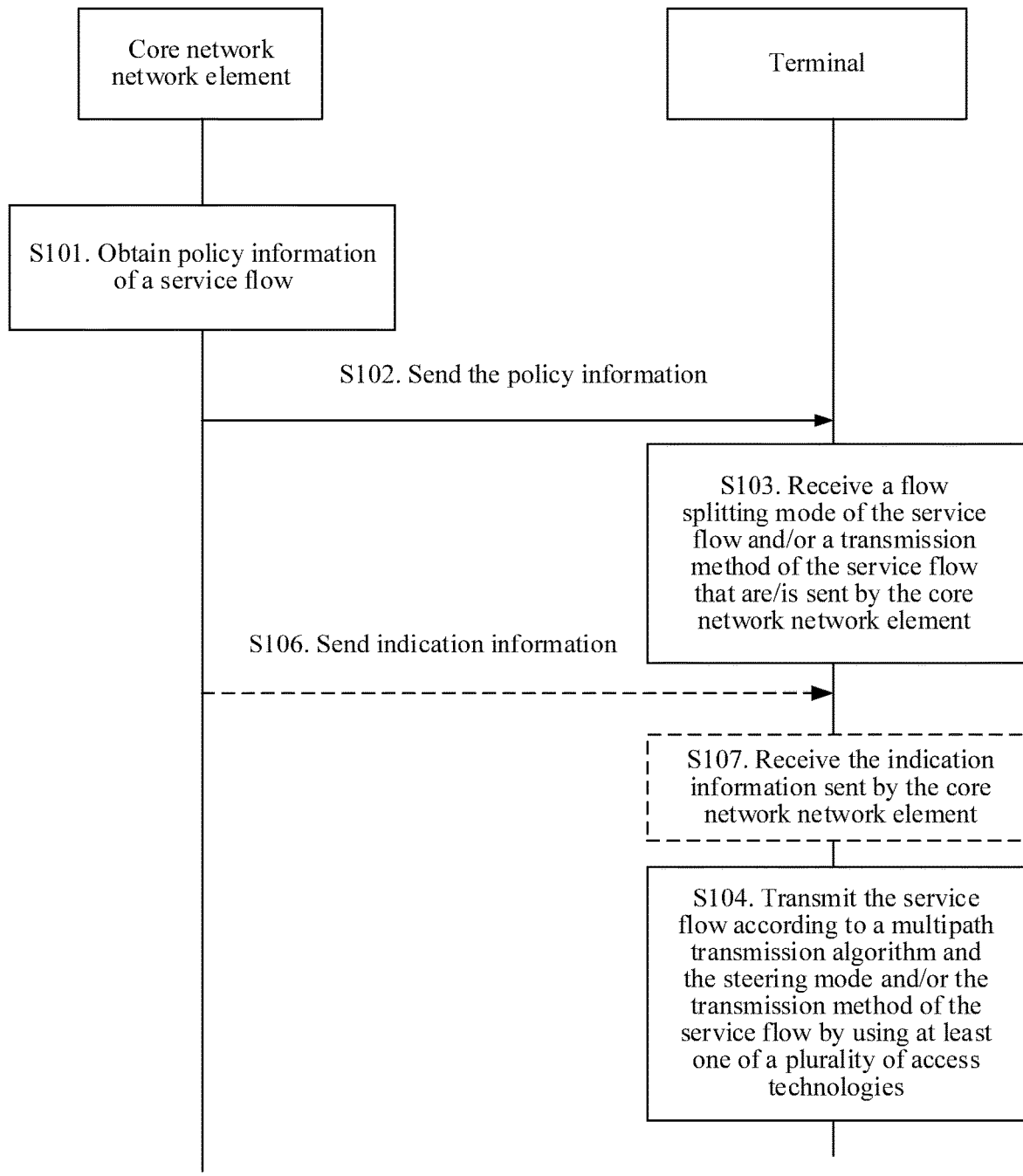

The terminal and the user plane function network element each may autonomously determine, according to the policy information, a specific access technology used to transmit the service flow. Therefore, for a same service flow, an access technology used by the terminal to send the service flow during uplink transmission may be different from an access technology used by the user plane function network element to send the service flow during downlink transmission. To ensure that a same access technology is used for a same service flow in an uplink transmission process and a downlink transmission process, in another embodiment of this application, as shown in FIG. 7, the method provided in this embodiment of this application further includes the following steps.

S106. The core network element sends indication information (which may be, for example, a reflective flow steering indication) to the terminal, where the indication information is used to indicate that an access technology used by the terminal to send the service flow is the same as an access technology used by the terminal to receive the service flow.

S107. The terminal receives the indication information sent by the core network element.

Based on S106 and S107, S104 in this application may be implemented in the following manner: The terminal transmits the service flow according to the indication information and the steering mode and/or the transmission method of the service flow using the at least one of the plurality of access technologies.

For example, when the terminal receives, using a 3GPP access technology, a service flow sent by the user plane function network element, the terminal uses the 3GPP access technology to send a service flow to the user plane function network element.

It should be noted that before the terminal obtains the indication information, the terminal may transmit the service flow using an access technology determined according to at least one of the steering mode or the transmission method of the service flow. After receiving the indication information, the terminal transmits the service flow using an access technology determined based on the indication information.

For example, before the terminal obtains the indication information, the access technology determined according to the at least one of the steering mode or the transmission method of the service flow is the 3GPP access technology. In this case, the terminal transmits a data packet in the service flow using the 3GPP access technology. After the terminal receives the indication information, the access technology determined based on the indication information is a non-3GPP access technology. In this case, a remaining data packet in the service flow is transmitted using the non-3GPP access technology.

Optionally, in an access technology-based migration process, the terminal may further send, to the user plane function network element, an indication used to indicate that transmission performed on the service flow using the 3GPP access technology ends. This helps the user plane function network element sort data packets in the 3GPP access technology and the non-3GPP access technology based on the indication indicating that transmission performed on the service flow using the 3GPP access technology ends.

It should be noted that all processes performed by the terminal in S101 to S107 in the foregoing method may be performed by the user plane function network element. When the processes are performed by the user plane function network element, a message exchanged between the user plane function network element and the core network element is correspondingly changed.

It should be noted that, the solutions provided in Embodiment 1 further include the following: The core network element sends, to the terminal, a plurality of addresses allocated to the PDU session of the terminal, and an access technology type corresponding to each of the plurality of addresses. Then, the terminal transmits the service flow according to the policy information based on the access technology type corresponding to each of the plurality of addresses. For a manner in which the terminal transmits the service flow according to the policy information based on the access technology type corresponding to each of the plurality of addresses, refer to descriptions in Embodiment 2. Details are not described herein.

Embodiment 2

Figure 8:
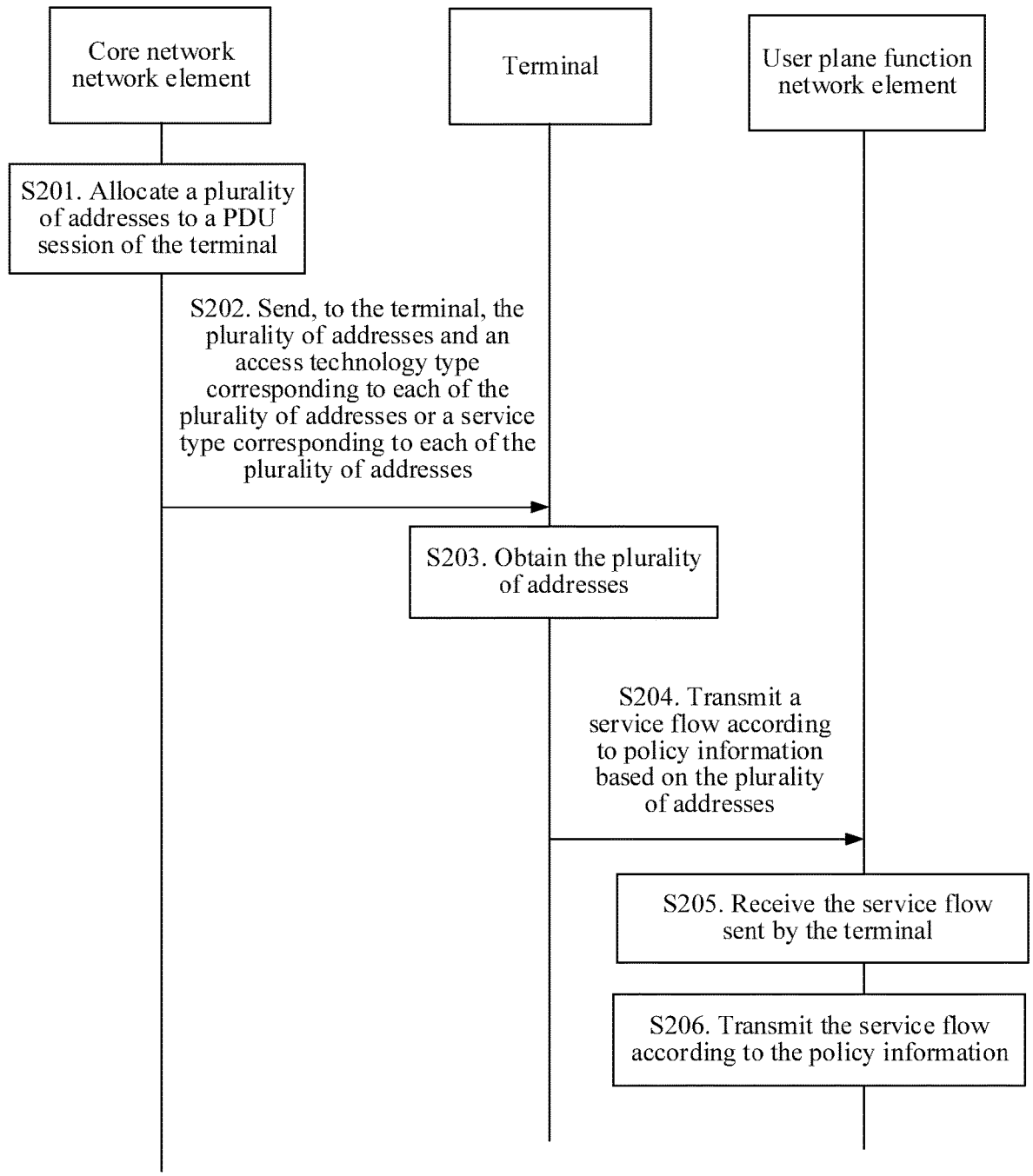

In practice, a multi-access PDU session may be used to implement movement of a service flow between different access technologies based on an MPTCP. However, another non-MPTCP service flow (for example, a UDP service flow) may further exist in the multi-access PDU session. Currently, movement of the non-MPTCP service flow cannot be supported in the multi-access PDU session. In this case, if the non-MPTCP service flow is moved in the multi-access PDU session, transmission of the non-MPTCP service flow may be interrupted. Therefore, as shown in FIG. 8, an embodiment of this application provides a schematic flowchart of interaction in a service flow transmission method and a communications method. The method includes the following steps.

S201. A core network element allocates a plurality of addresses to a PDU session of a terminal, and determines an access technology type corresponding to each of the plurality of addresses. The PDU session supports a plurality of access technologies.

It should be understood that, S201 may be replaced with the following: A core network element allocates a plurality of addresses to a PDU session of a terminal, where each of the plurality of addresses corresponds to a service type. The PDU session supports a plurality of access technologies.

In a possible implementation, the core network element receives a session management request message (for example, the session management request message may be sent by the terminal to a session management network element using a mobility management network element, and in this case, the core network element should be understood as the session management network element). Then, the core network element allocates the plurality of addresses to the PDU session. Based on the session management request message, the core network element allocates the plurality of addresses to the PDU session, and determines the access technology type corresponding to each of the plurality of addresses or the service type corresponding to each of the plurality of addresses. For example, the session management request message may carry first indication information.

In another possible implementation, after receiving a session management request message sent by the terminal, the core network element (for example, a session management network element) sends, to a user plane function network element using an N4 session message, an instruction used to instruct the user plane function network element to allocate, to the PDU session of the terminal, the plurality of addresses and the access technology type corresponding to each address or the service type corresponding to each address. For example, the N4 session message may carry first indication information. Then, the core network element obtains the plurality of addresses from the user plane function network element, and determines the access technology type corresponding to each of the plurality of addresses or the service type corresponding to each of the plurality of addresses.

Certainly, the user plane function network element may alternatively allocate only the plurality of addresses to the PDU session, and then send the plurality of allocated addresses to the core network element. The core network element determines the access technology type corresponding to each of the plurality of addresses or the service type corresponding to each of the plurality of addresses.

For example, the access technology type includes at least one of a first access technology type or a second access technology type. The service type is a common service flow or a first service flow.

For example, the first access technology type is a 3GPP access technology, an LTE access technology, a 5G access technology, or an NG-RAN access technology, and the second access technology type is a non-3GPP access technology, a WLAN access technology, a fixed network access technology, or the like. Alternatively, the first access technology type is a non-3GPP access technology, a WLAN access technology, a fixed network access technology, or the like, and the second access technology type is a 3GPP access technology, an LTE access technology, a 5G access technology, or an NG-RAN access technology.

That one address corresponds to the common service flow indicates that the address may correspond to a plurality of service flows (for example, the first service flow and a second service flow). In other words, the address may be used to transmit one or more of the first service flow or the second service flow. Likewise, the address corresponding to the common service flow may be referred to as a common address. For example, if an IP 1 corresponds to the first service flow and the second service flow, the IP 1 may be referred to as the common address.

In addition, in this embodiment of this application, an address corresponding to a plurality of access technology types may be referred to as a common address. In other words, the common address may be used to transmit a service flow transmitted using any access technology.

In a possible implementation, the method provided in this embodiment of this application further includes: After the core network element receives information sent by the terminal for indicating a transmission method of a service flow, the core network element selects, based on the information for indicating the transmission method of the service flow, a user plane function network element having a function of the transmission method.

For example, when the first indication information indicates that the terminal supports an MPTCP capability or transmits the service flow using a first transmission method (an MPTCP method or an MPTCP proxy method), the core network element selects a user plane function network element having an MPTCP proxy capability, and the plurality of addresses allocated to the terminal includes a first address, a second address, and a third address.

For example, when the first indication information indicates that the terminal supports at least one of an MP-QUIC capability and a QUIC capability or transmits the service flow according to a second transmission method that is any one of a TCP method, a TCP proxy method, a UDP method, or a UDP proxy method, the core network element selects, for the PDU session of the terminal, a user plane function network element that supports an MP-QUIC proxy capability or a QUIC proxy capability, and the plurality of addresses allocated to the terminal includes a first address and a second address.

The address in this embodiment of this application may be an IP address.

S202. The core network element sends, to the terminal, the plurality of addresses and the access technology type corresponding to each of the plurality of addresses or the service type corresponding to each of the plurality of addresses.

In a possible replacement manner of S202, the core network element sends, to the terminal, the plurality of addresses and information for determining the access technology type corresponding to each of the plurality of addresses. Alternatively, the core network element sends, to the terminal, the plurality of addresses and information for determining the service type corresponding to each of the plurality of addresses.

For example, the core network element may send, to the terminal in a session management response message, the plurality of addresses and the access technology type corresponding to each of the plurality of addresses or the service type corresponding to each of the plurality of addresses.

In an example, when an SMF network element determines the plurality of addresses and the access technology type corresponding to each address or the service type corresponding to each address, the SMF network element may further send, to the user plane function network element, the plurality of addresses and the access technology type corresponding to each of the plurality of addresses or the service type corresponding to each of the plurality of addresses.

In another example, when the user plane function network element determines the plurality of addresses and the access technology type corresponding to each address or the service type corresponding to each address, the user plane function network element may further send, to the terminal (for example, using a user plane message), the access technology type corresponding to each address or the service type corresponding to each address.

In an example 1-1, the plurality of addresses include a first address, a second address, and a third address.

In a possible implementation 1-1, S202 may be implemented in the following manner: The core network element sends, to the terminal, the first address, the second address, the third address, a first access technology type corresponding to the first address, a second access technology type corresponding to the second address, and the first access technology type and the second access technology type that correspond to the third address.

If the terminal and the core network element can negotiate with each other in advance to determine that the terminal selects the corresponding access technology type for each address, or if the terminal and the core network element have negotiated in advance the access technology type corresponding to each address, S202 may be implemented in the following possible implementation 1-2.

In the possible implementation 1-2, the core network element sends the first address, the second address, and the third address to the terminal.

In a possible implementation, the terminal and the core network element may configure, by default, an access technology type or a service type corresponding to the first address, the second address, or the third address.

In a possible implementation 1-3, the core network element sends the first address, the second address, the third address, and a common address indication corresponding to the third address to the terminal. The common address indication is used to indicate that the third address is a common address, that is, indicate that the third address corresponds to a plurality of access technology types (for example, a first access technology type and a second access technology type).

In an example 1-2, the plurality of addresses include a first address and a second address.

In a possible implementation 2-1, S202 may be implemented in the following manner: The core network element sends, to the terminal, the first address, the second address, a first access technology type corresponding to the first address, and a second access technology type corresponding to the second address.

If the terminal and the core network element can negotiate with each other in advance to determine that the terminal selects the corresponding access technology type for each address, or if the terminal and the core network element have negotiated in advance the access technology type corresponding to each address, S202 may be implemented in the following possible implementation 2-2.

In the possible implementation 2-2, the core network element sends the first address and the second address to the terminal.

It should be noted that when the core network element does not send a third address to the terminal, the core network element may send the third address to the user plane function network element. Certainly, the core network element may alternatively not send the third address to the user plane function network element.

In the foregoing embodiment, the third address may be the same as the first address or the second address. For example, the core network element allocates the first address and the second address to the terminal. To enable the terminal to determine a service type or an access technology type corresponding to the first address or the second address, S202 may be implemented using the following example 1-3.

In the example 1-3, the plurality of addresses include a first address and a second address.

In a possible implementation 3-1, S202 may be implemented in the following manner: The core network element sends, to the terminal/user plane function network element, the first address, the second address, first type indication information corresponding to the first address, and second type indication information corresponding to the second address.

In a possible implementation 3-2, S202 may be implemented in the following manner: That the core network element sends, to the terminal/user plane function network element, the plurality of addresses allocated to the PDU session, and the access technology type corresponding to each of the plurality of addresses or the service type corresponding to each of the plurality of addresses includes: The core network element sends, to the terminal/user plane function network element, the first address, the second address, and second type indication information corresponding to the second address.

According to one aspect, the first type indication information is used to indicate a first access technology type and a second access technology type, and the second type indication information is used to indicate the first access technology type or the second access technology type.

Alternatively, according to another aspect, the first type indication information is used to indicate that the first address corresponds to a common service flow, and the second type indication information is used to indicate that the second address corresponds to a first service flow.

For example, in a first implementation, the first type indication information may be a first access technology type indication and a second access technology type indication. The second type indication information may be the first access technology type indication or the second access technology type indication, or the second type indication information may be a second indication field or fifth indication information.

For example, the second type indication information may be a 3GPP access technology indication.

For example, in a second implementation, the first type indication information is a common address indication.

For example, in a third implementation, the first type indication information may be a first indication field or fourth indication information, and is used to indicate that the first address corresponds to the first access technology type and the second access technology type.

For example, the fourth indication information is a first service flow indication and/or a second service flow indication, and the fifth indication information is the first service flow indication. Alternatively, the fourth indication information is a common service flow indication.

In a fourth implementation, the first type indication information is null. To be more specific, the first address does not correspond to any access technology type. For a manner of the second type indication information, refer to the manner described in the foregoing first implementation. Details are not described herein again.

An access technology type indication is used to indicate an access technology type. A service flow indication is used to determine a service flow. For example, the first service flow indication is used to determine a first service flow.

In the first implementation, to enable the terminal to determine addresses for transmitting a first service flow and a second transmission flow, according to one aspect, the first type indication information is further used to indicate that the first service flow and the second service flow can be transmitted using the first address. Alternatively, the first type indication information is used to indicate that a common service flow is transmitted using the first address. The second type indication information is used to indicate that the first service flow is transmitted using the second address. In addition, when an access technology used to transmit the first service flow is of an access technology type corresponding to the second address, the first service flow is transmitted using the second address. When an access technology used to transmit the first service flow is of the first access technology type or the second access technology type, and is not of an access technology type corresponding to the second address, the first service flow is transmitted using the first address.

Alternatively, the terminal and the core network element negotiate with each other in advance to determine that when an access technology used to transmit the first service flow is of an access technology type corresponding to the second address, the first service flow is transmitted using the second address, and when an access technology used to transmit the first service flow is of the first access technology type or the second access technology type, and is not of an access technology type corresponding to the second address, the first service flow is transmitted using the first address.

According to another aspect, in the third implementation, because the first service flow may correspond to the first address or the second address, to enable the terminal to determine whether to use the first address or the second address to transmit the service flow, in a first scenario 1, the core network element may further send a first message to the terminal when indicating, to the terminal, that the second address corresponds to the first service flow, and the first message is used to indicate that the second address corresponds to the first access technology type or the second access technology type. In a second scenario 2, the core network element may further send a first message to the terminal. The first message includes a flow steering policy, and the flow steering policy includes the first address and a first access technology type indication, and the second address and a second access technology type indication. The first address and the first access technology type indication are used to indicate that the first address corresponds to the first access technology type, and the second address and the second access technology type indication are used to indicate that the second address corresponds to the second access technology type. In this way, after receiving the first address and the first access technology type indication, and the second address and the second access technology type indication, the terminal can determine that, for the first service flow, when an access technology determined according to policy information is of the first access technology type, the first service flow is processed using the first address. When an access technology determined according to policy information is of the second access technology type, the first service flow is processed using the second address. When an access technology determined according to policy information is a first access technology, the first service flow is processed using the first address. In other words, how to use the first address and the second address is further indicated to the terminal. Alternatively, the flow steering policy includes the first address and a second access technology type indication, and the second address and a first access technology type indication.

For example, when the first transmission method is an MPTCP method or an MPTCP proxy method, the core network element sends an IP 1 and a 3GPP access technology indication, and an IP 2 and a non-3GPP access technology indication to the terminal. In this way, if the terminal determines that an MPTCP service flow is transmitted using a 3GPP access technology, the terminal processes the MPTCP service flow using the IP 1.

In conclusion, the terminal may determine, based on the first type indication information, the second type indication information, and the access technology for transmitting the first service flow, an address used to transmit the first service flow.

S203. The terminal obtains the plurality of addresses. Each of the plurality of addresses corresponds to the service type or each address corresponds to the access technology type.

For example, the terminal may obtain, from the session management response message, the plurality of addresses and the service type corresponding to each of the plurality of addresses or the access technology type corresponding to each of the plurality of addresses.

For example, S203 may be implemented in the following manner.

In an example A, the terminal and the core network element may negotiate the access technology type corresponding to each of the plurality of addresses or the service type corresponding to each of the plurality of addresses. In this way, when the core network element sends the plurality of addresses to the terminal in the possible implementation 1-2 or possible implementation 2-2, the terminal may determine, based on the received plurality of addresses and negotiated content, the access technology type corresponding to each address or the service type corresponding to each address.

For example, the terminal and the core network element negotiate with each other in advance to determine that a first address corresponds to a first access technology type, and a second address corresponds to a second access technology type. For another example, a first address corresponds to a common service flow, and a second address corresponds to a first service flow.

For another example, the plurality of addresses include a first address, a second address, and a third address. In this way, when receiving the first address, the second address, and the third address, the terminal may determine, based on content negotiated in advance, that the first address corresponds to a first access technology type, the second address corresponds to a second access technology type, and the third address corresponds to the first access technology type and the second access technology type, or the third address is a common address.

In an example B, when the core network element sends the plurality of addresses to the terminal in the possible implementation 1-1 or the possible implementation 2-1, the terminal may determine, based on an indication of the core network element, the access technology type corresponding to each of the plurality of addresses.

For example, in the possible implementation 1-1, the terminal may determine that the third address corresponds to the first access technology type and the second access technology type, the first address corresponds to the first access technology type, and the second address corresponds to the second access technology type.

For another example, in the possible implementation 2-1, the terminal may determine that the first address corresponds to the first access technology type, and the second address corresponds to the second access technology type.

For another example, in the possible implementation 3-1, the terminal may determine, based on the first type indication information, that the first address corresponds to a first access technology type and a second access technology type, or the first address corresponds to a common service flow. The terminal may determine, based on the second type indication information, that the second address corresponds to the first access technology type or the second access technology type, or the second address corresponds to a first service flow.

For example, when the first type indication information is a first access technology type indication and a second access technology type indication, the terminal determines that the first address corresponds to the first access technology type and the second access technology type. When the first type indication information is a common service flow indication, the terminal determines that the first address corresponds to a common service flow.

It should be noted that, the core network element may further indicate, to the terminal, service types or access technology types corresponding to some of the plurality of addresses, and then the terminal autonomously determines service types or access technology types corresponding to the other of the plurality of addresses. For example, the core network element sends the first address and the second address to the terminal, but the core network element indicates only that the first address corresponds to the second access technology type and the first access technology type. In this case, when receiving the first address and the second address, the terminal can determine that the second address corresponds to the second access technology type or the first access technology type.

It should be noted that, when sending, to the terminal, information indicating that the first address corresponds to the common service flow, and the second address corresponds to the first service flow, the core network element may further send, to the terminal, information indicating that the first address is a common address, and the second address corresponds to the first access technology type or the second access technology type.

S204. The terminal transmits a service flow according to policy information based on the plurality of addresses.

It should be understood that, if the terminal obtains the access technology type corresponding to each address, the terminal transmits the service flow according to the policy information based on the plurality of addresses.

If the terminal obtains the service type corresponding to each address, S204 needs to be replaced with the following manner: The terminal transmits a service flow based on the service type corresponding to each address.

In a possible implementation, the method provided in this embodiment of this application further includes: S205. The user plane function network element receives the service flow sent by the terminal, where the service flow is transmitted using the plurality of addresses. S206. The user plane function network element transmits the service flow according to the policy information (this is applicable to a case in which each address corresponds to the access technology type). Alternatively, the user plane function network element transmits the service flow based on the service type corresponding to each address (this is applicable to a case in which each address corresponds to the service type).

For an implementation of S206, refer to descriptions in the following embodiments. Details are not described herein.

According to the service flow transmission method provided in this embodiment of this application, the terminal receives the plurality of addresses allocated by the core network element to the PDU session of the terminal. When there are service flows supporting different transmission methods in the PDU session, the terminal may determine, according to the policy information, addresses corresponding to the service flows using the different transmission methods, and transmits the service flows using access technologies determined according to the policy information based on the addresses corresponding to the service flows using the different transmission methods. Because the service flow is transmitted based on an address corresponding to an access technology determined according to the policy information, for a same service flow, regardless of how the access technology changes during transmission of the service flow, the terminal can determine an address for transmitting the service flow. Therefore, the service flows using the different transmission methods can be transmitted as a same service flow based on an address allocated by the core network element.

The core network element may allocate three or two addresses to the terminal. The PDU session may include service flows transmitted using a plurality of transmission methods. The service flows use different transmission methods, and therefore manners in which the terminal transmits the service flows according to the policy information based on the plurality of addresses are also different. Descriptions are separately provided below.

In an example 2-1, the plurality of addresses allocated by the core network element include a first address and a second address, the first address corresponds to a first access technology type, the second address corresponds to a second access technology type, and the service flow includes a first service flow transmitted using a first transmission method.

For example, the first transmission method includes one or more of an MPTCP method, an MPTCP proxy method, a TCP method, a TCP proxy method, a UDP method, a UDP proxy method, a QUIC method, a QUIC proxy method, an MP-QUIC method, or an MP-QUIC proxy method.

In a first possible implementation, S204 may be implemented in the following manner: The terminal transmits the first service flow according to the policy information using the first address and/or the second address.

Correspondingly, S206 may be implemented in the following manner: The user plane function network element receives the service flow (for example, the service flow is sent by the terminal) according to the policy information. An address of the service flow is a source address, the user plane function network element replaces the source address, namely, the first address/the second address, of the service flow with a fourth address, and the user plane function network element sends the service flow of the fourth address. The fourth address is a third address or an address of the user plane function network element.

In this embodiment of this application, that the terminal transmits the first service flow according to the policy information using the first address and/or the second address means that the terminal processes the first service flow using the first address and/or the second address, and then transmits, using an access technology indicated by the policy information, the first service flow on which address processing is performed. When an access technology used for the first service flow changes, the address of the first service flow also changes. Therefore, after receiving the first service flow whose source address is the first address/the second address, the user plane function network element changes a source address of the first service flow from the first address/the second address to the fourth address. Because the first service flow usually carries information used to indicate the first service flow, the user plane function network element may translate addresses of a same service flow transmitted using different access technologies into a same address and send the service flow.

Processing the service flow using the first address and/or the second address may be processing a data packet in the service flow using the first address and/or the second address. Because different data packets in a same service flow may be transmitted using different access technologies, whether a data packet is processed using the first address, the second address, or the first address and the second address depends on an access technology used to transmit the data packet.

In the example 2-1, the terminal may determine, according to the policy information, an access technology used for the first service flow. Then, the terminal processes the first service flow based on an address corresponding to the access technology used for the first service flow.

For details about how the terminal determines, according to the policy information, the access technology used for the service flow, refer to the solution described in Embodiment 1. Details are not described herein again.

For example, if an IP 1 corresponds to a 3GPP access technology, and the terminal determines that the first service flow transmitted using an MPTCP method is transmitted using the 3GPP access technology, the terminal may process the first service flow using the IP 1, and transmit, using the 3GPP access technology, the first service flow on which address processing is performed.

In an example 2-2, the plurality of addresses allocated by the core network element include a first address, a second address, and a third address. The first address corresponds to a first access technology type, the second address corresponds to a second access technology type, the third address corresponds to the first access technology type and the second access technology type, and the service flow includes at least one of a first service flow transmitted using a first transmission method and a second service flow transmitted using a second transmission method.

In an example, the first transmission method includes one or more of an MPTCP method, an MPTCP proxy method, a UDP QUIC method, a UDP QUIC proxy method, a UDP MP-QUIC method, or an MP-QUIC proxy method. The second transmission method includes one or more of a TCP method, a TCP proxy method, a UDP method, or a UDP proxy method.

In a second possible implementation, S204 may be implemented in the following manner: The terminal transmits the first service flow according to the policy information using the first address and/or the second address, and transmits the second service flow according to the policy information using the third address.

Correspondingly, S206 may be implemented in the following manner: After receiving the first service flow whose source address is the first address/the second address and the second service flow whose source address is the third address, the user plane function network element changes the address of the first service flow to a fourth address. Because the service flow usually carries information used to indicate the service flow, the user plane function network element may translate addresses of a same service flow transmitted using different access technologies into a same address and send the service flow.

For example, if the terminal determines, according to the policy information or indication information, that the first service flow is transmitted using a first access technology or a second access technology, the terminal processes the first service flow using the first address and/or the second address, and transmits, using the first access technology or the second access technology, the first service flow on which address processing is performed.

For example, the first address corresponds to a 3GPP access technology, and the first service flow is an MPTCP service flow. If the terminal determines, according to the policy information, that the MPTCP service flow uses the 3GPP access technology, the terminal processes the MPTCP service flow using the first address.

For example, an IP 1 corresponds to the 3GPP access technology, and an IP 2 corresponds to a non-3GPP access technology. If the MPTCP service flow is initially transmitted using the 3GPP access technology, the terminal processes the MPTCP service flow using the IP 1. If the MPTCP service flow is subsequently transmitted using the non-3GPP access technology, the terminal processes the MPTCP service flow using the IP 2. In this case, a source address of the MPTCP service flow received by the user plane function network element may include the IP 1 and the IP 2. Therefore, the user plane function network element replaces the source address of the MPTCP service flow with an IP 3, and then sends the MPTCP service flow whose address is the IP 3.

It may be understood that, if the first service flow is processed using the first address, the terminal sends, to an access network device of an access technology type corresponding to the first address, the first service flow processed using the first address. If the first service flow is processed using the second address, the terminal sends, to an access network device of an access technology type corresponding to the second address, the first service flow processed using the second address. For example, if the first address corresponds to the 3GPP access technology, the terminal sends, to an access network device in the 3GPP access technology, the first service flow processed using the first address.

For example, for the second service flow, the terminal processes the second service flow using the third address, and determines, according to a flow steering policy or a flow steering indication, that the second service flow is transmitted using at least one of the first access technology or the second access technology. In this case, the terminal transmits, using the at least one of the first access technology or the second access technology, the second service flow processed using the third address.

For example, if the second service flow is a UDP service flow, and the terminal determines that the UDP service flow is transmitted using the 3GPP access technology, the terminal processes the second service flow using the third address, and transmits, using the 3GPP access technology, the UDP service flow processed using the third address. If the terminal determines that the UDP service flow is transmitted using the 3GPP access technology and the non-3GPP access technology, the terminal processes the second service flow using the third address, and transmits, using the 3GPP access technology and the non-3GPP access technology, the UDP service flow processed using the third address.

Because the third address is a common address, for the second service flow, the terminal can transmit the second service flow using the third address. Regardless of a specific access technology used to transmit the second service flow, an address of the second service flow is the third address. This can avoid a transmission interruption when the second service flow transmitted using the second transmission method is migrated in a same PDU session. After receiving the second service flow using a plurality of access technologies, the user plane function network element may not process the address of the second service flow, but directly send the second service flow.

It should be noted that one service flow may include a plurality of data packets, and the plurality of data packets may be transmitted using a same access technology, or may be transmitted using different access technologies. In this embodiment of this application, transmitting the service flow according to the policy information includes: transmitting data packets in the service flow using the plurality of addresses and an access technology determined according to the policy information. For example, transmitting the service flow according to the policy information using the first address may be: processing a data packet in the service flow using the first address; and transmitting, using a corresponding access technology determined according to the policy information and used to transmit the data packet in the service flow, the data packet that is of the service flow and on which address processing is performed.

In the foregoing embodiment, the third address may be the same as the first address or the second address. For example, the core network element allocates the first address and the second address to the terminal, the first address corresponds to the first access technology type and the second access technology type, and the second address corresponds to the first access technology type or the second access technology type. Therefore, that the terminal transmits the service flow according to the policy information based on the plurality of addresses may alternatively be implemented using the following example 2-3.

In the example 2-3, the plurality of addresses allocated by the core network element include a first address and a second address. The first address corresponds to a first access technology type and a second access technology type, and the second address corresponds to the first access technology type or the second access type. The service flow includes a first service flow transmitted using a first transmission method and/or a second service flow transmitted using a second transmission method.

For content of the first transmission method and the second transmission method in the example 2-3, refer to the description in the example 2-2. Details are not described herein again.

In a third possible implementation, S204 may be implemented in the following manner: The terminal transmits the first service flow according to the policy information using the first address and/or the second address, and transmits the second service flow according to the policy information using the first address.

In a possible implementation, that the terminal transmits the second service flow according to the policy information using the first address may be implemented in the following manner: The terminal processes the second service flow using the first address, and transmits, using an access technology indicated by the policy information or indication information, the second service flow on which address processing is performed.

In an example, the first address is an IP 1, and the second service flow is a UDP service flow. The terminal processes the UDP service flow using the IP 1, and determines, according to the policy information or the indication information, that the UDP service flow is transmitted using a 3GPP access technology. In this case, the UDP service flow whose address is the IP 1 is transmitted using the 3GPP access technology.

In another possible implementation, if the terminal determines that the first address corresponds to the first access technology type and the second access technology type, and the second address corresponds to the first access technology type or the second access type, when the terminal transmits the first service flow according to the policy information using the first address or the second address, that the terminal transmits the first service flow according to the policy information using the first address and/or the second address may be implemented in the following manner 1 or manner 2.

In the manner 1, if the terminal determines that an access technology used to transmit the first service flow is of an access technology type corresponding to the second address, the terminal transmits the first service flow according to the policy information using the second address.

In the manner 2, if the terminal determines that an access technology used to transmit the first service flow is of the first access technology type or the second access technology type, and is not an access technology corresponding to the second address, the terminal transmits the first service flow according to the policy information using the first address.

For example, for the first service flow, the terminal determines, according to the policy information, the access technology used to transmit the first service flow, and then selects, based on the determined access technology, an address for processing the first service flow. After the first service flow is processed using the selected address, the processed first service flow is transmitted using the determined access technology.

For example, the first service flow is an MPTCP service flow, an IP 1 corresponds to a 3GPP access technology and a non-3GPP access technology, and an IP 2 corresponds to the 3GPP access technology. If the terminal determines that the MPTCP service flow uses the non-3GPP access technology, the terminal processes the MPTCP service flow using the IP 1, and transmits the processed MPTCP service flow using the non-3GPP access technology. If the terminal determines that the MPTCP service flow uses the 3GPP access technology, the terminal processes the MPTCP service flow using the IP 2, and transmits the processed MPTCP service flow using the 3GPP access technology.

In an example 2-4, the plurality of addresses allocated by the core network element include a first address and a second address. The first address corresponds to a common service flow, and the second address corresponds to a first service flow. The service flow includes the first service flow transmitted using a first transmission method and/or a second service flow transmitted using a second transmission method.

For content of the first transmission method and the second transmission method in the example 2-4, refer to the description in the example 2-2. Details are not described herein again.

In a fourth possible implementation, S204 may be implemented in the following manner: The terminal transmits the first service flow using the first address and/or the second address, and transmits the second service flow using the first address.

If the terminal determines that the first address corresponds to the common service flow, and the second address corresponds to the first service flow, that the terminal transmits the first service flow according to the policy information using the first address and/or the second address may be implemented in the following manner 3 or manner 4.

In the manner 3, the terminal determines, based on a first message, that the first address corresponds to a first access technology type, and/or the second address corresponds to a second access technology type. If the terminal determines, according to the policy information or indication information, that the first service flow is transmitted using the first access technology type, the terminal transmits the first service flow using the first address.

In the manner 4, if the terminal determines, according to the policy information or indication information, that the first service flow is transmitted using the second access technology type, the terminal transmits the first service flow using the second address.

For example, the core network element sends, to the terminal, information indicating that an IP 1 corresponds to a common service flow, and sends, to the terminal, information indicating that an IP 2 corresponds to an MPTCP service flow. In addition, the core network element sends a flow steering policy to the terminal, and the flow steering policy includes that the IP 1 corresponds to a 3GPP access technology, and the IP 2 corresponds to a non-3GPP access technology. If the terminal determines, according to the policy information, that the MPTCP service flow is transmitted using the 3GPP access technology, the terminal processes the MPTCP service flow using the IP 1, and then transmits, using the 3GPP access technology, the MPTCP service flow whose address is the IP 1. If the terminal determines, according to the policy information, that the MPTCP service flow is transmitted using the non-3GPP access technology, the terminal transmits the MPTCP service flow using the IP 2 and the non-3GPP access technology.

S206 may be implemented in the following manner: After receiving the first service flow whose source address is the first address, the user plane function network element replaces the first address of the first service flow with the second address. Alternatively, after receiving the first service flow whose source address is the second address, the user plane function network element replaces the second address of the first service flow with the first address. In a transmission process, a same first service flow may be transmitted using different access technologies. Consequently, the same first service flow corresponds to different addresses. Because the first service flow usually carries information used to indicate the first service flow, the user plane function network element may translate addresses of the same first service flow transmitted using the different access technologies into a same address and send the first service flow.

For example, when the IP 1 corresponds to the 3GPP access technology and the non-3GPP access technology, and the IP 2 corresponds to the 3GPP access technology, if the MPTCP service flow is transmitted using the non-3GPP access technology, the terminal processes the MPTCP service flow using the IP 1. If the MPTCP service flow is further transmitted using the 3GPP access technology, the terminal processes the MPTCP service flow using the IP 2. In this way, after receiving the MPTCP service flow whose source address is the IP 1 and the MPTCP service flow whose source address is the IP 2, the user plane function network element unifies an address of the MPTCP service flow whose source address is the IP 1 and an address of the MPTCP service flow whose source address is the IP 2 as the IP 1 or the IP 2.

For the second service flow, regardless of a specific access technology used to transmit a same second service flow, an address corresponding to the second service flow is the first address. Therefore, when receiving the second service flow, the user plane function network element may not perform address translation on the second service flow.

In a possible implementation, the method provided in this embodiment of this application further includes: The core network element sends, to the terminal, information used to indicate the transmission method of the service flow, and the terminal receives the information sent by the core network element for indicating the transmission method of the service flow. In this way, after receiving the information used to indicate the transmission method of the service flow, the terminal determines, based on the information used to indicate the transmission method of the service flow, an access technology type used for the service flow, in order to determine, based on the access technology type, an address for transmitting the service flow.

In a possible implementation, the method provided in this embodiment of this application further includes: The terminal sends first indication information to the core network element. The core network element allocates the plurality of addresses to the PDU session of the terminal based on the first indication information.

In a possible implementation, the terminal in Embodiment 2 may be further configured to perform a process performed by the terminal in Embodiment 1. For details, refer to the description in Embodiment 1. Details are not described herein again.

Embodiment 3

Figure 9:
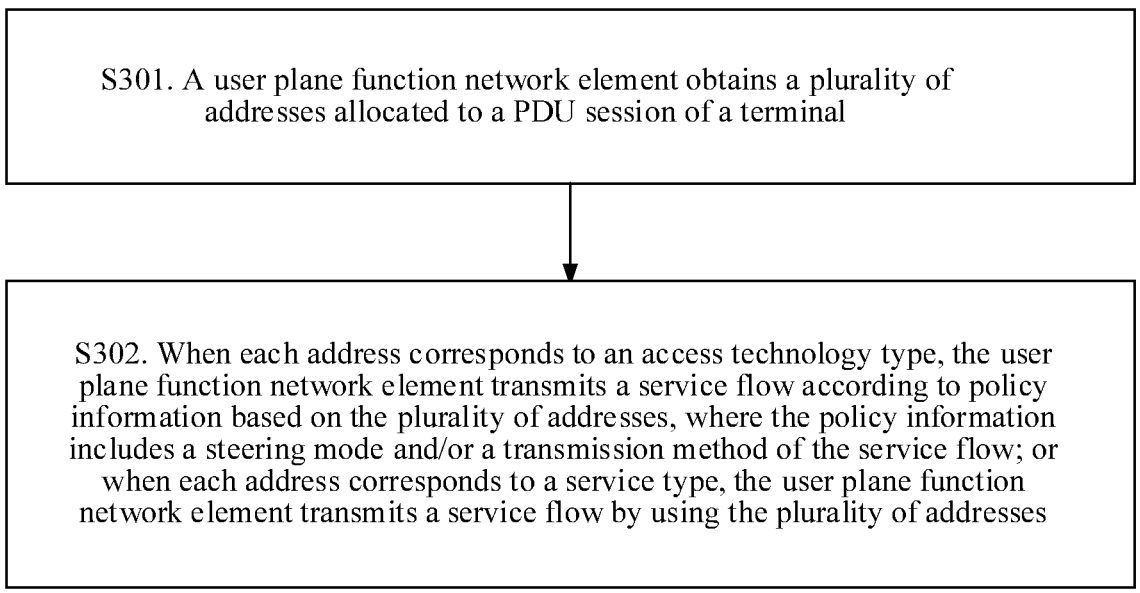

As shown in FIG. 9, an embodiment of this application provides a service flow transmission method, including the following steps.

S301. A user plane function network element obtains a plurality of addresses allocated to a PDU session of a terminal, where the PDU session supports a plurality of access technologies.

According to one aspect, each of the plurality of addresses corresponds to an access technology type. According to another aspect, each of the plurality of addresses corresponds to a service type.

For example, the PDU session may support a first access technology type and a second access technology type. For example, the PDU session may support a 3GPP access technology and a non-3GPP access technology. For descriptions of the first access technology type and the second access technology type, refer to the descriptions in Embodiment 2. Details are not described herein again.

In a possible implementation, S301 may be implemented in the following manner: The user plane function network element receives the plurality of addresses allocated by a session management network element to the PDU session, and the access technology type corresponding to each of the plurality of addresses or the service type corresponding to each of the plurality of addresses. For a manner in which the session management network element sends the plurality of addresses, refer to the manner in which the core network element sends the plurality of addresses in Embodiment 2.

For example, a first address corresponds to the first access technology type, a second address corresponds to the second access technology type, and a third address corresponds to the first access technology type and the second access technology type.

For example, an IP 1 corresponds to the 3GPP access technology, an IP 2 corresponds to the non-3GPP access technology, and an IP 3 corresponds to the non-3GPP access technology and the 3GPP access technology.

For a manner in which the user plane function network element determines the access technology type corresponding to each of the plurality of addresses or the service type corresponding to each of the plurality of addresses, refer to the process in which the terminal determines the access technology type or the service type in Embodiment 2. In other words, the terminal in the step in which the terminal determines the access technology type corresponding to each of the plurality of addresses or the service type corresponding to each of the plurality of addresses may be replaced with the user plane function network element. Details are not described herein again.

In another possible implementation, S301 may be implemented in the following manner: The user plane function network element allocates the plurality of addresses to the PDU session of the terminal, and determines the access technology type corresponding to each of the plurality of addresses or the service type corresponding to each of the plurality of addresses.

For example, when receiving a multi-address indication or first indication information sent by the session management network element, the user plane function network element allocates the plurality of addresses to the PDU session of the terminal. For example, the multi-address indication or the first indication information may be obtained from an N4 session message sent by the session management network element.

Optionally, the user plane function network element may further receive an identifier of a tunnel corresponding to each address. When determining, according to policy information, to transmit a service flow using the tunnel, the user plane function network element may process the service flow using the address corresponding to the tunnel.

S302. When each address corresponds to the access technology type, the user plane function network element transmits the service flow according to the policy information based on the plurality of addresses, where the policy information includes a steering mode and/or a transmission method of the service flow. When each address corresponds to the service type, the user plane function network element transmits the service flow using the plurality of addresses.

Optionally, the policy information may further include a flow steering policy, and the flow steering policy includes at least one access technology indication.

Optionally, the user plane function network element may obtain the policy information from the session management network element. For a manner in which the session management network element obtains the policy information, refer to the description in the foregoing embodiment. For example, when sending the plurality of addresses to the user plane function network element or instructing the user plane function network element to allocate the plurality of addresses, the session management network element sends the policy information to the user plane function network element.

The PDU session may include service flows transmitted using a plurality of transmission methods. The service flows use different transmission methods, and therefore manners in which the user plane function network element transmits the service flows according to the policy information based on the plurality of addresses are also different. Descriptions are separately provided below.

In a case 1, for example, the service flow includes a first service flow transmitted using a first transmission method, the plurality of addresses include a first address and a second address, the first address corresponds to a first access technology type, and the second address corresponds to a second access technology type. In this case, S302 may be implemented in the following manner A.

In the manner A, the user plane function network element sends the first service flow to the terminal according to the policy information using the first address and/or the second address.

For content of the first transmission method in the case 1, refer to the description in the example 2-1. Details are not described herein again.

For an implementation of the manner A, refer to the description on the terminal side in the example 2-1. In other words, the terminal in the example 2-1 may be replaced with the user plane function network element. Details are not described herein again.

Optionally, in this embodiment of this application, the user plane function network element obtains a third address, the second access technology type corresponding to the third address, and the first access technology type corresponding to the third address that are sent by the session management network element, or the user plane function network element obtains a third address and a common address indication that are sent by the session management network element. Alternatively, the user plane function network element obtains a third address sent by the session management network element. When the user plane function network element obtains only the third address, but obtains no access technology type indication corresponding to the third address, the user plane function network element may determine that the third address is a common address.

In a case 2, for example, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, and the third address corresponds to the first access technology type and the second access technology type. In this case, S302 may be implemented in the following manner B.

It should be noted that, for content of the first transmission method and the second transmission method in the case 2, refer to the description in the example 2-2. Details are not described herein again.

In the manner B, the user plane function network element sends the first service flow to the terminal according to the policy information using the first address and/or the second address, and sends the second service flow to the terminal according to the policy information using the third address.

For an implementation of the manner B, refer to the description on the terminal side in the example 2-2. In other words, the terminal in the example 2-2 may be replaced with the user plane function network element. Details are not described herein again.

In a case 3, for example, the plurality of addresses allocated by a core network element include a first address and a second address, the first address corresponds to a first access technology type and a second access technology type, the second address corresponds to the first access technology type or the second access type, and the service flow includes a first service flow transmitted using a first transmission method and/or a second service flow transmitted using a second transmission method. In this case, S302 may be implemented in the following manner C.

It should be noted that, for content of the first transmission method and the second transmission method in the case 3, refer to the description in the example 2-2. Details are not described herein again.

In the manner C, the user plane function network element transmits the first service flow according to the policy information using the first address and/or the second address, and transmits the second service flow according to the policy information using the first address.

For an implementation of the manner C, refer to the description on the terminal side in the example 2-3. In other words, the terminal in the example 2-3 may be replaced with the user plane function network element. Details are not described herein again.

In a case 4, for example, the plurality of addresses allocated by a core network element include a first address and a second address, the first address corresponds to a common service flow, the second address corresponds to a first service flow, and the service flow includes the first service flow transmitted using a first transmission method and/or a second service flow transmitted using a second transmission method.

For content of the first transmission method and the second transmission method in the case 4, refer to the description in the example 2-2. Details are not described herein again.

In a manner D, the user plane function network element transmits the first service flow using the first address and/or the second address based on the service type corresponding to each of the plurality of addresses, and transmits the second service flow using the first address based on the service type corresponding to each of the plurality of addresses.

For an implementation of the manner D, refer to the description on the terminal side in the example 2-4. In other words, the terminal in the example 2-4 may be replaced with the user plane function network element. Details are not described herein again.

Figure 10:
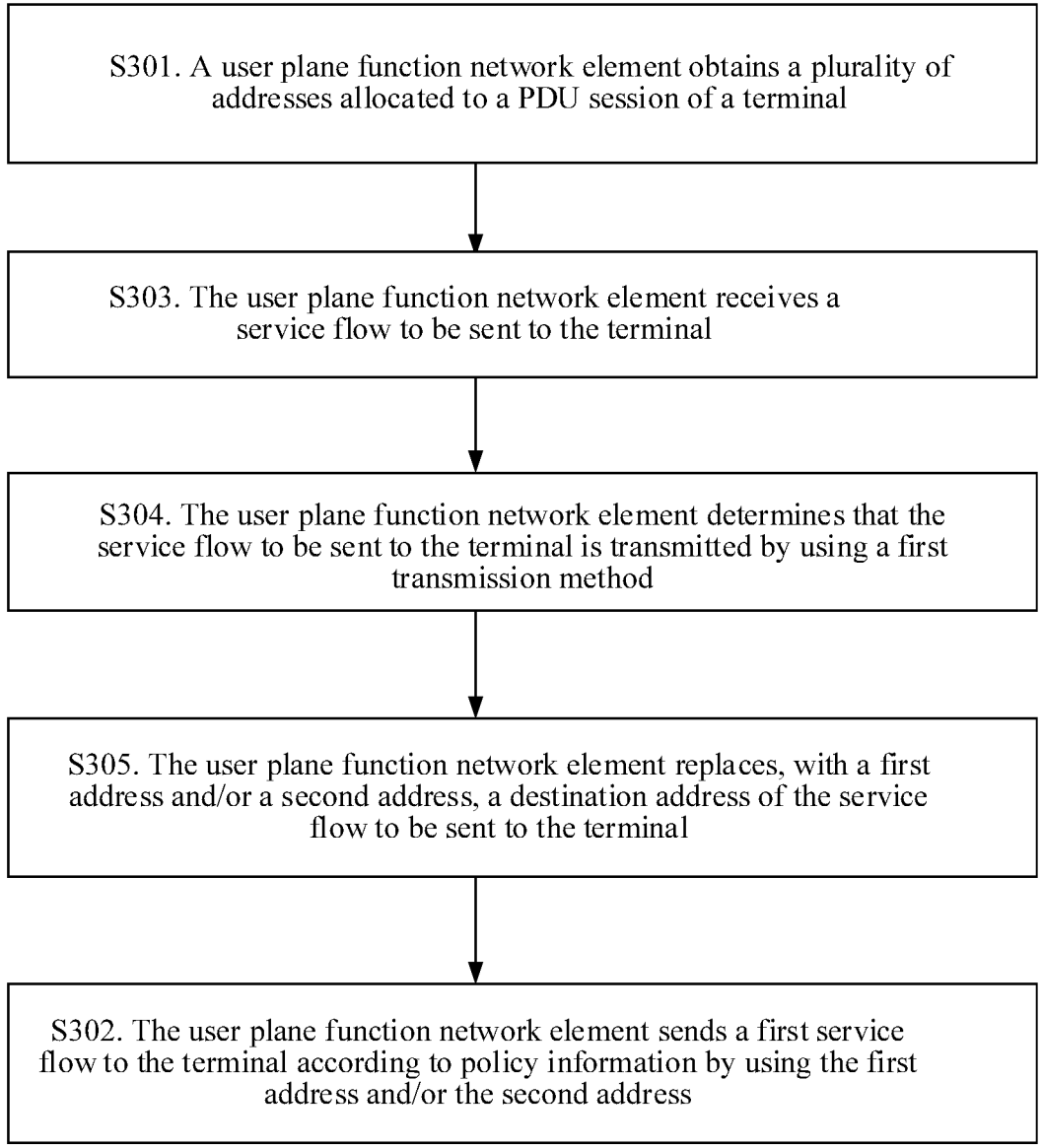

In another embodiment of this application, as shown in FIG. 10, the method provided in this embodiment of this application further includes the following steps.

S303. The user plane function network element receives a service flow to be sent to the terminal.

For example, the user plane function network element may receive, from a data network corresponding to the user plane function network element, the service flow to be sent to the terminal.

S304. The user plane function network element determines that the service flow to be sent to the terminal is transmitted using a first transmission method.

For example, the user plane function network element may determine, according to a current transmission method of the service flow or based on an IP address of a server, that the service flow is transmitted using the first transmission method.

For example, the first transmission method includes one or more of an MPTCP method, an MPTCP proxy method, a TCP method, a TCP proxy method, a UDP method, a UDP proxy method, a UDP QUIC method, a UDP QUIC proxy method, a UDP MP-QUIC method, or an MP-QUIC proxy method.

When determining, according to the transmission method, that the service flow is transmitted using the first transmission method, the user plane function network element transmits, to the terminal using the corresponding transmission method, all service flows transmitted using the transmission method. When determining, based on the IP address of the server, that the service flow is transmitted using the first transmission method, the user plane function network element transmits only service flows of some IP addresses to the terminal using the first transmission method.

S305. The user plane function network element replaces, with a first address and/or a second address, a destination address of the service flow to be sent to the terminal.

Service transmission interruption can be avoided by performing S305. For example, the terminal sends a service flow to the user plane function network element using the first address in an uplink transmission process. If the user plane function network element performs no address translation, an address of a service flow received by the terminal in a downlink transmission process is not the first address, and consequently, service interruption may be caused. Correspondingly, as shown in FIG. 10, S302 may be implemented in the following manner: The user plane function network element sends the first service flow to the terminal according to the policy information using the first address and/or the second address.

For example, the user plane function network element may determine, according to the policy information, an access technology used for the service flow. After the access technology used for the service flow is determined, a destination address of the service flow is processed using an address corresponding to the access technology used for the service flow.

For example, if the user plane function network element determines that the service flow is transmitted using a 3GPP access technology, the user plane function network element replaces a destination address of the first service flow with an IP 1 corresponding to the 3GPP access technology.

For uplink transmission, the terminal may transmit the service flow using the method in Embodiment 2. Addresses used by the terminal to transmit a first service flow and a second service flow when the user plane function network element supports a second transmission capability are different from addresses used by the terminal to transmit a first service flow and a second service flow when the user plane function network element supports no second transmission capability. Descriptions are separately provided below.

Figure 11:
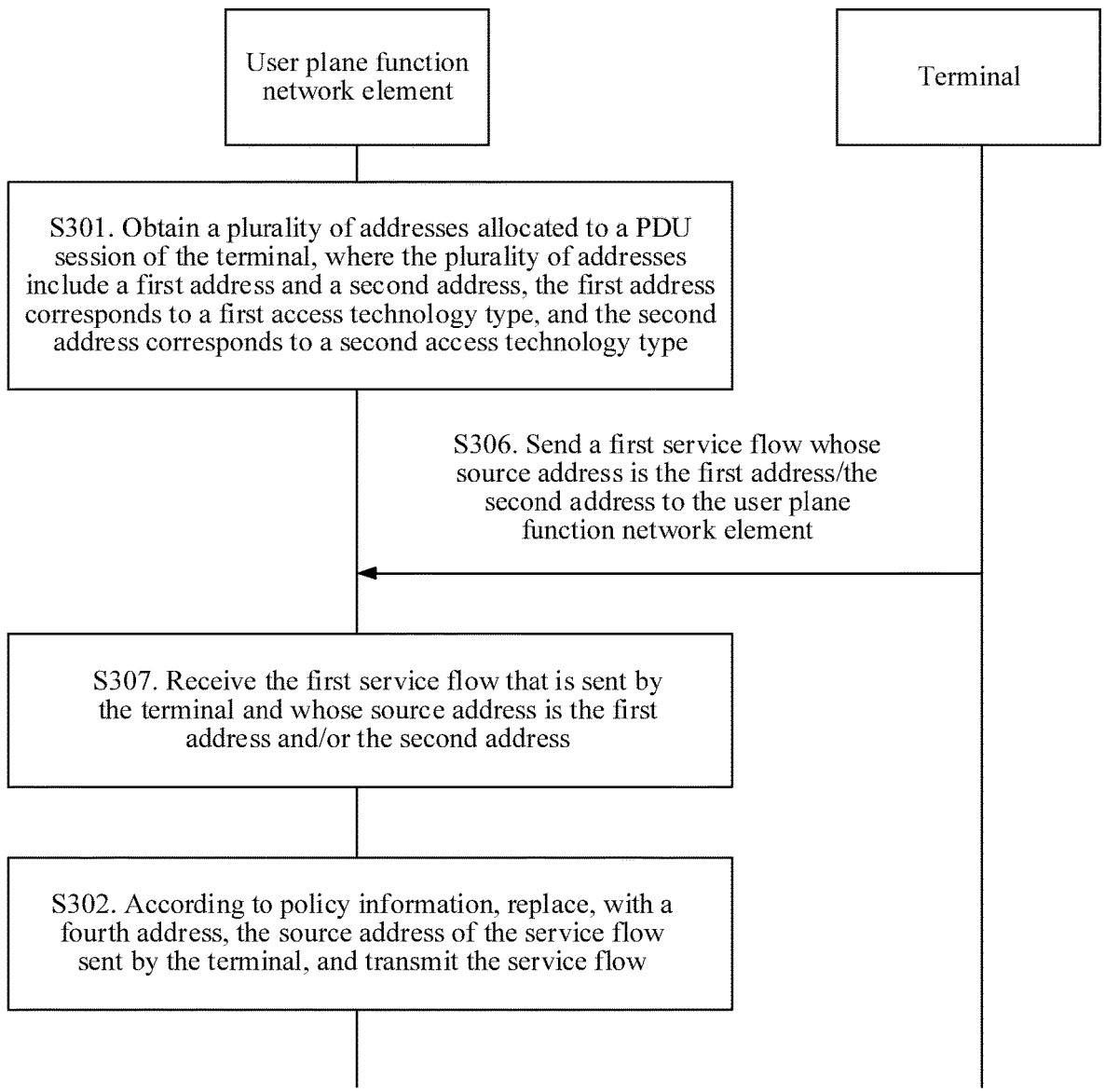

(a) For example, the plurality of addresses include a first address and a second address, the first address corresponds to a first access technology type, and the second address corresponds to a second access technology type. FIG. 11 shows another embodiment of this application, and the method provided in this embodiment of this application further includes the following steps.

S306. The terminal sends a first service flow whose source address is the first address and/or the second address to the user plane function network element.

For an implementation of S306, refer to the description in the example 2-1. Details are not described herein again.

S307. The user plane function network element receives the first service flow that is sent by the terminal and whose source address is the first address and/or the second address.

Correspondingly, S302 may be implemented in the following manner: The user plane function network element replaces, with a fourth address according to the policy information, the source address of the first service flow sent by the terminal, and transmits the first service flow.

For example, the fourth address is an address of the user plane function network element or a third address.

Through S306 and S307, when the user plane function network element receives a first service flow transmitted by the terminal using different access technologies, because the first service flow transmitted using the different access technologies correspond to the first address and/or the second address, if addresses of the first service flow are not processed, a data network considers that the first service flow corresponding to different addresses is from different terminals, resulting in transmission interruption of the first service flow. Therefore, to avoid the transmission interruption of the first service flow, the user plane function network element may uniformly replace, with the fourth address, the first address and/or the second address corresponding to the first service flow. Then, the first service flow corresponding to the fourth address is sent to the DN.

Figure 12:
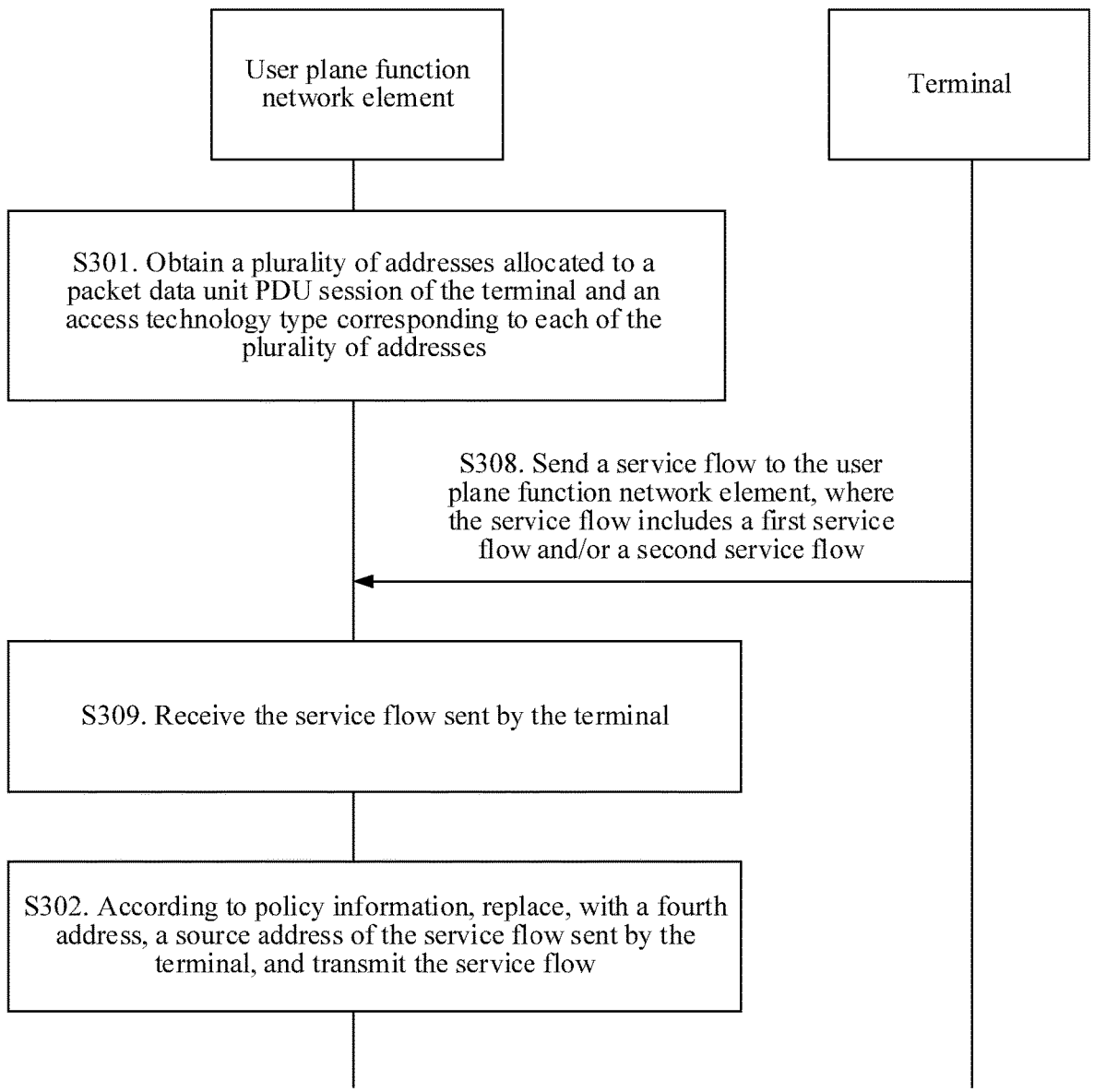

(b) For example, the service flow includes a first service flow transmitted using a first transmission method and/or a second service flow transmitted using a second transmission method, the plurality of addresses include a first address, a second address, and a third address, the first address corresponds to a first access technology type, the second address corresponds to a second access technology type, and the third address corresponds to the first access technology type and the second access technology type. In still another embodiment of this application, as shown in FIG. 12, the method provided in this embodiment of this application further includes the following steps.

Herein, for content of the first transmission method and the second transmission method, refer to the description in the example 2-2. Details are not described herein again.

S308. The terminal sends the service flow to the user plane function network element, where the service flow includes the first service flow and/or the second service flow, a source address of the first service flow is the first address and/or the second address, and a source address of the second service flow is the third address.

For an implementation of S308, refer to the description in the example 2-2. Details are not described herein again.

S309. The user plane function network element receives the service flow sent by the terminal.

Correspondingly, as shown in FIG. 12, S302 may be implemented in the following manner: The user plane function network element replaces the source address of the first service flow with a fourth address according to the policy information, and transmits the first service flow. This is because the address of the second service flow is the third address when the second service flow is transmitted using at least one of the first access technology type and the second access technology type. Therefore, when receiving the second service flow, the user plane function network element may directly send the second service flow.

For example, the fourth address is an address of the user plane function network element or the third address.

(c) In another embodiment of this application, the plurality of addresses obtained by the user plane function network element include a first address and a second address. When the first address corresponds to a first access technology type and a second access technology type, and the second address corresponds to the second access technology type, or when the first address corresponds to a common service flow, and the second address corresponds to a first service flow, S303 may be implemented in the following manner.

S1. If the user plane function network element receives a second service flow, the user plane function network element sends the received second service flow to the terminal.

For example, after receiving a UDP service flow, the user plane function network element performs no address processing on the UDP service flow, and then transmits the UDP service flow using a determined access technology for transmitting the UDP service flow.

S2. If the user plane function network element determines that the first service flow is received, the user plane function network element determines an access technology used for the first service flow. If the access technology used for the first service flow is of the second access technology type corresponding to the second address, the user plane function network element replaces the first address of the first service flow with the second address, and sends the first service flow to the terminal. If the access technology used for the first service flow is not of the second access technology type corresponding to the second address, the user plane function network element sends the first service flow to the terminal using the determined access technology and the first address.

For example, for an MPTCP service flow, the user plane function network element first determines an access technology used to transmit the MPTCP service flow. If an IP 2 corresponds to a non-3GPP access technology, and the access technology used to transmit the MPTCP service flow is the non-3GPP access technology, the user plane function network element replaces an address, that is, an IP 1, of the MPTCP service flow with the IP 2. If the access technology used for the MPTCP service flow is a 3GPP access technology, the user plane function network element transmits the MPTCP service flow using an IP 1 and the 3GPP access technology.

In addition, if the user plane function network element receives the second service flow sent by the terminal, the user plane function network element sends the second service flow. If the user plane function network element receives the first service flow sent by the terminal, the user plane function network element replaces an address, that is, the second address, of the first service flow with the first address, or replaces an address, that is, the first address, of the first service flow with the second address, and then sends the first service flow.

For example, the second address is an IP 2 and corresponds to a non-3GPP access technology, and the first address is an IP 1 and corresponds to a 3GPP access technology and the non-3GPP access technology. If the terminal sends an MPTCP service flow using the 3GPP access technology and the IP 1, after receiving the MPTCP service flow, the user plane function network element replaces an address of the MPTCP service flow with the IP 2.

For example, the second address is an IP 2 and corresponds to a 3GPP access technology, and the first address is an IP 1 and corresponds to the 3GPP access technology and a non-3GPP access technology. If the terminal sends an MPTCP service flow using the 3GPP access technology and the IP 2, after receiving the MPTCP service flow, the user plane function network element changes an address of the MPTCP service flow to the IP 1.

Figure 13A:
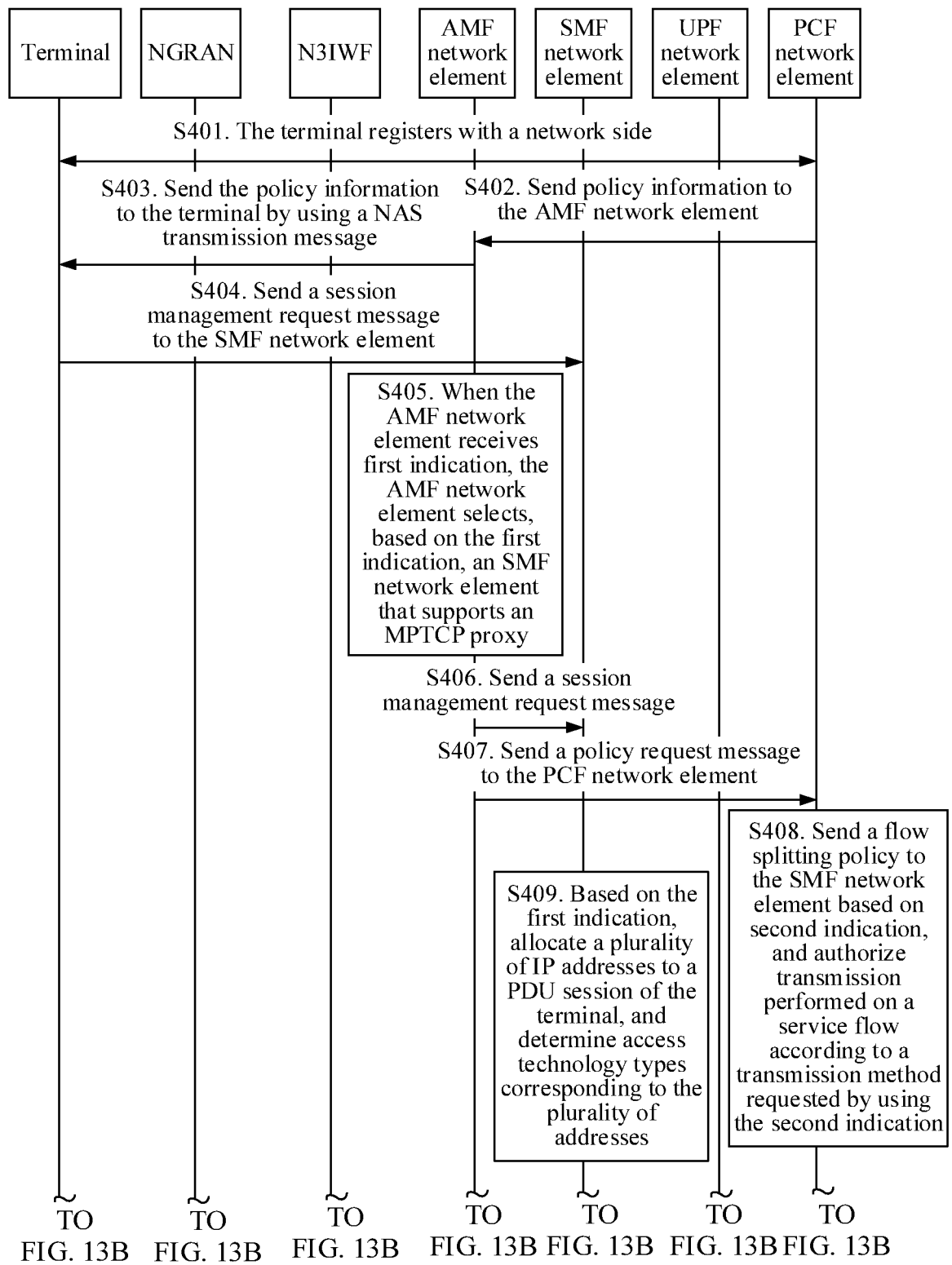
Figure 13B:
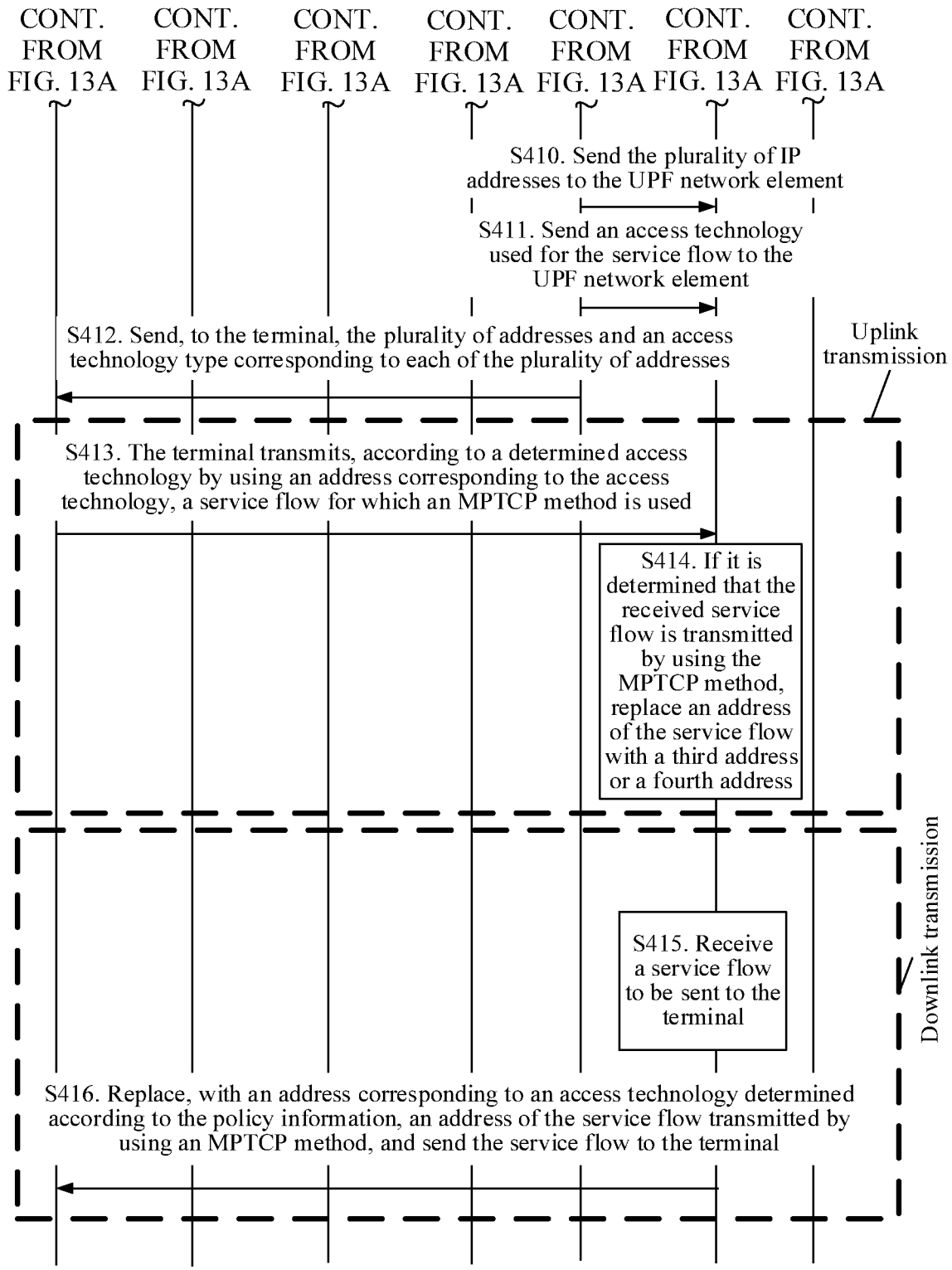

FIG. 13A and FIG. 13B show an embodiment in which a service flow transmitted using a transmission method such as MPTCP and a service flow transmitted using a transmission method such as QUIC are steered on a 3GPP access technology side and a non-3GPP access technology side based on an MPTCP proxy. This solution includes the following steps.

S401. A terminal registers with a network side.

For example, the terminal may access the network side using a 3GPP access technology and complete a registration procedure. Alternatively, the terminal accesses the network side using a non-3GPP access technology and completes a registration procedure. Alternatively, the terminal accesses the network side separately using a non-3GPP access technology and a 3GPP access technology and completes a registration procedure.

It may be understood that, if the terminal completes registration using one of the non-3GPP access technology and the 3GPP access technology in S401, the terminal completes registration using the other of the non-3GPP access technology and the 3GPP access technology, such that the terminal accesses the network side using both the non-3GPP access technology and the 3GPP access technology.

S402. For the successfully registered terminal, a PCF network element sends policy information to an AMF network element, where the policy information includes a flow description parameter, a transmission method of a service flow, a flow description parameter, and a steering mode.

A service flow transmitted using an MPTCP proxy method or an MPTCP method is used as an example. The policy information further includes an MPTCP algorithm corresponding to the steering mode. Alternatively, the policy information further includes an MPTCP algorithm corresponding to the transmission method of the service flow.

S403. The AMF network element sends the policy information to the terminal using a NAS transmission message.

S404. The terminal sends a session management request message to an SMF network element, where the session management request message includes a PDU session identifier and a first indication.

The first indication is used to indicate that the terminal supports an MPTCP proxy capability, or used to indicate that the terminal requests to select an MPTCP proxy for a PDU session associated with the PDU session identifier.

Optionally, the terminal may determine, according to the policy information in S402, whether to send the first indication. For example, when the terminal determines that the transmission method of the service flow is an MPTCP proxy method, an MPTCP transmission method, or a TCP transmission method, the terminal determines to send the first indication.

Optionally, the first indication may alternatively be carried in a NAS transmission message and sent to the SMF network element. In this case, the session management request message may alternatively be carried in the NAS transmission message.

S405. When the AMF network element receives the first indication, the AMF network element selects, based on the first indication, an SMF network element that supports the MPTCP proxy.

S406. The AMF network element sends a session management request message to the SMF network element that supports the MPTCP proxy.

S407. The SMF network element sends a policy request message to the PCF network element based on the received session management request message. The policy request message carries a flow description parameter and a second indication. The second indication is used to indicate that at least one of the MPTCP method or the MPTCP proxy method is requested to be used for a service flow determined using the flow description parameter.

S408. The PCF network element sends a flow steering policy to the SMF network element based on the second indication, and authorizes transmission performed on the service flow according to the transmission method requested using the second indication.

S409. The SMF network element allocates a first address, a second address, and a third address to the PDU session based on the first indication. The first address corresponds to a first access technology type, the second address corresponds to a second access technology type, and the third address corresponds to the first access technology type and the second access technology type.

For example, the SMF network element allocates three IP addresses such as an IP 1, an IP 2, and an IP 3. The IP 1 is an address used when the service flow is transmitted using the 3GPP access technology. The IP 2 is an address used when the service flow is transmitted using the non-3GPP access technology. The IP 3 is an address used when the service flow is transmitted using the 3GPP access technology and the non-3GPP access technology.

S410. The SMF network element selects, based on the first indication, a UPF network element that supports the MPTCP proxy, and sends a plurality of addresses to the UPF network element.

For example, the SMF network element sends an N4 session message to the UPF network element, and the N4 session message includes the plurality of addresses and access technology types or tunnel identifiers corresponding to the plurality of addresses.

For example, the SMF network element further sends the third address and a 3GPP access and non-3GPP access indication to the UPF network element or the terminal. Alternatively, the SMF network element further sends the third address and a common address indication to the UPF network element or the terminal. The SMF network element further sends the third address to the UPF network element or the terminal. Because the third address carries no access technology indication, it indicates that the third address is applicable to any access technology.

It may be understood that, in S409 and S410, the SMF network element allocates the plurality of addresses to the PDU session of the terminal. In an actual process, alternatively, the UPF network element may allocate the plurality of addresses to the PDU session of the terminal. When the UPF network element allocates the plurality of addresses to the PDU session of the terminal, the SMF network element adds a third indication to an N4 session message. The third indication is an MPTCP proxy indication or a multi-address indication. The UPF network element allocates the plurality of addresses to the PDU session of the terminal based on the third indication. Then, the UPF network element sends, to the SMF network element, an access technology type or a tunnel identifier corresponding to each of the plurality of addresses, such that the SMF network element sends the access technology type or the tunnel identifier to the terminal.

S411. The SMF network element sends an access technology used for the service flow to the UPF network element.

Optionally, for a service flow that supports MPTCP transmission, the SMF network element further sends, to the UPF network element, a steering mode corresponding to the service flow.

Optionally, for the service flow that supports MPTCP transmission, the SMF network element further sends a flow steering indication to the UPF network element.

S412. The SMF network element sends, to the terminal, the first address, the first access technology type corresponding to the first address, the second address, the second access technology type corresponding to the second address, the third address, and the first access technology type and the second access technology type that correspond to the third address.

In addition, the SMF network element sends at least one access technology indication or an MPTCP indication to the terminal. The MPTCP indication is used to indicate that the service flow is transmitted using the MPTCP method. The at least one access technology indication is used to indicate a transmission technology used for the service flow.

It may be understood that when the MPTCP indication is sent, the terminal may determine a multipath transmission algorithm based on the MPTCP indication, to determine the access technology used for the service flow.

S413. The terminal transmits, according to the determined access technology using an address corresponding to the access technology, the service flow for which the MPTCP method is used.

S414. If the UPF network element determines that the received service flow is transmitted using the MPTCP method, the UPF network element replaces an address of the service flow with the third address or a fourth address.

S415. The UPF network element receives a service flow to be sent to the terminal.

S416. If the UPF network element determines that the service flow to be sent to the terminal is transmitted using the MPTCP method, the UPF network element replaces, with an address corresponding to an access technology determined according to the policy information, an address of the service flow transmitted using the MPTCP method, and sends the service flow to the terminal.

Figure 14A:
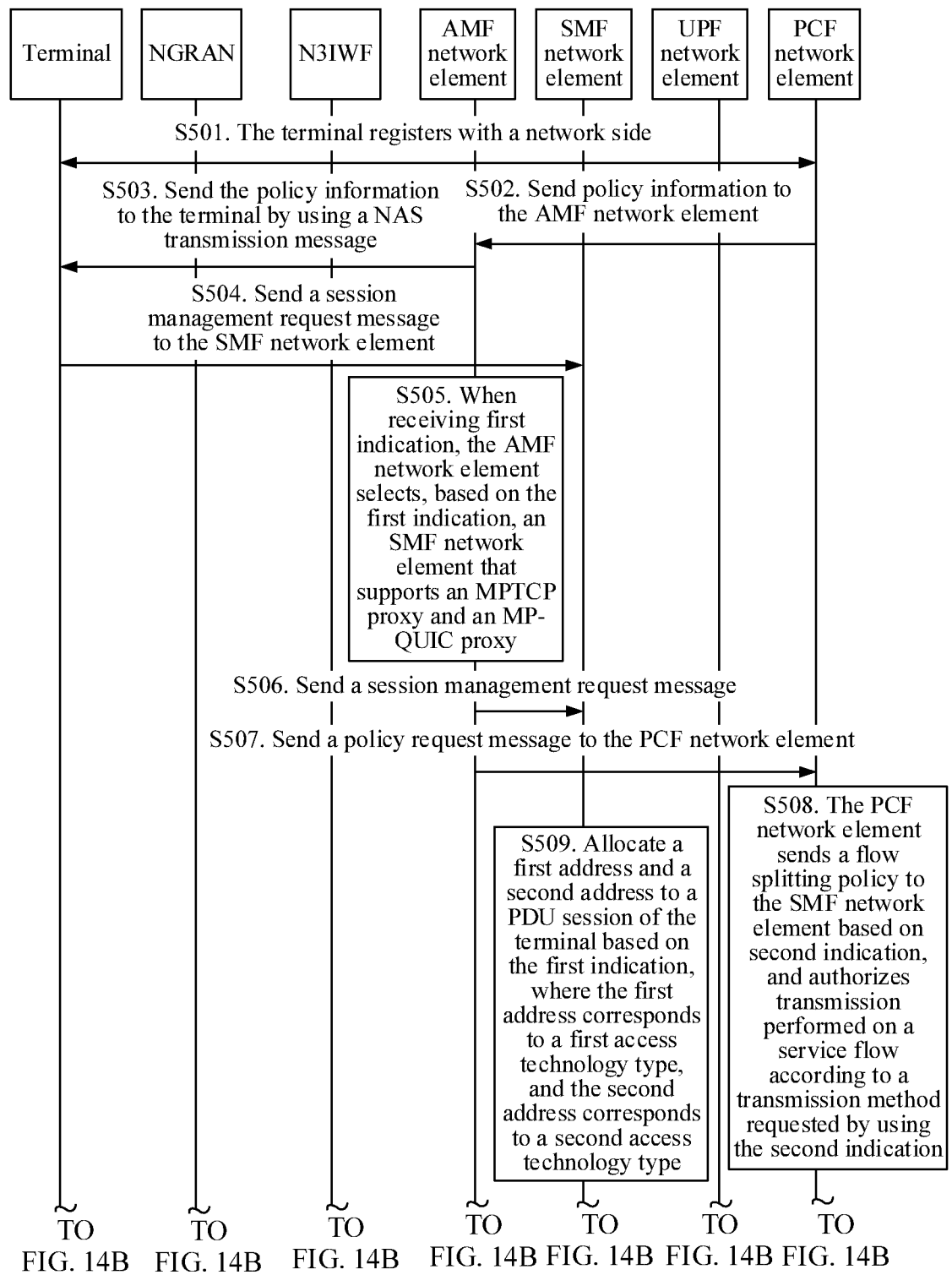
Figure 14B:
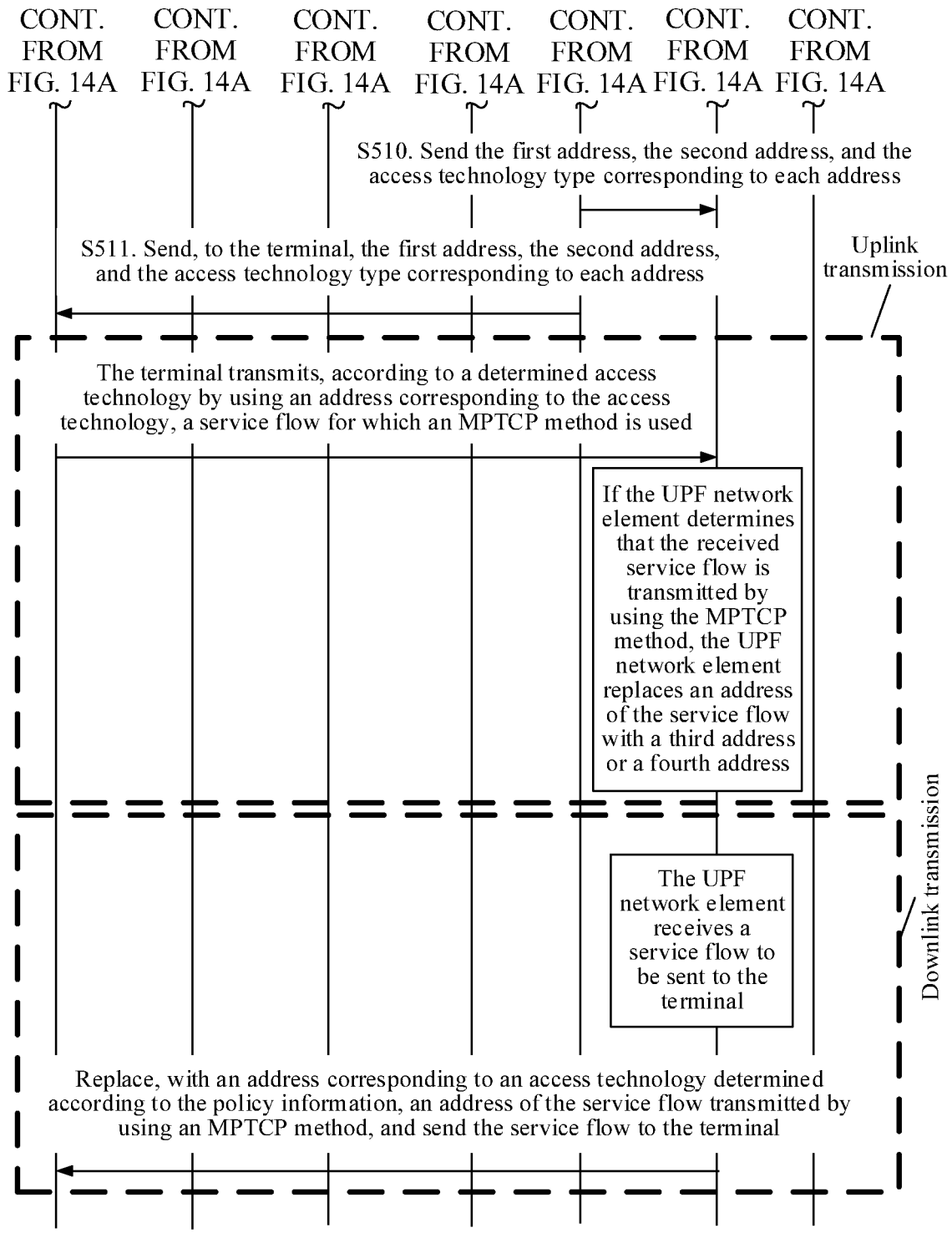

FIG. 14A and FIG. 14B show a method in which an MPTCP service flow and a non-MPTCP service flow are steered in a 3GPP access technology and a non-3GPP access technology based on an MPTCP proxy and an MP-QUIC proxy. The method includes the following steps.

For implementations of S501 to S504, refer to the descriptions of S401 to S404 in the foregoing embodiment. Details are not described herein again. A difference lies in that, in S504, the first indication is used to indicate that the terminal supports an MP-QUIC proxy capability, or supports an MP-QUIC capability or an MPTCP proxy capability.

S505. When the AMF network element receives the first indication, the AMF network element selects, based on the first indication, an SMF network element that supports the MP-QUIC proxy capability or the MPTCP proxy capability or an SMF network element that supports the MP-QUIC proxy capability.

S506. The AMF network element sends a session management request message to the selected SMF network element.

S507. The SMF network element sends a policy request message to the PCF network element based on the received session management request message. The policy request message carries a flow description parameter and a second indication. The second indication is used to indicate that either an MPTCP proxy method or an MP-QUIC proxy method is requested to be used to transmit a service flow determined using the flow description parameter.

S508. The PCF network element sends a flow steering policy to the SMF network element based on the second indication, and authorizes transmission performed on the service flow according to the transmission method requested using the second indication.

S509. The SMF network element allocates a first address and a second address to a PDU session of the terminal based on the first indication, where the first address corresponds to a first access technology type, and the second address corresponds to a second access technology type.

For example, the first address is an IP 1, and the second address is an IP 2. The IP 1 is an address used when the service flow is transmitted using the 3GPP access technology. The IP 2 is an address used when the service flow is transmitted using the non-3GPP access technology.

S510. The SMF network element selects, based on the first indication, an SMF network element that supports the MP-QUIC proxy capability or the MPTCP proxy capability or a UPF network element that supports the MP-QUIC proxy capability, and sends, to the UPF network element, the first address, the second address, and the access technology type corresponding to each address.

In addition, the SMF network element sends the policy information of the service flow to the UPF network element. For the policy information, refer to the description in Embodiment 1. Details are not described herein again.

Optionally, the SMF network element sends an IP 3 to the UPF network element. It should be noted that when an IP address is allocated by the UPF network element, the SMF network element needs only to send a multi-address indication or an MP-QUIC proxy indication to the UPF network element.

S511. The SMF network element sends, to the terminal, the first address, the second address, and the access technology type corresponding to each address.

For a manner in which the terminal sends the service flow to the UPF network element using an address allocated by the SMF network element, refer to S413 and S414 in the foregoing embodiment. Details are not described herein again. For a manner in which the UPF network element sends a service flow to the terminal, refer to the descriptions of S415 and S416 in the foregoing embodiment. Details are not described herein again.

The foregoing describes the solutions in the embodiments of this application mainly from a perspective of interaction between network elements. It may be understood that each network element, such as a service flow transmission apparatus or a communications apparatus, includes hardware structures and/or software modules for executing corresponding functions, to implement the foregoing functions. It should be understood that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the service flow transmission apparatus and the communications apparatus may be divided into function units according to the foregoing method examples. For example, the function units may be obtained through division according to corresponding functions, or two or more functions may be integrated into one processing unit. The integrated unit may be implemented in a form of hardware, or may be implemented in a form of a software function unit. It should be noted that, in the embodiments of this application, division into the units is an example, and is merely logical function division. In actual implementation, there may be another division manner.

Descriptions are provided below using an example in which function modules are obtained through division according to corresponding functions.

Figure 15:
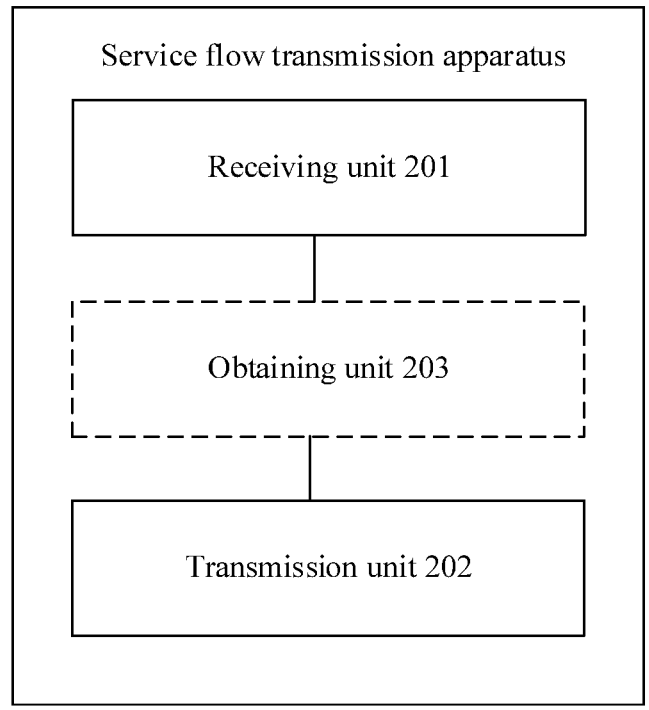
FIG. 15 to FIG. 17 are schematic structural diagrams of service flow transmission apparatuses according to embodiments of this application.

When an integrated unit is used, FIG. 15 is a possible schematic structural diagram of a service flow transmission apparatus in the foregoing embodiments. The service flow transmission apparatus may be a terminal, or a chip applied to the terminal. The service flow transmission apparatus includes a receiving unit 201 and a transmission unit 202.

The receiving unit 201 is configured to support the service flow transmission apparatus in performing S103 and S107 in the foregoing embodiment. The transmission unit 202 is configured to support the service flow transmission apparatus in performing S104 in the foregoing embodiment.

In a possible implementation, the service flow transmission apparatus includes an obtaining unit 203.

The obtaining unit 203 is configured to support the service flow transmission apparatus in performing S105 in the foregoing embodiment.

All related content of the steps in the foregoing method embodiments may be cited in function descriptions of the corresponding function modules. Details are not described herein again. It may be understood that the obtaining unit 203 may be further configured to perform S203. The transmission unit 202 is further configured to support the service flow transmission apparatus in performing S204 in the foregoing embodiment.

Figure 16:
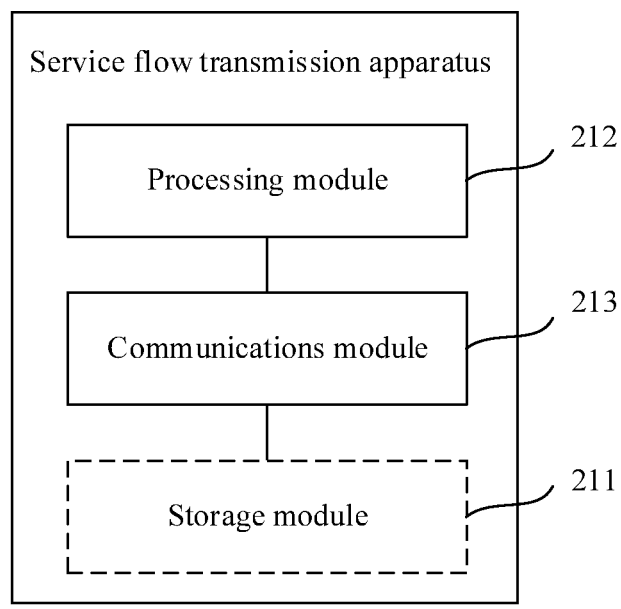

When an integrated unit is used, FIG. 16 is a schematic diagram of a possible logical structure of a service flow transmission apparatus in the foregoing embodiments. The service flow transmission apparatus may be the terminal in the foregoing embodiments, or a chip applied to the terminal. The service flow transmission apparatus includes a processing module 212 and a communications module 213. The processing module 212 is configured to control and manage an action of the service flow transmission apparatus. For example, the processing module 212 is configured to perform a message or data processing step on a service flow transmission apparatus side. The communications module 213 is configured to perform a message or data processing step on the service flow transmission apparatus side.

For example, the processing module 212 is configured to support the service flow transmission apparatus in performing S105 in the foregoing embodiment. The communications module 213 is configured to support the service flow transmission apparatus in performing S103, S104, S107, S203, and S204 in the foregoing embodiments, and/or another process performed by the service flow transmission apparatus in the technology described in this specification.

Optionally, the service flow transmission apparatus may further include a storage module 211 configured to store program code and data of the service flow transmission apparatus.

The processing module 212 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the present disclosure. Alternatively, the processing module may be a combination of processors implementing a computing function, for example, a combination of one or more microprocessors, or a combination of a digital signal processor and a microprocessor. The communications module 213 may be a communications interface, a transceiver, a transceiver circuit, an interface circuit, or the like. The storage module 211 may be a memory.

Figure 17:
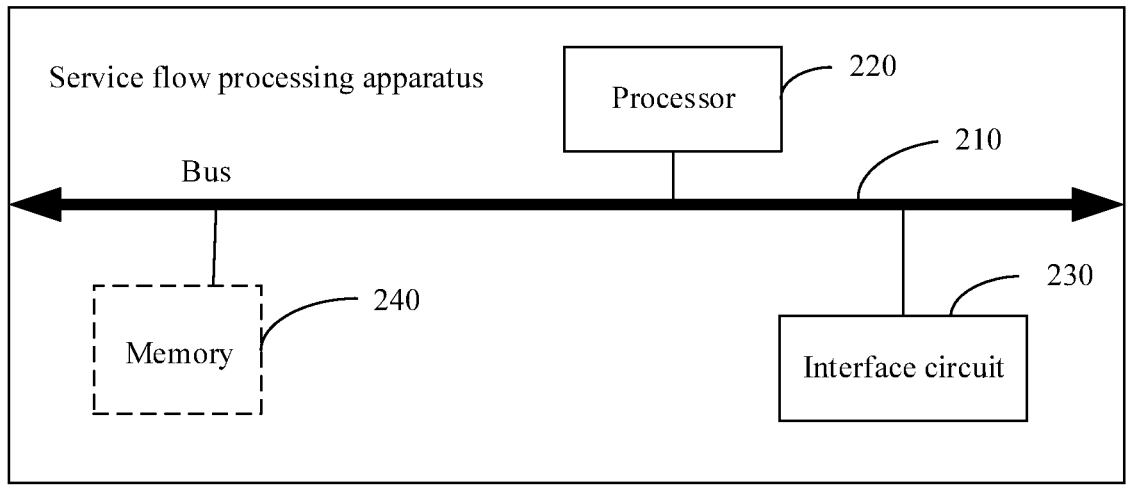

When the processing module 212 is a processor 220, the communications module 213 is an interface circuit 230 or a transceiver, and the storage module 211 is a memory 240, the service flow transmission apparatus in this application may be a device shown in FIG. 17.

The interface circuit 230, one or more processors 220, and the memory 240 are connected to each other using a bus 210. The bus 210 may be a PCI bus, an EISA bus, or the like. The bus 210 may be classified into an address bus, a data bus, a control bus, and the like. For ease of representation, only one thick line is used for representation in FIG. 17, but this does not mean that there is only one bus or only one type of bus. The memory 240 is configured to store program code and data of the service flow transmission apparatus. The interface circuit 230 is configured to support communication between the service flow transmission apparatus and another device (for example, a communications apparatus). The processor is configured to support the service flow transmission apparatus in executing the program code and the data that are stored in the memory 240, to control and manage an action of the service flow transmission apparatus.

For example, the interface circuit 230 supports the service flow transmission apparatus in performing S103, S104, S107, S203, and S204. The processor 220 is configured to support the service flow transmission apparatus in executing the program code and the data that are stored in the memory 240, to implement S105 provided in the embodiments of this application.

Figure 18:
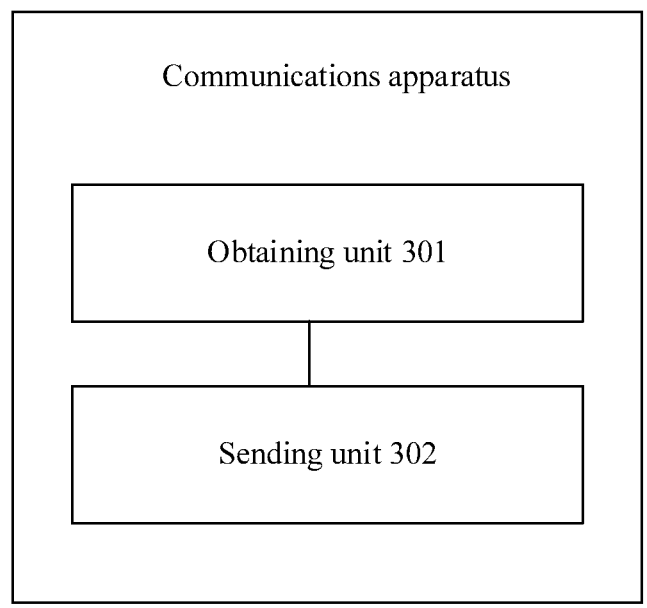
FIG. 18 to FIG. 20 are schematic structural diagrams of communications apparatuses according to embodiments of this application.

When an integrated unit is used, FIG. 18 is a possible schematic structural diagram of a communications apparatus in the foregoing embodiments. The communications apparatus may be a core network element, or a chip applied to the core network element. The communications apparatus includes an obtaining unit 301 and a sending unit 302.

The obtaining unit 301 is configured to support the communications apparatus in performing S101 in the foregoing embodiment. The sending unit 302 is configured to support the communications apparatus in performing S102 and S106 in the foregoing embodiment.

Figure 19:
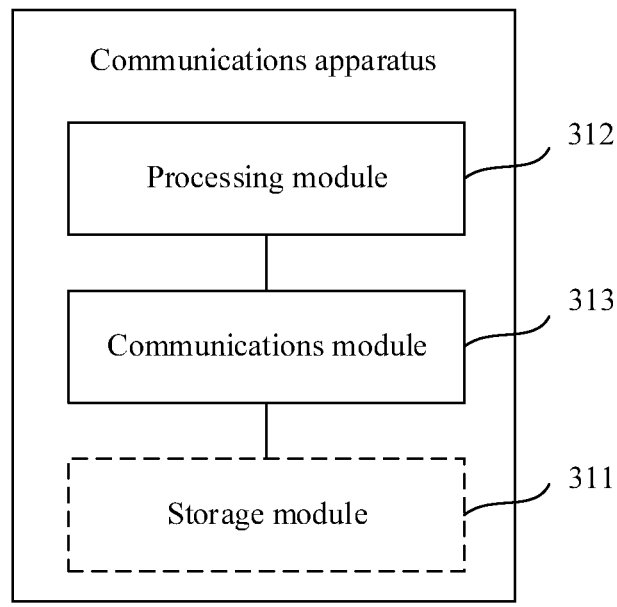

When an integrated unit is used, FIG. 19 is a schematic diagram of a possible logical structure of a communications apparatus in the foregoing embodiments. The communications apparatus may be the core network element in the foregoing embodiments, or a chip applied to the core network element. The communications apparatus includes a processing module 312 and a communications module 313. The processing module 312 is configured to control and manage an action of the communications apparatus. The communications module 313 is configured to perform a message or data processing step on a communications apparatus side.

For example, the communications module 313 is configured to support the communications apparatus in performing S101, S102, and S106 in the foregoing embodiment, and/or another process performed by the communications apparatus in the technology described in this specification.

Optionally, the communications apparatus may further include a storage module 311 configured to store program code and data of the communications apparatus.

The processing module 312 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 313 may be a communications interface, a transceiver, a transceiver circuit, an interface circuit, or the like. The storage module 311 may be a memory.

Figure 20:
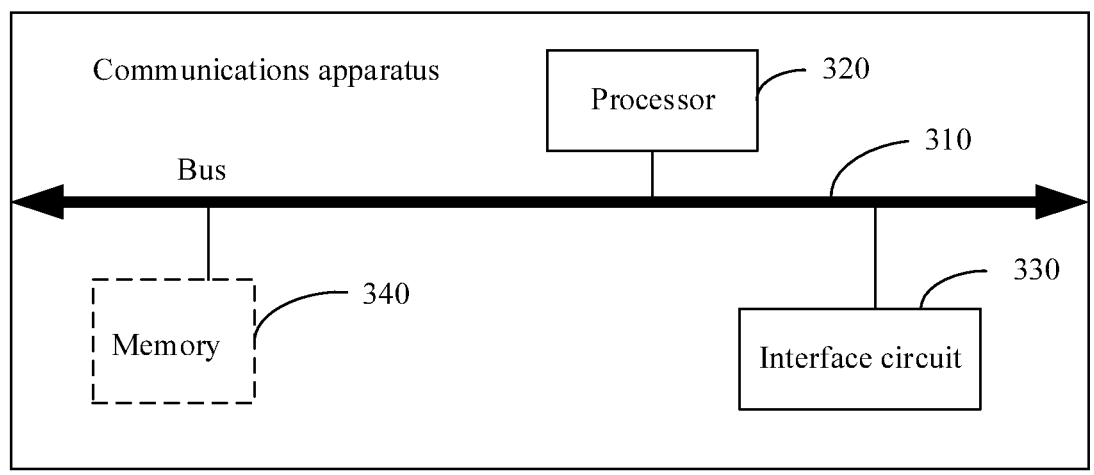

When the processing module 312 is a processor 320, the communications module 313 is an interface circuit 330 or a transceiver, and the storage module 311 is a memory 340, the communications apparatus in this application may be a device shown in FIG. 20.

The interface circuit 330, one or more processors 320, and the memory 340 are connected to each other using a bus 310. The bus 310 may be a Peripheral Component Interconnect (PCI) bus, an Extended Industry Standard Architecture (EISA) bus, or the like. The bus 310 may be classified into an address bus, a data bus, a control bus, and the like. For ease of representation, only one thick line is used for representation in FIG. 20, but this does not mean that there is only one bus or only one type of bus. The memory 340 is configured to store program code and data of the communications apparatus. The interface circuit 330 is configured to support communication between the communications apparatus and another device (for example, a service flow transmission apparatus). The processor 320 is configured to support the communications apparatus in executing the program code and the data that are stored in the memory 340, to implement a message/data control action on a communications apparatus side.

In a possible implementation, the interface circuit 330 is configured to support the communications apparatus in performing S101, S102, and S106 in the foregoing embodiment, and/or another process performed by the communications apparatus in the technology described in this specification.

Figure 21:
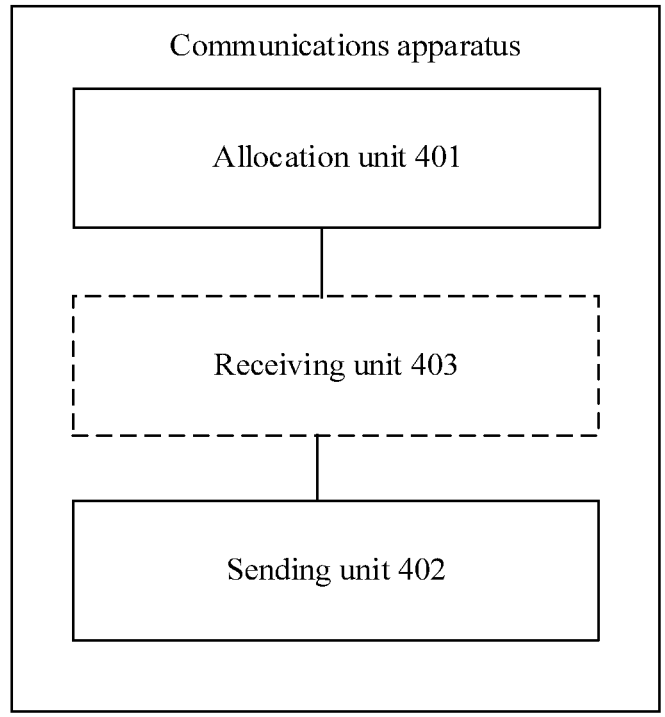
FIG. 21 to FIG. 23 are schematic structural diagrams of other communications apparatuses according to embodiments of this application.

When an integrated unit is used, FIG. 21 is a possible schematic structural diagram of a communications apparatus in the foregoing embodiments. The communications apparatus may be a core network element, or a chip applied to the core network element. The communications apparatus includes an allocation unit 401 and a sending unit 402.

When the core network element is a session management network element, the allocation unit 401 is configured to support the communications apparatus in performing S201 in the foregoing embodiment. The sending unit 402 is configured to support the communications apparatus in performing S202 in the foregoing embodiment.

When the core network element is a user plane function network element, the allocation unit 401 is configured to support the communications apparatus in performing S201 in the foregoing embodiment. The sending unit 402 is configured to support the communications apparatus in performing S202 in the foregoing embodiment.

In a possible implementation, when the core network element is the user plane function network element, the communications apparatus further includes a receiving unit 403 configured to support the communications apparatus in performing S205 in the foregoing embodiment. In a possible implementation, the sending unit 402 is further configured to support the communications apparatus in performing S206 in the foregoing embodiment.

Figure 22:
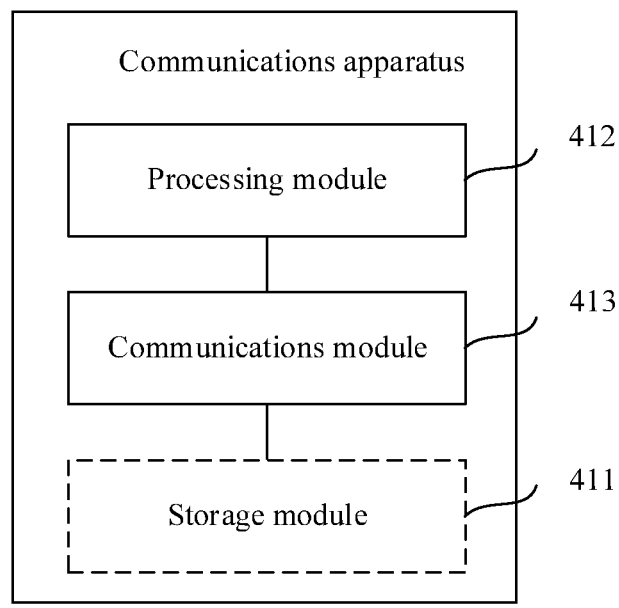

When an integrated unit is used, FIG. 22 is a schematic diagram of a possible logical structure of a communications apparatus in the foregoing embodiments. The communications apparatus may be the core network element in the foregoing embodiments, or a chip applied to the core network element. The communications apparatus includes a processing module 412 and a communications module 413. The processing module 412 is configured to control and manage an action of the communications apparatus. The communications module 413 is configured to perform a message or data processing step on a communications apparatus side.

In an example, when the core network element is a session management network element, the communications module 413 is configured to support the communications apparatus in performing S202 and S205 in the foregoing embodiment. The processing module 412 is configured to support the communications apparatus in performing S201 in the foregoing embodiment, and/or another process performed by the communications apparatus in the technology described in this specification.

In another example, when the core network element is a user plane function network element, the communications module 413 is configured to support the communications apparatus in performing S202, S205, and S206 in the foregoing embodiment. The processing module 412 is configured to support the communications apparatus in performing S201 in the foregoing embodiment.

Optionally, the communications apparatus may further include a storage module 411 configured to store program code and data of the communications apparatus.

The processing module 412 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processing module 412 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 413 may be a communications interface, a transceiver, a transceiver circuit, an interface circuit, or the like. The storage module 411 may be a memory.

Figure 23:
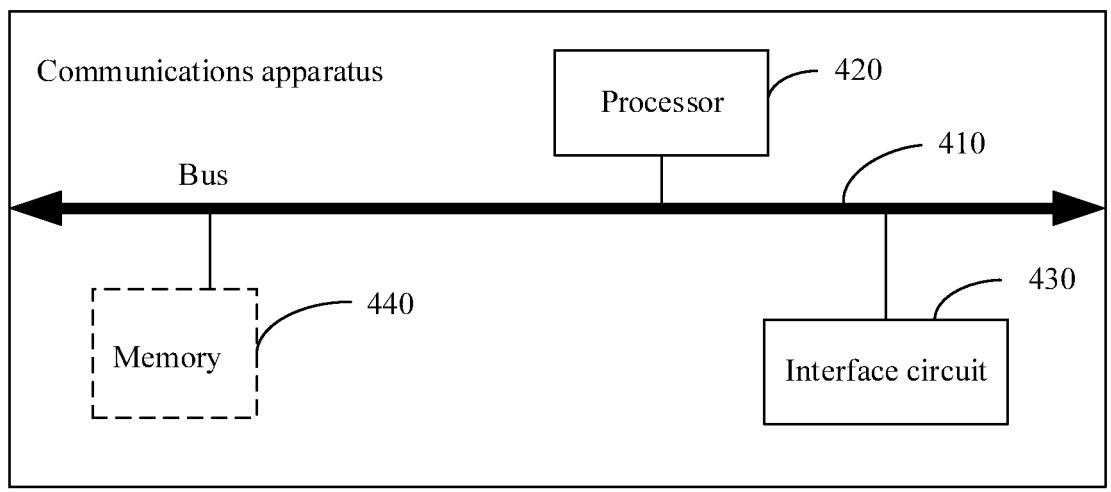

When the processing module 412 is a processor 420, the communications module 413 is an interface circuit 430 or a transceiver, and the storage module 411 is a memory 440, the communications apparatus in this application may be a device shown in FIG. 23.

The interface circuit 430, one or more processors 420, and the memory 440 are connected to each other using a bus 410. The bus 410 may be a PCI bus, an EISA bus, or the like. The bus 410 may be classified into an address bus, a data bus, a control bus, and the like. For ease of representation, only one thick line is used for representation in FIG. 23, but this does not mean that there is only one bus or only one type of bus. The memory 440 is configured to store program code and data of the communications apparatus. The interface circuit 430 is configured to support communication between the communications apparatus and another device (for example, a terminal). The processor 420 is configured to support the communications apparatus in executing the program code and the data that are stored in the memory 440, to implement a message/data control action on a communications apparatus side.

In a possible implementation, when the core network element is a session management network element, the interface circuit 430 is configured to support the communications apparatus in performing S202 and S205 in the foregoing embodiment, and/or another process performed by the communications apparatus in the technology described in this specification. The processor 420 is configured to support the communications apparatus in performing S201 in the foregoing embodiment.

In another possible implementation, when the core network element is a user plane function network element, the interface circuit 330 is configured to support the communications apparatus in performing S202, S205, and S206 in the foregoing embodiment, and/or another process performed by the communications apparatus in the technology described in this specification. The processor 420 is configured to support the communications apparatus in performing S201 in the foregoing embodiment.

Figure 24:
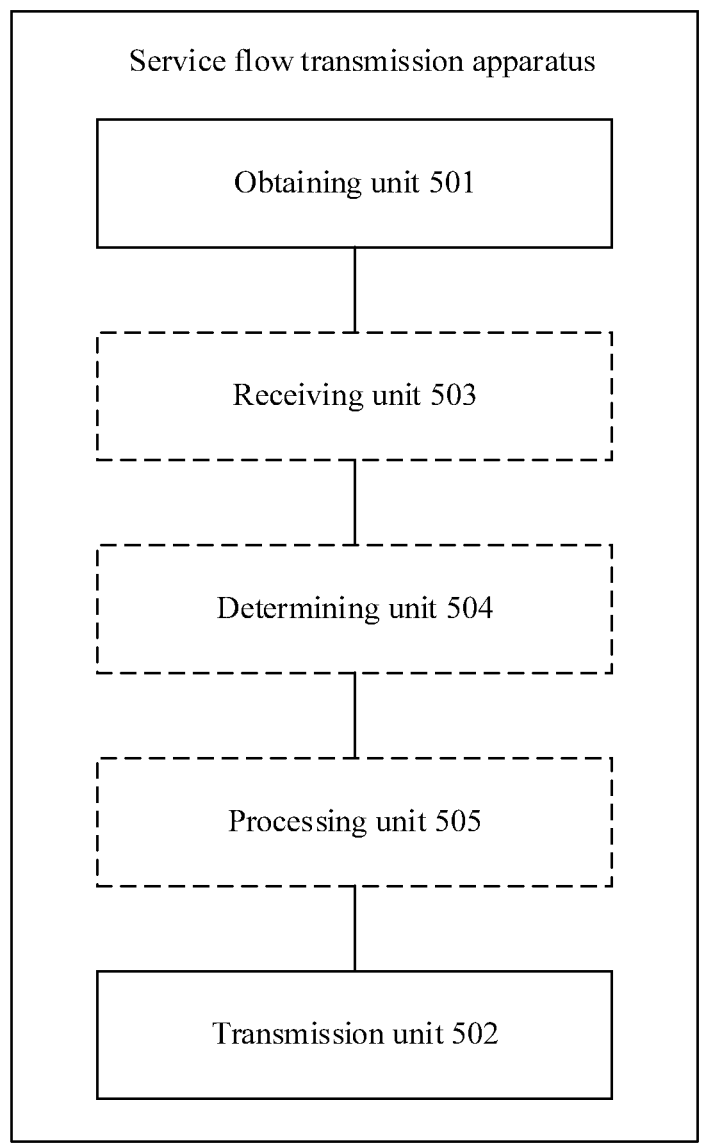
FIG. 24 to FIG. 26 are schematic structural diagrams of other service flow transmission apparatuses according to embodiments of this application.

When an integrated unit is used, FIG. 24 is a possible schematic structural diagram of a service flow transmission apparatus in the foregoing embodiments. The service flow transmission apparatus may be a user plane function network element, or a chip applied to the user plane function network element. The service flow transmission apparatus includes an obtaining unit 501 and a transmission unit 502.

The obtaining unit 501 is configured to support the service flow transmission apparatus in performing S301 in the foregoing embodiment. The transmission unit 502 is configured to support the service flow transmission apparatus in performing S302 in the foregoing embodiment.

In a possible implementation, the service flow transmission apparatus provided in this embodiment of this application further includes a receiving unit 503, a determining unit 504, and a processing unit 505.

The receiving unit 503 is configured to support the service flow transmission apparatus in performing S303, S307, and S309 in the foregoing embodiment. The determining unit 504 is configured to support the service flow transmission apparatus in performing S304 in the foregoing embodiment. The processing unit 505 is configured to support the service flow transmission apparatus in performing S305 in the foregoing embodiment.

Figure 25:
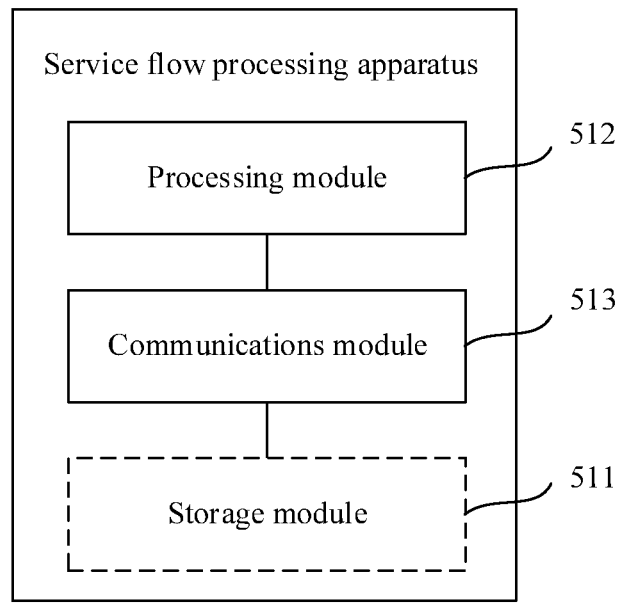

When an integrated unit is used, FIG. 25 is a schematic diagram of a possible logical structure of a service flow transmission apparatus in the foregoing embodiments. The service flow transmission apparatus may be the user plane function network element in the foregoing embodiments, or a chip applied to the user plane function network element. The service flow transmission apparatus includes a processing module 512 and a communications module 513. The processing module 512 is configured to control and manage an action of the service flow transmission apparatus. The communications module 513 is configured to perform a message or data processing step on a service flow transmission apparatus side.

For example, the communications module 513 is configured to support the service flow transmission apparatus in performing S302, S307, and S309 in the foregoing embodiment. The processing module 512 is configured to support the service flow transmission apparatus in performing S301, S304, and S305 in the foregoing embodiment, and/or another process performed by the service flow transmission apparatus in the technology described in this specification.

Optionally, the service flow transmission apparatus may further include a storage module 511 configured to store program code and data of the service flow transmission apparatus.

The processing module 512 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processing module 512 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 513 may be a communications interface, a transceiver, a transceiver circuit, an interface circuit, or the like. The storage module 511 may be a memory.

Figure 26:
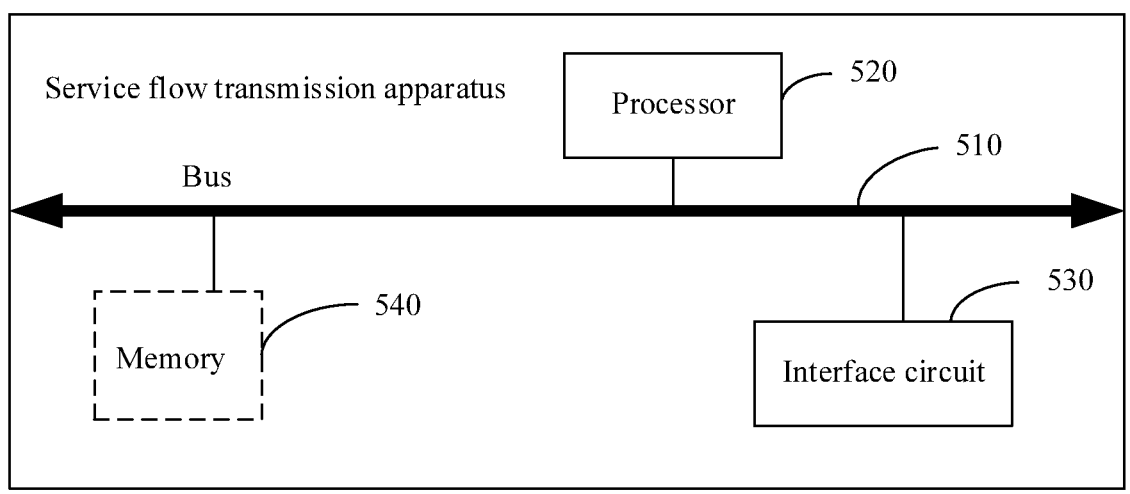

When the processing module 512 is a processor 520, the communications module 513 is an interface circuit 530 or a transceiver, and the storage module 511 is a memory 540, the service flow transmission apparatus in this application may be a device shown in FIG. 26.

The interface circuit 530, one or more processors 520, and the memory 540 are connected to each other using a bus 510. The bus 510 may be a PCI bus, an EISA bus, or the like. The bus 510 may be classified into an address bus, a data bus, a control bus, and the like. For ease of representation, only one thick line is used for representation in FIG. 26, but this does not mean that there is only one bus or only one type of bus. The memory 540 is configured to store program code and data of the service flow transmission apparatus. The interface circuit 530 is configured to support communication between the service flow transmission apparatus and another device (for example, a terminal). The processor 520 is configured to support the service flow transmission apparatus in executing the program code and the data that are stored in the memory 540, to implement a message/data control action on a service flow transmission apparatus side.

In a possible implementation, the interface circuit 530 is configured to support the service flow transmission apparatus in performing S302, S307, and S309 in the foregoing embodiment. The processor 520 is configured to support the service flow transmission apparatus in performing S301, S304, and S305 in the foregoing embodiment, and/or another process performed by the service flow transmission apparatus in the technology described in this specification.

It should be noted that, in the embodiments of this application, the receiving unit or the obtaining unit (or a unit used for receiving/obtaining) is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit or transmission unit (or a unit used for sending/transmission) is an interface circuit of the apparatus, and is configured to send a signal to another apparatus. For example, when the apparatus is implemented in a manner of a chip, the sending unit is an interface circuit that is of the chip and that is configured to send a signal from another chip or apparatus. The processing unit or the determining unit in the embodiments of this application is a processor of the apparatus, and is configured to process a received signal or process a signal of the apparatus. For example, when the apparatus is implemented in a manner of a chip, the processing unit or the determining unit is a processor that is of the chip and that is configured to process a signal received from another chip or apparatus.

Figure 27:
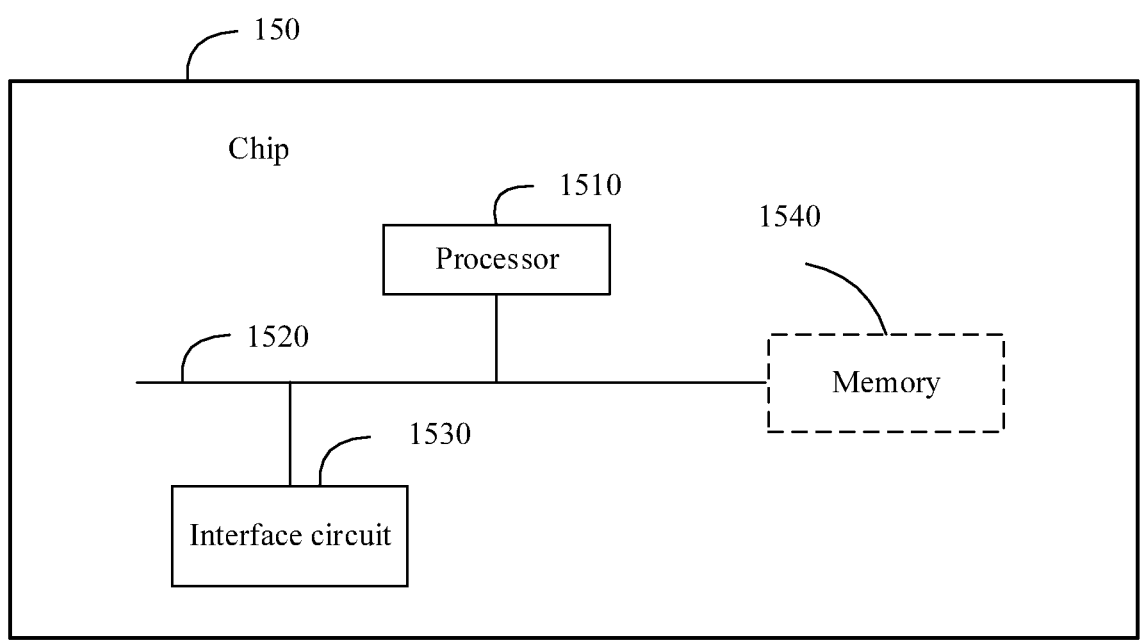
FIG. 27 is a schematic structural diagram of a chip according to an embodiment of this application.

FIG. 27 is a schematic structural diagram of a chip 150 according to an embodiment of the present disclosure. The chip 150 includes one or more processors 1510 and an interface circuit 1530.

Optionally, the chip 150 further includes a memory 1540. The memory 1540 may include a read-only memory (ROM) and a random-access memory (RAM), and provide an operation instruction and data for the processor 1510. A part of the memory 1540 may further include a non-volatile random-access memory (NVRAM).

In some implementations, the memory 1540 stores the following elements: an executable module or a data structure, or a subset thereof, or an extended set thereof.

In this embodiment of the present disclosure, a corresponding operation is performed by invoking the operation instruction stored in the memory 1540 (the operation instruction may be stored in an operating system).

In a possible implementation, a communications apparatus and a communications capability determining apparatus use a similar chip structure, and different apparatuses may use different chips to implement respective functions.

The processor 1510 controls operations of the communications apparatus and the communications capability determining apparatus. The processor 1510 may also be referred to as a central processing unit (CPU). The memory 1540 may include an ROM and an RAN, and provide an instruction and data for the processor 1510. A part of the memory 1540 may further include an NVRAM. For example, during application, the processor 1510, the interface circuit 1530, and the memory 1540 are coupled together using a bus system 1520. The bus system 1520 may further include a power bus, a control bus, a status signal bus, and the like in addition to a data bus. However, for clear description, various types of buses in FIG. 27 are marked as the bus system 1520.

The method disclosed in the foregoing embodiments of the present disclosure may be applied to the processor 1510, or implemented by the processor 1510. The processor 1510 may be an integrated circuit chip and has a signal processing capability. In an implementation process, steps in the foregoing methods can be implemented using a hardware integrated logic circuit in the processor 1510, or using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, the steps, and the logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished using a hardware decoding processor, or may be executed and accomplished using a combination of hardware and a software module in the decoding processor. The software module may be located in a mature storage medium in the art, such as an RAM, a flash memory, an ROM, a programmable read-only memory, an electrically erasable programmable memory, a register, or the like. The storage medium is located in the memory 1540, and the processor 1510 reads information in the memory 1540 and completes the steps in the foregoing methods in combination with hardware of the processor.

In a possible implementation, the interface circuit 1530 is configured to perform receiving and sending steps of the terminal and the core network element in the embodiments shown in FIG. 5 and FIG. 6. The processor 1510 is configured to perform processing steps of the terminal and the core network element in the embodiments shown in FIG. 5 and FIG. 6.

In another possible implementation, the interface circuit 1530 is configured to perform receiving and sending steps of the terminal and the core network element in the embodiments shown in FIG. 7 and FIG. 8. The processor 1510 is configured to perform processing steps of the terminal and the core network element in the embodiments shown in FIG. 7 and FIG. 8.

In still another possible implementation, the interface circuit 1530 is configured to perform receiving and sending steps of the terminal and the user plane function network element in the embodiments shown in FIG. 9 to FIG. 12. The processor 1510 is configured to perform processing steps of the terminal and the user plane function network element in the embodiments shown in FIG. 9 to FIG. 12.

In the foregoing embodiment, the instruction that is stored in the memory and that is to be executed by the processor may be implemented in a form of a computer program product. The computer program product may be written in the memory in advance, or may be downloaded and installed in the memory in a form of software.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk or solid-state drive (SSD)), or the like.

According to one aspect, a computer-readable storage medium is provided. The computer-readable storage medium stores an instruction. When the instruction is run, a terminal or a chip applied to the terminal is enabled to perform S103, S104, S105, S107, S203, and S204 in the embodiments, and/or another process performed by the terminal or the chip applied to the terminal in the technology described in this specification.

According to another aspect, a computer-readable storage medium is provided. The computer-readable storage medium stores an instruction. When the instruction is run, a core network element or a chip applied to the core network element is enabled to perform S101, S102, and S106 in the embodiments, and/or another process performed by the core network element or the chip applied to the core network element in the technology described in this specification.

According to still another aspect, a computer-readable storage medium is provided. The computer-readable storage medium stores an instruction. When the instruction is run, a core network element or a chip applied to the core network element is enabled to perform S201, S202, S205, and S206 in the embodiments, and/or another process performed by the core network element or the chip applied to the core network element in the technology described in this specification.

According to yet another aspect, a computer-readable storage medium is provided. The computer-readable storage medium stores an instruction. When the instruction is run, a terminal or a chip applied to the terminal is enabled to perform S203 and S204 in the embodiments, and/or another process performed by the terminal or the chip applied to the terminal in the technology described in this specification.

According to yet another aspect, a computer-readable storage medium is provided. The computer-readable storage medium stores an instruction. When the instruction is run, a user plane function network element or a chip applied to the user plane function network element is enabled to perform S303, S304, S305, S307, and S309 in the embodiments, and/or another process performed by the user plane function network element or the chip applied to the user plane function network element in the technology described in this specification.

The foregoing readable storage medium may include any medium that can store program code, such as a USB flash drive, a removable hard disk, an ROM, an RAM, a magnetic disk, or an optical disc.

According to one aspect, a computer program product including an instruction is provided. The computer program product stores the instruction. When the instruction is run, a terminal or a chip applied to the terminal is enabled to perform S103, S104, S105, S107, S203, and S204 in the embodiments, and/or another process performed by the terminal or the chip applied to the terminal in the technology described in this specification.

According to another aspect, a computer program product including an instruction is provided. The computer program product stores the instruction. When the instruction is run, a core network element or a chip applied to the core network element is enabled to perform S101, S102, and S106 in the embodiments, and/or another process performed by the core network element or the chip applied to the core network element in the technology described in this specification.

According to still another aspect, a computer program product including an instruction is provided. The computer program product stores the instruction. When the instruction is run, a core network element or a chip applied to the core network element is enabled to perform S201, S202, S205, and S206 in the embodiments, and/or another process performed by the core network element or the chip applied to the core network element in the technology described in this specification.

According to yet another aspect, a computer program product including an instruction is provided. The computer program product stores the instruction. When the instruction is run, a terminal or a chip applied to the terminal is enabled to perform S203 and S204 in the embodiments, and/or another process performed by the terminal or the chip applied to the terminal in the technology described in this specification.

According to yet another aspect, a computer program product including an instruction is provided. The computer program product stores the instruction. When the instruction is run, a user plane function network element or a chip applied to the user plane function network element is enabled to perform S303, S304, S305, S307, and S309 in the embodiments, and/or another process performed by the user plane function network element or the chip applied to the user plane function network element in the technology described in this specification.

According to one aspect, a chip is provided. The chip is applied to a terminal. The chip includes one or more processors and an interface circuit. The interface circuit is interconnected to the one or more processors using a line. The processor is configured to run an instruction, to perform S103, S104, S105, S107, S203, and S204 in the embodiments, and/or another process performed by the terminal in the technology described in this specification.

According to another aspect, a chip is provided. The chip is applied to a core network element. The chip includes one or more processors and an interface circuit. The interface circuit is interconnected to the one or more processors using a line. The processor is configured to run an instruction, to perform S101, S102, and S106 in the embodiments, and/or another process performed by the core network element in the technology described in this specification.

According to still another aspect, a chip is provided. The chip is applied to a core network element. The chip includes one or more processors and an interface circuit. The interface circuit is interconnected to the one or more processors using a line. The processor is configured to run an instruction, to perform S201, S202, S205, and S206 in the embodiments, and/or another process performed by the core network element in the technology described in this specification.

According to yet another aspect, a chip is provided. The chip is applied to a terminal. The chip includes one or more processors and an interface circuit. The interface circuit is interconnected to the one or more processors using a line. The processor is configured to run an instruction, to perform S203 and S204 in the embodiments, and/or another process performed by the terminal in the technology described in this specification.

According to yet another aspect, a chip is provided. The chip is applied to a user plane function network element. The chip includes one or more processors and an interface circuit. The interface circuit is interconnected to the one or more processors using a line. The processor is configured to run an instruction, to perform S303, S304, S305, S307, and S309 in the embodiments, and/or another process performed by the user plane function network element in the technology described in this specification.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, SSD, or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, it is clear that various modifications and combinations may be made to this application without departing from the scope of this application. Correspondingly, the specification and accompanying drawings are merely example description of this application defined by the accompanying claims, and are considered as any of or all modifications, variations, combinations, or equivalents that cover the scope of this application. It is clear that various modifications and variations can be made to this application without departing from the spirit and scope of this application. This application is intended to cover these modifications and variations of this application provided that they fall within the scope of protection defined by the following claims and their equivalent technologies.

What is claimed is:

1. A method, comprising:
   receiving, by a terminal and from a core network element, a first transmission method for a first service flow of a service flow and a second transmission method for a second service flow of the service flow, wherein a protocol data unit (PDU) session to which the service flow belongs supports a plurality of access technologies, and wherein the first transmission method and the second transmission method are different transmission methods of a multipath transmission control protocol (MPTCP) method, an MPTCP proxy method, a transmission control protocol (TCP) method, a TCP proxy method, a user datagram protocol (UDP) method, a UDP proxy method, a quick UDP internet connections (QUIC) method, a QUIC proxy method, a multipath QUIC (MP-QUIC) method, or an MP-QUIC proxy method; and
   transmitting, by the terminal using at least one access technology, the first service flow according to the first transmission method and the second service flow according to the second transmission method,
   wherein the at least one access technology is one of the plurality of access technologies.

2. The method according to claim 1, wherein the method further comprises obtaining, by the terminal, a first address, a second address, and a third address of the PDU session from the core network element, wherein the first address corresponds to a first access technology type, wherein the second address corresponds to a second access technology type, wherein the third address corresponds to both the first access technology type and the second access technology type, wherein at least one of the first address or the second address is for transmitting the first service flow, wherein the third address is for transmitting the second service flow, and wherein the plurality of access technologies comprises the first access technology type and the second access technology type.

3. The method according to claim 2, further comprising obtaining, by the terminal, the first access technology type corresponding to the first address, the second access technology type corresponding to the second address, and both the first access technology type and the second access technology type corresponding to the third address.

4. The method according to claim 3, wherein obtaining the first access technology type corresponding to the first address, the second access technology type corresponding to the second address, the first access technology type and the second access technology type corresponding to the third address comprises receiving, by the terminal from the core network element, first information for determining the first access technology type, second information for determining the second access technology type, and third information for determining both the first access technology type and the second access technology type.

5. The method according to claim 4, wherein the third information includes a common address indication.

6. The method according to claim 2, wherein transmitting the first service flow and the second service flow comprises at least one of:
   transmitting, by the terminal, the first service flow according to the first transmission method based on at least one of the first address or the second address; or
   transmitting, by the terminal, the second service flow according to the second transmission method based on the third address.

7. The method according to claim 2, wherein the first transmission method is the MPTCP method.

8. The method according to claim 2, wherein the first access technology type is a 3rd Generation Partnership Project (3GPP) access technology, and wherein the second access technology type is a non-3GPP access technology.

9. The method according to claim 1, wherein receiving the first transmission method and the second transmission method comprises:
   receiving, by the terminal, a session management response message from the core network element; and
   obtaining, by the terminal, the first transmission method and the second transmission method from the session management response message.

10. The method according to claim 1, further comprising receiving, by the terminal, a steering mode of the service flow from the core network element, wherein transmitting the first service flow and the second service flow comprises transmitting, by the terminal using the at least one access technology, the first service flow and the second service flow according to the steering mode and the first transmission method and the second transmission method.

11. The method according to claim 10, wherein the steering mode comprises one or more of:
   an access technology preference indication indicating that the service flow is preferably transmitted using an access technology associated with the access technology preference indication;
   an optimal link-based flow steering indication indicating that the service flow is preferably transmitted using an optimal link whose link state is better than that of another link;

a link load balancing-based flow steering indication indicating that the service flow is transmitted according to a link load balancing policy;

an access technology and flow steering ratio indication indicating that the service flow is transmitted based on a flow steering ratio corresponding to the access technology; or a redundant transmission indication indicating that a same data packet in the service flow is simultaneously transmitted using different access technologies.

12. The method according to claim 10, further comprising obtaining, by the terminal, a multipath transmission algorithm, wherein transmitting the first service flow and the second service flow according to the steering mode and the first transmission method and the second transmission comprises transmitting, by the terminal using the at least one access technology, the first service flow and the second service flow according to the multipath transmission algorithm, the steering mode, and the first transmission method and the second transmission method.

13. An apparatus, comprising:
a memory configured to store a computer program instruction; and
at least one processor coupled to the memory and configured to execute the computer program instruction to cause the apparatus to:
receive, from a core network element, a first transmission method of a first service flow of a service flow and a second transmission method of a second service flow of the service flow, wherein a protocol data unit (PDU) session to which the service flow belongs supports a plurality of access technologies, and wherein the first transmission method and the second transmission method are different transmission methods of a multipath transmission control protocol (MPTCP) method, an MPTCP proxy method, a transmission control protocol (TCP) method, a TCP proxy method, a user datagram protocol (UDP) method, a UDP proxy method, a quick UDP internet connections (QUIC) method, a QUIC proxy method, a multipath QUIC (MP-QUIC) method, or an MP-QUIC proxy method; and
transmit, using at least one access technology of the plurality of access technologies, the first service flow according to the first transmission method and the second service flow according to the second transmission method.

14. The apparatus according to claim 13, wherein the at least one processor is configured to execute the computer program instruction to further cause the apparatus to obtain a first address, a second address, and a third address of the PDU session from the core network element, wherein the first address corresponds to a first access technology type, wherein the second address corresponds to a second access technology type, wherein the third address corresponds to both the first access technology type and the second access technology type, wherein at least one of the first address or the second address is for transmitting the first service flow, wherein the third address is for transmitting the second service flow, and wherein the plurality of access technologies comprises the first access technology type and the second access technology type.

15. The apparatus according to claim 14, wherein the at least one processor is configured to execute the computer program instruction to further cause the apparatus to obtain the first access technology type corresponding to the first address, the second access technology type corresponding to the second address, and both the first access technology type and the second access technology type corresponding to the third address.

16. The apparatus according to claim 15, wherein the at least one processor is configured to execute the computer program instruction to cause the apparatus to receive, from the core network element, first indication information indicating the first access technology type, second indication information indicating the second access technology type, and third indication information indicating both the first access technology type and the second access technology type.

17. The apparatus according to claim 16, wherein the third indication information includes a common address indication.

18. The apparatus according to claim 14, wherein the at least one processor is configured to execute the computer program instruction to at least cause the apparatus to:
transmit the first service flow according to the first transmission method based on at least one of the first address or the second address; or
transmit the second service flow according to the second transmission method based on the third address.

19. The apparatus according to claim 14, wherein the first transmission method is the MPTCP method.

20. A non-transitory computer-readable storage medium configured to store an instruction that, when executed by at least one processor of an apparatus, causes the apparatus to:
receive, from a core network element, a first transmission method of a first service flow of a service flow and a second transmission method of a second service flow of the service flow, wherein a protocol data unit (PDU) session to which the service flow belongs supports a plurality of access technologies, and wherein the first transmission method and the second transmission method are different transmission methods of a multipath transmission control protocol (MPTCP) method, an MPTCP proxy method, a transmission control protocol (TCP) method, a TCP proxy method, a user datagram protocol (UDP) method, a UDP proxy method, a quick UDP internet connections (QUIC) method, a QUIC proxy method, a multipath QUIC (MP-QUIC) method, or an MP-QUIC proxy method; and
transmit, using at least one access technology selected of the plurality of access technologies, the first service flow according to the first transmission method and the second service flow according to the second transmission method.

* * * * *